US012506320B2

(12) United States Patent
Leisher et al.

(10) Patent No.: US 12,506,320 B2
(45) Date of Patent: Dec. 23, 2025

(54) DESIGNS FOR LATERAL CURRENT CONTROL IN OPTICAL AMPLIFIERS AND LASERS

(71) Applicant: Freedom Photonics LLC, Goleta, CA (US)

(72) Inventors: Paul Orville Leisher, Livermore, CA (US); Jenna Nicole Campbell, Santa Barbara, CA (US); Gordon Barbour Morrison, Summerland, CA (US); Leif Albin Johansson, Santa Barbara, CA (US); Milan Lazar Mashanovitch, Santa Barbara, CA (US); Michelle Helena Labrecque, Goleta, CA (US)

(73) Assignee: Freedom Photonics, LLC, Santa Barbara, CA (US)

( * ) Notice: Subject to any disclaimer, the term of this patent is extended or adjusted under 35 U.S.C. 154(b) by 867 days.

(21) Appl. No.: 17/806,460

(22) Filed: Jun. 10, 2022

(65) Prior Publication Data
US 2023/0023686 A1 Jan. 26, 2023

Related U.S. Application Data

(60) Provisional application No. 63/235,661, filed on Aug. 20, 2021, provisional application No. 63/209,352, filed on Jun. 10, 2021.

(51) Int. Cl.
*H01S 5/042* (2006.01)
*H01S 3/23* (2006.01)
(Continued)

(52) U.S. Cl.
CPC ........ *H01S 5/0424* (2013.01); *H01S 5/06808* (2013.01); *H01S 5/0683* (2013.01);
(Continued)

(58) Field of Classification Search
None
See application file for complete search history.

(56) References Cited

U.S. PATENT DOCUMENTS 4,282,494 A   8/1981   Yonezu et al.
4,284,963 A   8/1981   Allen, Jr. et al.
(Continued)

FOREIGN PATENT DOCUMENTS

CN   110061420   7/2019
DE     4132585   4/1992
(Continued)

OTHER PUBLICATIONS

International Search Report and Written Opinion in PCT Application No. PCT/US2022/033123, mailed on Oct. 6, 2022, in 6 pages.
(Continued)

*Primary Examiner* — Eric L Bolda
(74) *Attorney, Agent, or Firm* — Van Pelt, Yi & James LLP

(57) ABSTRACT

An optical device is provided that includes an active waveguide having a top electrode and a plurality of layers including a gain layer. Configurations are disclosed for the active waveguide to enable amplification of a guided optical wave profile while preserving a shape of a lateral optical intensity profile of the guided optical wave as the guided optical wave is amplified along the waveguide. The top electrode and/or one or more layers of the active optical waveguide may be tailored to provide a tailored optical gain.

17 Claims, 19 Drawing Sheets

(51) Int. Cl.
*H01S 5/068* (2006.01)
*H01S 5/0683* (2006.01)
*H01S 5/20* (2006.01)
*H01S 5/50* (2006.01)

(52) U.S. Cl.
CPC ............... *H01S 5/20* (2013.01); *H01S 5/509* (2013.01); *H01S 3/2308* (2013.01); *H01S 2301/173* (2013.01)

(56) References Cited

U.S. PATENT DOCUMENTS

| | | | |
|---|---|---|---|
| 4,349,905 | A | 9/1982 | Ackley |
| 4,689,797 | A | 8/1987 | Olshansky |
| 4,744,089 | A | 5/1988 | Montroll et al. |
| 4,783,788 | A | 11/1988 | Gordon |
| 4,856,017 | A | 8/1989 | Ungar |
| 4,932,034 | A | 6/1990 | Usami et al. |
| 4,942,585 | A | 7/1990 | Ungar |
| 4,993,035 | A | 2/1991 | Laikhtman |
| 5,003,550 | A | 3/1991 | Welch et al. |
| 5,260,822 | A | 11/1993 | Missaggia et al. |
| 5,539,571 | A | 7/1996 | Welch et al. |
| 5,555,544 | A | 9/1996 | Walpole et al. |
| 5,592,503 | A | 1/1997 | Welch et al. |
| 5,602,866 | A | 2/1997 | Fukunaga |
| 5,652,812 | A | 7/1997 | Gurib et al. |
| 5,657,339 | A | 8/1997 | Fukunaga |
| 5,689,358 | A | 11/1997 | Nakao et al. |
| 5,737,474 | A | 4/1998 | Aoki et al. |
| 5,781,576 | A | 7/1998 | Kimura et al. |
| 5,793,521 | A | 8/1998 | O'Brien et al. |
| 5,914,978 | A | 6/1999 | Welch et al. |
| 5,917,972 | A | 6/1999 | Davies |
| 5,936,991 | A | 8/1999 | Lang |
| 6,014,396 | A | 1/2000 | Osinski et al. |
| 6,104,738 | A | 8/2000 | Kitoh et al. |
| 6,130,903 | A | 10/2000 | Moloney et al. |
| 6,148,014 | A | 11/2000 | Geels et al. |
| 6,181,721 | B1 | 1/2001 | Geels |
| 6,229,947 | B1 | 5/2001 | Vawter et al. |
| 6,246,709 | B1 | 6/2001 | Oshiba et al. |
| 6,301,283 | B1 | 10/2001 | Chen et al. |
| 6,375,364 | B1 | 4/2002 | Wu |
| 6,499,888 | B1 | 12/2002 | Wu |
| 6,542,532 | B1 | 4/2003 | Nakamura |
| 6,600,764 | B1 | 7/2003 | Garbuzov et al. |
| 6,768,758 | B1 | 7/2004 | Hamamoto |
| 6,777,768 | B2 | 8/2004 | Goldstein et al. |
| 6,810,054 | B2 | 10/2004 | Sousa et al. |
| 6,813,068 | B2 | 11/2004 | Hamamoto |
| 6,816,531 | B1 | 11/2004 | Rossin et al. |
| 6,928,097 | B2 | 8/2005 | Chida |
| 7,184,207 | B1 | 2/2007 | Walker et al. |
| 7,257,139 | B2 | 8/2007 | Takayama |
| 7,388,894 | B2 | 6/2008 | O'Daniel et al. |
| 7,542,500 | B2 | 6/2009 | Takayama et al. |
| 7,643,207 | B2 | 1/2010 | Dagens et al. |
| 7,839,911 | B2 | 11/2010 | Satoh et al. |
| 8,306,084 | B2 | 11/2012 | Reill et al. |
| 8,384,993 | B2 | 2/2013 | Landais et al. |
| 8,786,941 | B2 | 7/2014 | Kuramoto et al. |
| 9,166,368 | B2 | 10/2015 | Kanskar |
| 10,270,224 | B2 | 4/2019 | Kanskar |
| 10,320,152 | B2 | 6/2019 | Morrison |
| 10,355,451 | B2 | 7/2019 | Morrison et al. |
| 10,498,105 | B2 | 12/2019 | Fricke et al. |
| 11,837,838 | B1 | 12/2023 | Morrison |
| 2001/0014109 | A1 | 8/2001 | Hamamoto |
| 2002/0037021 | A1 | 3/2002 | Ohkubo |
| 2002/0141467 | A1 | 10/2002 | Iwai et al. |
| 2003/0057427 | A1 | 3/2003 | Chida |
| 2003/0219053 | A1 | 11/2003 | Swint et al. |
| 2004/0131102 | A1 | 7/2004 | Jette et al. |
| 2004/0233957 | A1 | 11/2004 | Ito et al. |
| 2005/0092979 | A1 | 5/2005 | Han et al. |
| 2006/0256829 | A1 | 11/2006 | Koyata et al. |
| 2006/0274802 | A1 | 12/2006 | Aoki et al. |
| 2007/0165685 | A1 | 7/2007 | Mizuuchi et al. |
| 2008/0112450 | A1 | 5/2008 | Krakowski |
| 2009/0232169 | A1 | 9/2009 | Koyata et al. |
| 2009/0290612 | A1 | 11/2009 | Yamaguchi et al. |
| 2010/0080255 | A1 | 4/2010 | Sugahara |
| 2010/0247033 | A1 | 9/2010 | Shoji et al. |
| 2011/0032956 | A1 | 2/2011 | Kanskar |
| 2012/0177077 | A1 | 7/2012 | Erbert et al. |
| 2012/0236886 | A1 | 9/2012 | Oki et al. |
| 2013/0089115 | A1 | 4/2013 | Kanskar |
| 2014/0055842 | A1 | 2/2014 | Kiyota |
| 2014/0064311 | A1 | 3/2014 | Eichler et al. |
| 2014/0254617 | A1 | 9/2014 | Oh |
| 2014/0300953 | A1 | 10/2014 | Whitbread et al. |
| 2014/0301421 | A1 | 10/2014 | Kanskar |
| 2015/0092800 | A1 | 4/2015 | Zucker et al. |
| 2015/0288140 | A1 | 10/2015 | Davies et al. |
| 2016/0006216 | A1 | 1/2016 | Kanskar |
| 2017/0063046 | A1 | 3/2017 | Fukagai |
| 2017/0179679 | A1 | 6/2017 | Lee et al. |
| 2017/0250522 | A1 | 8/2017 | Koda et al. |
| 2017/0310080 | A1 | 10/2017 | Zhu et al. |
| 2018/0287342 | A1 | 10/2018 | Morrison |
| 2018/0287343 | A1 | 10/2018 | Morrison et al. |
| 2018/0323579 | A1 | 11/2018 | Kaji et al. |
| 2019/0273359 | A1 | 9/2019 | Erbert et al. |
| 2020/0227894 | A1 | 7/2020 | Reboud et al. |
| 2021/0057879 | A1 | 2/2021 | Leisher et al. |
| 2023/0088485 | A1 | 3/2023 | Leisher et al. |
| 2024/0039240 | A1 | 2/2024 | Morrison |

FOREIGN PATENT DOCUMENTS

| | | |
|---|---|---|
| DE | 10-2017-114732 | 1/2019 |
| EP | 2641304 | 12/2014 |
| FR | 3032562 | 8/2016 |
| JP | S58-50790 | 3/1983 |
| JP | H08-181383 | 7/1996 |
| JP | 2695440 | 12/1997 |
| JP | H11-340563 | 12/1999 |
| JP | 2000-200940 | 7/2000 |
| JP | 2002-124733 | 4/2002 |
| JP | 2003-101139 | 4/2003 |
| JP | 2003-518777 | 6/2003 |
| JP | 2008-066506 | 3/2008 |
| JP | 2012-509583 | 4/2012 |
| KR | 2002-0081237 | 10/2002 |
| KR | 10-2014-0060460 | 5/2014 |
| WO | WO 2005/033791 | 4/2005 |
| WO | WO 2006/110770 | 10/2006 |
| WO | WO 2008/010374 | 1/2008 |
| WO | WO 2009/116947 | 9/2009 |
| WO | WO 2016/197137 | 12/2016 |
| WO | WO 2017/220144 | 12/2017 |
| WO | WO 2018/197015 | 11/2018 |
| WO | WO 2021/053711 | 3/2021 |
| WO | WO 2022/261511 | 12/2022 |
| WO | WO 2023/049297 | 3/2023 |

OTHER PUBLICATIONS

Arslan et al., "Non-uniform longitudinal current density induced power saturation in GaAs-based high power diode", Applied Physics Letters, vol. 117, Issue 20, pp. 1-5 (Nov. 16, 2020).

Baoxue et al., "Rhombus-like stripe BA InGaAs—AlGaAs—GaAs lasers", IEEE Photonics Technology Letters, vol. 16(5):1248-1249 (2004).

Lindsey et al., "Linear tailored gain broad area semiconductor lasers", IEEE Journal of Quantum Electronics, vol. QB-23(6):775-787 (1987).

Odriozola et al., "Beam properties of 980-nm tapered lasers with separate contacts: Experiments and simulations", IEEE Journal of Quantum Electronics, vol. 45(1):42-50 (20009).

Rauter et al., "Single-mode tapered quantum cascade lasers", Appl. Phys. Lett. vol. 102:181102 (2013).

(56) References Cited

OTHER PUBLICATIONS

Salet et al., "1.1-W continuous-wave 1480-nm semiconductor lasers with distributed electrodes for mode shaping", IEEE Photonics Technology Letters, vol. 10(12):1706-1708 (1998).
Swertfeger et al., "Longitudinal current crowding as power limit in high power 975 nm diode lasers", 2020 IEEE Photonics Conference (IPC), pp. 1-2 (2020).
Walpole et al., "Gaussian patterned contacts for improved beam stability of 1.55- 82 m tapered lasers", IEEE Photonics Technology Letters, vol. 12(3):257-259 (2000).
International Preliminary Report on Patentability and Written Opinion in PCT Application No. PCT/US2022/033123, dated Nov. 21, 2023, in 4 pages.
International Search Report and Written Opinion in PCT Application No. PCT/US2022/044451, mailed on Jan. 26, 2023, in 13 pages.
International Search Report and Written Opinion dated Oct. 6, 2022 for PCT/US2022/033123.
Walpole et al., "High-brightness tapered laser sources in the 1.3- to 2.0- [mu]m wavelength range", In-Plane Semiconductor Lasers IV, vol. 3947, Apr. 18, 2000, p. 40.

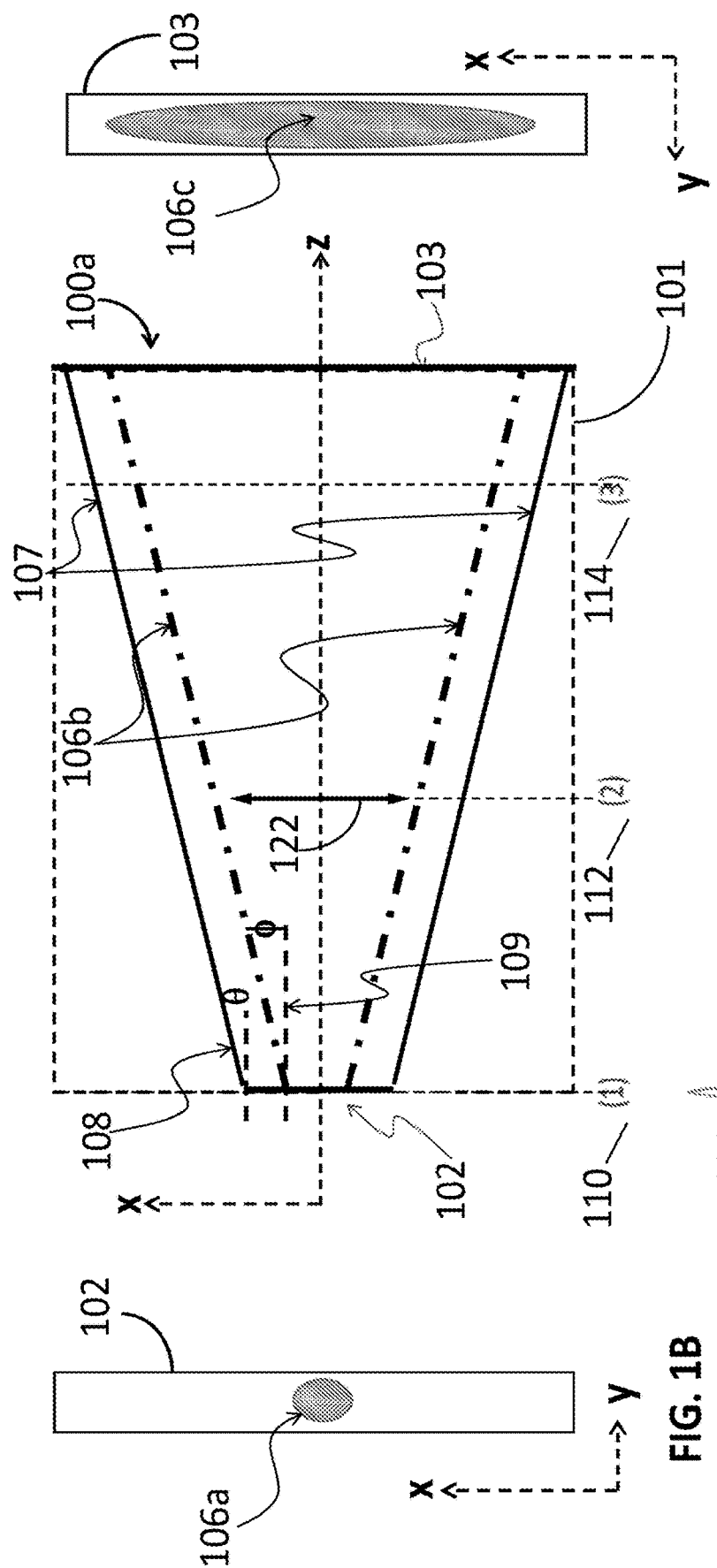

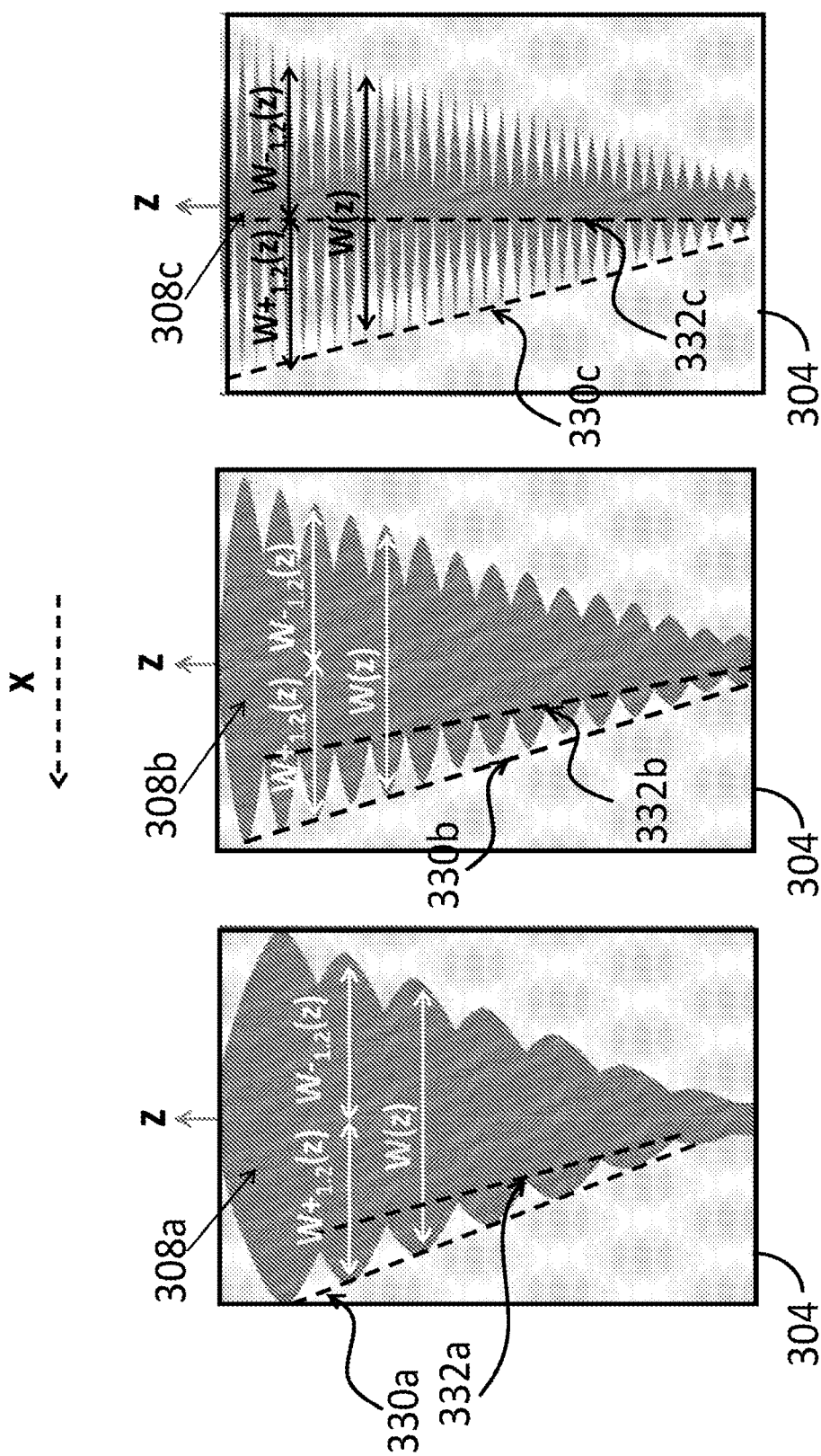

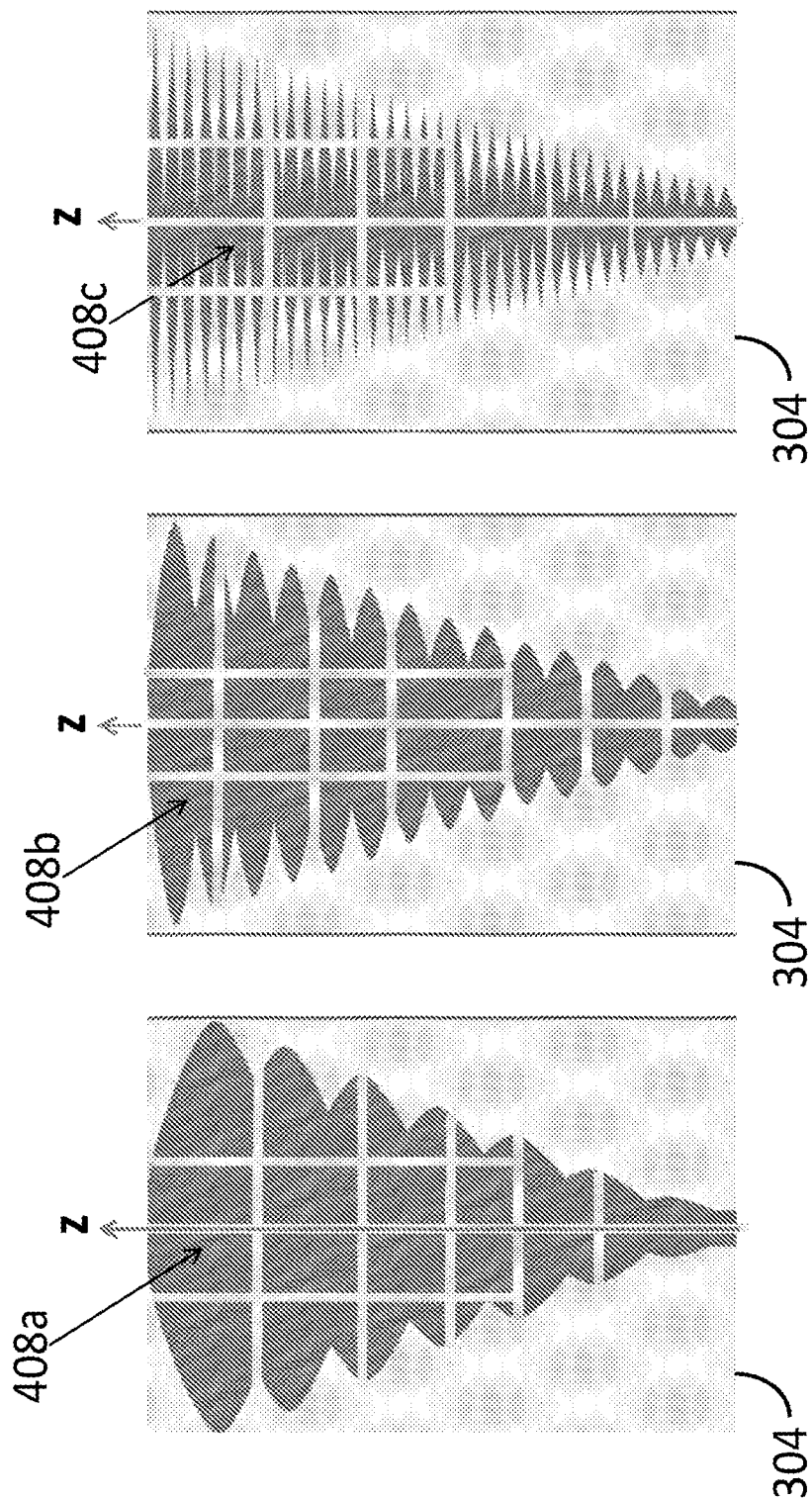

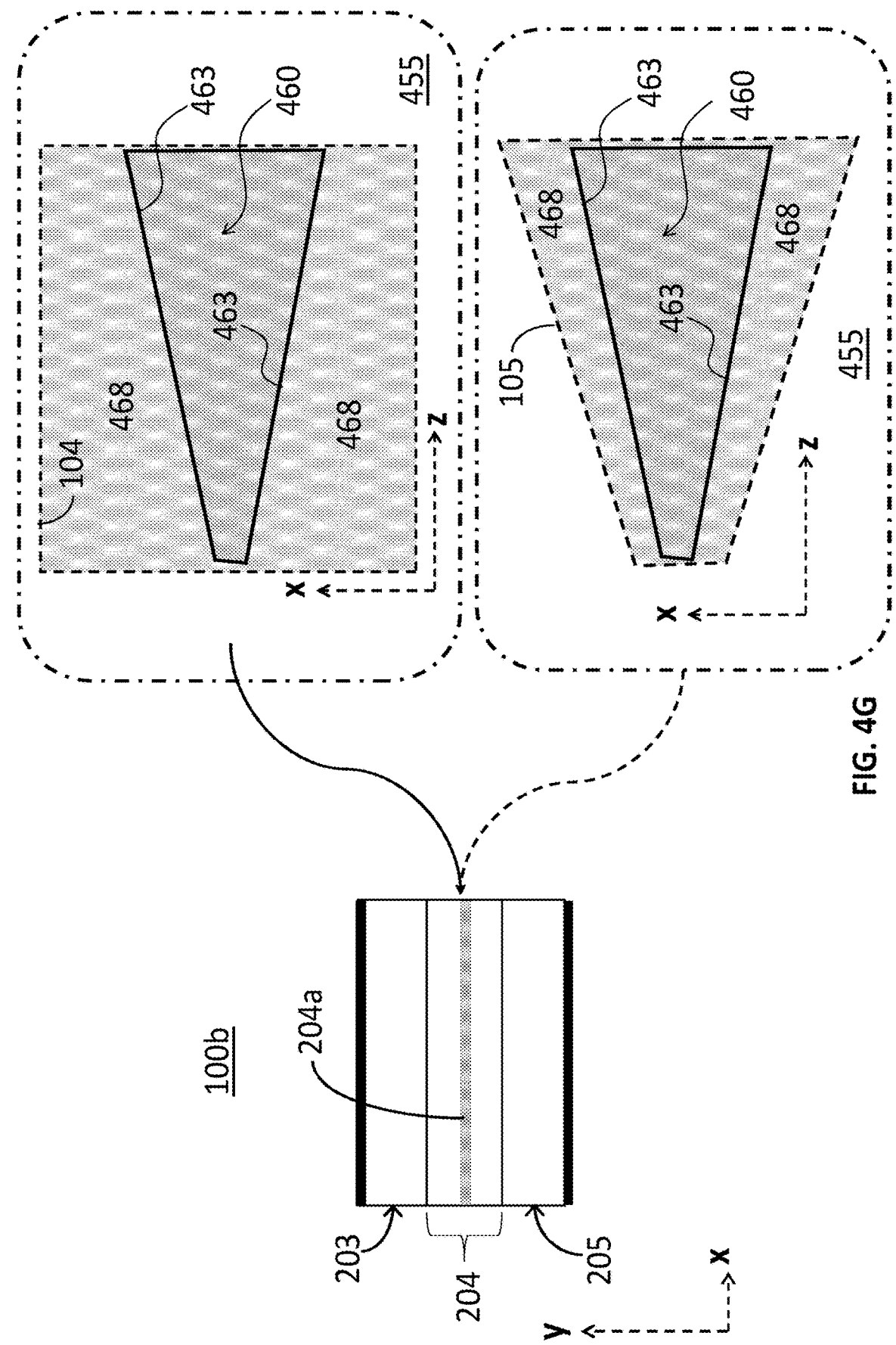

DESIGNS FOR LATERAL CURRENT CONTROL IN OPTICAL AMPLIFIERS AND LASERS

CROSS-REFERENCE TO RELATED APPLICATIONS

This application claims benefit under 35 U.S.C. § 119(e) of U.S. Provisional Application No. 63/209,352, entitled "DESIGNS FOR LATERAL CURRENT CONTROL IN OPTICAL AMPLIFIERS AND LASERS", filed on Jun. 10, 2021, and U.S. Provisional Application No. 63/235,661, entitled "DESIGNS FOR LATERAL CURRENT CONTROL IN OPTICAL AMPLIFIERS AND LASERS", filed on Aug. 20, 2021. Each of the above-referenced applications is hereby incorporated herein by reference in its entirety.

BACKGROUND

Field of the Invention

Various embodiments of this application relate to the field of semiconductor lasers and lasers amplifier and more particularly high-power semiconductor lasers and optical amplifiers with diffraction limited output optical beams.

Description of the Related Art

Lasers and optical amplifiers are widely used in telecommunications, sensing, test and measurement, material processing as well as other applications. Some such applications call for the use of lasers, optical amplifiers or laser-amplifier devices with diffraction limited output beams. Some such applications also may benefit from lasers having high output power or amplifying the output power of a low power laser using power efficient optical amplifiers. The output beam of many high-power lasers is not diffraction limited and many lasers that generate diffraction limited output beams do not provide high optical powers. Accordingly, it would be advantageous to have high-power lasers that output diffraction limited laser beams and efficient high power optical amplifiers that can preserve the beam quality during the amplification process and output a diffraction limited amplified laser beam.

SUMMARY

Example embodiments described herein have several features, no single one of which is indispensable or solely responsible for their desirable attributes. A variety of example systems and methods are provided below.

In one aspect described herein, an optical amplifier configured to receive input light via an input port to be guided therein, amplify at least a portion of said input light that is guided in the optical amplifier, and output at least a portion of said amplified light via an output port, wherein the optical amplifier comprises: an active waveguide extending in a longitudinal direction between the input port and the output port and having a waveguide width extending in a lateral direction, wherein at least a portion of the active waveguide supports a plurality of lateral modes, and wherein the active waveguide comprises a gain layer configured to provide optical gain to light guided in said active waveguide; and at least one electrode disposed with respect to the active waveguide to apply an electrical voltage to said active waveguide, said at least one electrode comprising a conductive layer extending in the longitudinal direction and having a width extending in the lateral direction between first and second lateral edges, said width increasing and decreasing multiple times with position along the longitudinal direction, said at least one electrode having a first end closer to said input port than said output port and a second end closer to said output port than said input port, said first end having a smaller width than said second end.

In another aspect described herein, an optical amplifier configured to receive input light via an input port to be guided therein, amplify at least a portion of said input light that is guided in the optical amplifier, and output at least a portion of said amplified light via an output port, wherein the optical amplifier comprises: an active waveguide extending in a longitudinal direction, said active waveguide disposed between the input port and the output port and having a waveguide width extending in a lateral direction between first and second lateral edges, said active waveguide supporting a plurality of lateral modes, said active waveguide providing optical gain to the input light that is guided therein; and at least one top electrode and one bottom electrode disposed with respect to the active waveguide to apply an electrical voltage to said active waveguide to direct an injection current into said active waveguide and to generate an optical gain profile within said active waveguide, wherein said optical amplifier comprises a plurality of layers, at least some of said layers forming said active waveguide and said at least one top electrode and one bottom electrode, and wherein at least one parameter of at least one of said plurality of layers varies spatially along said lateral direction such that the optical gain profile within said active waveguide has a spatial distribution across said lateral direction so as to suppress at least one of said lateral modes.

BRIEF DESCRIPTION OF THE DRAWINGS

In the following description of the various embodiments, reference is made to the accompanying drawings which form a part hereof, and in which is shown by way of illustration various embodiments of the device.

It is to be understood that other embodiments may be utilized, and structural changes may be made without departing from the scope of present invention.

FIG. 1A illustrates a cross-sectional profile of an example semiconductor optical waveguide in the x-z plane or a plane parallel thereto, the two dimensional optical intensity profile of the light corresponding to the fundamental guided optical wave or mode, and the lateral optical intensity distribution of the fundamental guided optical wave or mode propagating in the waveguide at various locations along the waveguide z-axis.

FIG. 1B illustrates the cross-section of the input port of the semiconductor optical waveguide shown in FIG. 1A in the x-y plane or a plane parallel thereto and the two-dimensional optical intensity profile of the light beam corresponding to the fundamental guide optical wave or mode at the input port.

FIG. 1C illustrates the cross-section of the output port of the semiconductor optical waveguide shown in FIG. 1A and the two-dimensional optical intensity profile of the light beam corresponding to the fundamental guide optical wave or mode at the output port.

FIGS. 3A-3C illustrate three examples of top electrodes having flared shapes (e.g. symmetric) with lateral widths that increase and decrease along the length of the electrode produced by lateral edges comprising a plurality of protrusions disposed on a rectangular active waveguide.

FIGS. 4A-4C illustrate three examples of a segmented top electrodes in aggregate having a flared shape with lateral widths that increase and decrease along the length of the plurality of electrode segments produced by lateral edges comprising a plurality of protrusions disposed on a rectangular active waveguide.

FIG. 4G illustrates cross-sectional views of an example semiconductor optical amplifier in x-y plane, and example of a tailored gain layers, included in the waveguide layer of the amplifier, in x-z plane, where the tailored gain layers have two regions with different gain properties.

DETAILED DESCRIPTION

Figure 2A:
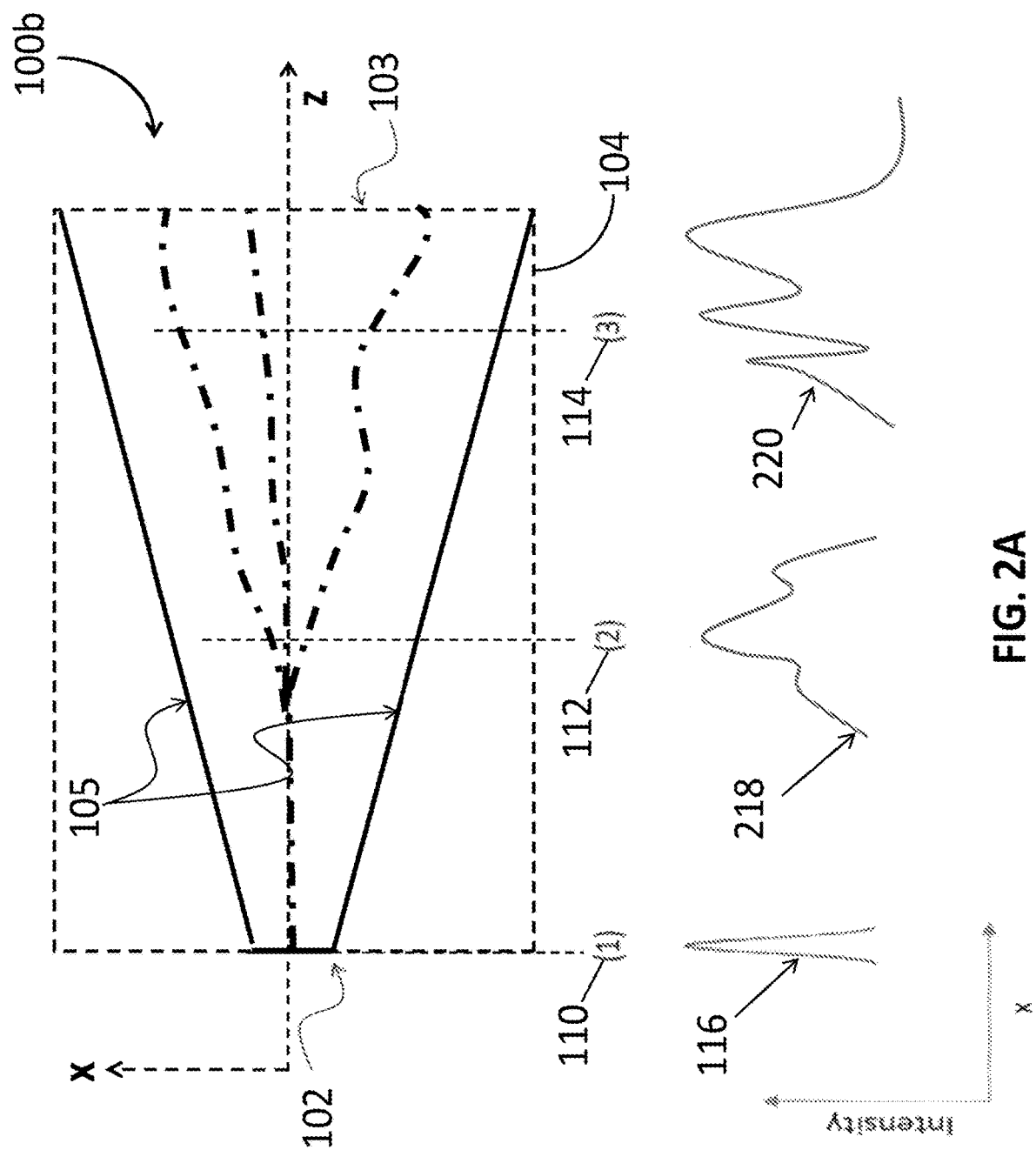
FIG. 2A illustrates the cross-sectional profile of an example semiconductor optical amplifier having a flared top electrode having linear lateral edges in the x-z plane or a plane parallel thereto and a correspondingly shaped flared optical gain profile also having linear edges, the one-dimensional (1D) lateral optical intensity profile of the light guided in the optical amplifier along z-axis (e.g., including the fundamental mode and higher order modes), as well as the trajectories of the corresponding peak intensities along the amplifier.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween. For clarity of description, "reflector" or "mirror" can be used interchangeably to refer to an optical element and/or a surface having a reflectivity greater than or equal to about 0.01% and less than or equal to 100%. For example, an optical element and/or a surface having a reflectivity greater than or equal to about 5% and less than or equal to 99%, greater than or equal to about 10% and less than or equal to 90%, greater than or equal to about 15% and less than or equal to 80%, greater than or equal to about 20% and less than or equal to 70%, greater than or equal to about 30% and less than or equal to 60%, or any value in any range/sub-range defined by these values can be considered as a reflector or mirror. It will be understood that when a first profile or a first distribution is referred to herein as being "matched" to a second profile or second distribution, a difference between a shape of the first and the second profiles or distributions at any point along a line or a boundary corresponding to the profile or distribution may be equal to or less than 0%, 0.1%, 0.5%, 1%, 2%, 5%, 10%, or 20% or any range formed by any of these values.

Introduction

Semiconductor lasers and optical amplifier are widely used in many applications ranging from telecommunications to sensing, medical applications, and optical pumping (e.g., pumping other laser mediums or amplifier mediums) to name a few. In some cases, the optical amplifier may be an optical amplifier in a master oscillator power amplifier (MOPA) device, where the master oscillator is a laser having an output comprising a single lateral mode. In some examples, the single-mode laser oscillation occurs within a ridge waveguide laser section (the master oscillator section) and the laser light output by this section is then injected into the optical amplifier.

A semiconductor laser or a semiconductor optical amplifier can comprise an active waveguide having an optically active layer. At least part of the active waveguide may have optical gain to enable amplifying a light (e.g., an optical beam or wave) guided in the active waveguide and having a wavelength within the corresponding optical gain spectrum. A semiconductor laser may further comprise a laser cavity formed by two reflectors configured to sustain laser oscillation. At least a portion of the active waveguide may be disposed within the laser cavity.

To achieve high level of optical power output by the laser or the optical amplifier, at least a mode expansion region of the active waveguide may be included. The mode expansion region may have a width that increases to support expansion of the optical light (e.g., beam or wave) guided by the active waveguide. Such beam expansion may be due to diffraction as the light propagates in the waveguide, is amplified in optical amplifier and/or sustained within the laser cavity. The expansion region of the active waveguide may have a cross-sectional area orthogonal to its length that increases in along the length of the active waveguide (e.g., along the longitudinal direction denoted herein as parallel to the z axis). In some cases, the active waveguide may be flared (or tapered when considering the opposite direction). A longer active waveguide may enable more expansion of the waveguide and the beam resulting in higher output power. The expansion region of the active waveguide may support multiple transverse optical modes in the lateral direction (direction parallel to x axis) at the one or more optical wavelengths. In some cases, the mode expansion region of the active waveguide may be pumped using a top electrode that generates a uniform current density and therefore uniform gain across the mode the expansion region. In some cases, a top electrode may be a conductive layer (e.g., a metallic layer). Because the guided light (e.g., optical beam or wave) is free to expand as it is amplified in the expansion region, the peak intensity of the wave may be much lower than that of guided light amplified by an active waveguide without an expansion region, for example an active region having a lateral width configured to support a single lateral mode. Reducing the peak light intensity in the waveguide promotes good reliability as the active waveguide is not subjected to as extreme intensities. The expansion region of the active waveguide increases the active cross sectional area, resulting in reduction of the thermal resistance of the active waveguide and therefore the temperature of the waveguide allowing for much higher power extraction during amplification or laser oscillation. In a uniformly pumped mode expansion region, the ability to scale the power of the fundamental lateral mode (e.g., the Gaussian mode) while maintaining single lateral mode performance, can be limited by the stability of the fundamental lateral optical mode in the presence of amplification. In the uniformly pumped mode expansion region, the high intensity and low intensity portions of the fundamental mode (having a bell-shaped optical distribution in the lateral direction) affect the optical gain and hence carrier density differently. This causes an uneven distribution of the saturated gain profile along the lateral direction, which can result in excitation of higher order lateral modes and aberrations. Such uneven amplification results in excitation of higher order lateral modes and, in some cases, an asymmetric optical intensity distribution in the lateral direction with respect to the peak intensity. In a uniformly pumped mode expansion region, the stability of the fundamental lateral optical mode may be further limited by longitudinal current crowding effects arising from asymmetry of the optical intensity and temperature along the length of the laser. This effect results in filamentation associated with lasing and/or amplification via the high-order lateral modes and degrades the quality of the resulting output optical wave (e.g., an output optical beam) and reduces the power efficiency of the device. As such, flared lasers, flared optical amplifiers and MOPA devices having a uniformly pumped flared optical amplifier, are susceptible to several effects that can cause optical aberrations (or distortions) in the output beam, reducing the beam quality of the device in a slow axis direction (e.g., lateral direction) and reducing the efficiency with which optical power can be delivered to a target in the far-field. The poor overlap of the amplified fundamental mode with the uniformly pumped gain region can also contribute to lower power conversion efficiency. When the optically active layer of the active waveguide is uniformly pumped by injecting current injected through an electrode having a uniform shape and width, such as a rectangularly shaped electrode or a flared electrode having lateral edges that are straight, the resulting uniform injection current profile may promote gain saturation near the peak intensity while allowing the carrier density and therefore optical gain variation near the low intensity portion of the light wave as the light wave is amplified in the active waveguide.

One possible use of the design concepts discussed herein can be to reduce or eliminate such degradation (e.g., excitation of high order lateral modes during optical amplification and/or reduction of the electrical to optical conversion efficiency) by providing an injection current profile that is well-matched to the lateral optical intensity profile of the guided optical wave propagating in the active waveguide of a laser or an optical amplifier. By matching the injection current profile (e.g., the two dimensional profile in a plane parallel to propagation direction of light) inside the active layer to the optical intensity profile of the guided optical wave (e.g., having a fundamental lateral profile) in the expansion region of the active waveguide, the onset of beam filamentation and other effects that can degrade the quality of the output beam is reduced or eliminated. An injection current profile matched to that of the optical intensity profile of the guided optical wave, amplifies different portions of the guide optical wave with the same rate and therefore maintains the shape of the corresponding lateral optical intensity distribution. A flared, or tapered, electrode having an angle that is matched to the natural diffraction angle of a guided optical wave injected the active waveguide may be judiciously patterned to generate the injection current profile that supports amplification of the guided optical wave without changing or limiting the change of its optical intensity distribution in the lateral direction resulting in a diffraction limited output beam. In various implementations, a laser, a MOPA device or an optical amplifier that employs the disclosed designs (e.g., tailored electrode, tailored ion implantation, tailored dielectric layer, tailored gain layer), may output a diffraction limited optical beam having an optical power at least or larger than 20 mW, at least or larger than 30 mW, at least or larger than 30 mW, at least or larger than 50 mW, at least or larger than 100 mW, at least or larger than 500 mW, at least or larger than 600 mW, at least or larger than 750 mW, at least or larger than 1 W, at least or larger than 2 W, at least or larger than 5 W, at least or larger than 20 W, at least or larger than 30 W, at least or larger than 40 W, or at least or larger than 50 W or more or any range formed by any of these values for some designs although the optical power may be outside these ranges in some implementations. In some implementations, a laser, a MOPA device or an optical amplifier that employs the disclosed designs (e.g., tailored electrode, tailored ion implantation, tailored dielectric layer, tailored gain layer) and is operated in a pulsed mode (e.g., driven by a pulsed current source), may output a diffraction limited optical beam and optical power at least or larger than 1 W, at least or larger than 10 W, at least or larger than 20 W, at least or larger than 50 W, at least or larger than 70 W, at least or larger than 100 W, at least or larger than 120 W, or at least or larger than 150 W, or any range formed by any of these values for some designs although the optical power may be outside these ranges in some implementations.

In some implementations, the two or more lasers that employ the disclosed designs (e.g., tailored electrode, tailored ion implantation, tailored dielectric layer, tailored gain layer) may be integrated as a laser bar or used in a laser array. The combined plurality of laser (e.g., coherently or incoherently combined), may output an optical power at least or larger than 100 W, at least or larger than 500 W, at least or larger than 1 kW, at least or larger than 2 kW, or at least or larger than 150 W, or any range formed by any of these values for some designs although the optical power may be outside these ranges in some implementations.

Semiconductor Optical Amplifier with Tailored Top Electrode

As discussed above, the shape of the electrode may influence the quality of the optical beam. Accordingly, various shape electrodes may be used in different designs to accommodate the particular waveguide shape such as flared shape. FIG. 1A illustrates the cross-sectional profile of a semiconductor optical waveguide 100a in x-z plane, and the lateral optical intensity distribution of light corresponding to a fundamental guided optical wave or optical mode 106b (e.g., a Gaussian mode) propagating in the semiconductor optical waveguide 100a along z-axis. In some implementations, the semiconductor optical waveguide 100a may be a semiconductor optical active region that is doped but is not activated (not pumped) and therefore does not provide optical gain. For example, the semiconductor optical waveguide 100a may comprise a semiconductor optical gain material capable of providing optical gain within a target amplification spectral region, upon on being pumped (e.g., using an injection current).

In some cases, the semiconductor optical waveguide 100a may comprise a flared optical waveguide 107 that is extended in a longitudinal direction (e.g., along z-direction) between an optical input port 102 and an optical output port 103 and increased in lateral width with position along the longitudinal direction. (The optical waveguide 107 may also be considered tapered in the opposite direction.)

Although various implementations described herein comprise flared waveguides, in some designs the waveguide need not be flare. In some cases, for example, the semiconductor optical waveguide 100a may comprise a rectangular (possibly square) optical waveguide 101 extended in the longitudinal direction between the optical input port 102 and the optical output port 103.

In either case, the waveguide 107 (or 101) may be configured to support propagation of light guided therein such as guided optical waves or modes that are at least confined along a vertical direction (e.g., in a direction parallel to the y-axis). The optical input port 102 may be configured to receive input light such as an input optical beam (e.g., optical input wave) and enable its propagation in the waveguide 107 (or 101) as a guided optical wave or guided light. The optical input wave may have an input wavelength within the target amplification spectral region. The input wavelength may be from 300 nm to 550 nm, 600 nm to 800, 800 nm to 1000 nm, 1000 nm to 1500 nm, 1500 nm to 2000 nm, 2000 nm to 2500 nm, 2500 nm to 3000 nm or any other range formed by any of these values or may be outside these ranges.

The optical input light or wave may be coupled into the waveguide 107 (or 101) via the input port 102, and transformed to guided light (e.g., the guide optical wave). The guided light/guided optical wave may be coupled out of the waveguide 107(101) via the output port 103. The light coupled out of the waveguide may be referred to as output light or the output optical wave.

Prior to entering the waveguide 107 (or 101), the input light may comprise a free-space optical beam or another guided beam (e.g., provided by another optical waveguide or by a laser). The input light may comprise an input beam having a wide range of cross-sectional optical intensity profiles (e.g., beam profiles) and a cross-sectional area larger, equal or smaller than a cross-sectional area of the input port 102. In various implementations, a lateral optical intensity distribution of the input beam may be symmetric or asymmetric with respect to an axis of symmetry of the waveguide 107 (or 101). The optical output port 103 may be configured to output the light guided within the waveguide 107 (or 101) as an output beam or output light or output optical wave. In some cases, upon exiting the flared structure, the output light can be a free-space optical beam or another guided optical wave or guided light (e.g., propagating in another waveguide). In some cases, the free-space optical beam exiting the waveguide 107 (or 101), may be a diffraction limited optical beam (e.g., a Gaussian beam). In some cases, the waveguide 107 (or 101) may include a gain layer configured to provide optical gain to the guided light or beam or guided optical wave upon being electrically or optically pumped. In various implementations, the wavelength of the guided optical light (e.g., wave) and the output light (e.g., wave), may be equal to the input wavelength of the corresponding input light (e.g., wave).

In various implementations, the input port 102 may comprise an input facet and the output port 103 may comprise an output facet. In some cases, the input facet and/or the output facet may be coated with an antireflection (AR) layer or coating configured to reduce reflection of light having a wavelength close or equal to the input wavelength. For example, the AR coating may reduce reflection of the input optical wave at the input port 102 and the reflection of the guided optical light/wave at the output port 103. Advantageously, such AR coatings may improve optical power transfer between the input optical wave and the guided optical wave, and the optical power transfer between the guided optical wave and the output optical wave. In some cases, the AR coating or layer may comprise a plurality of sublayers (e.g., dielectric sublayers). In some implementations, the AR layer comprises a plurality of first and second sublayers of different materials repeated multiple times so as to provide a plurality of sublayers with alternating refractive indices. In some cases, the AR layer may be configured to reduce reflection of the input facet and/or output facet for light having a wavelength in a wavelength range around the input wavelength to 10% or less, to 5% or less, to 1% or less or any range formed by any of these values or may be outside these ranges. The wavelength range can be 10 nm or more, or 50 nm or more, or 100 nm or more or may be from 10 nm to 50 nm or 50 nm to 100 nm or 10 nm to 100 nm or may be larger or smaller.

The semiconductor optical waveguide 100a may be configured to confine the guided light or guided optical wave along a vertical direction (e.g., along a direction parallel to the y-axis) perpendicular to the longitudinal and a lateral direction (e.g., along a direction parallel to the x axis), and allow its free propagation along the longitudinal direction (e.g., along a direction parallel to the z axis) and expansion along the lateral direction. The longitudinal, lateral and vertical direction may be perpendicular to each other forming a rectilinear coordinate system (e.g., illustrated by x, y, and z axes various of the figures). In some cases, the semiconductor optical waveguide 100a may be configured to support a single fundamental optical mode along the vertical direction, at the input wavelength. The fundamental optical mode along the vertical direction may be referred to herein as a "fundamental thickness mode". In some cases, the semiconductor optical waveguide 100a may be configured to support a plurality of transverse modes along the lateral (also referred to as lateral modes) direction at the input wavelength. A transverse mode(s) along the lateral direction may be referred to herein as a "lateral mode(s)". In some cases, at least a portion of the semiconductor optical waveguide 100a along the longitudinal direction may support the plurality of lateral modes. An optical field distribution and corresponding optical intensity distribution of the guided light/optical wave propagating in the semiconductor optical waveguide 100a may depend at least in part on an optical field distribution (or optical intensity distribution) of the light/optical wave received by the input port 102.

In some examples, the flared optical waveguide 107 may have a width along the lateral direction (parallel to x axis) and a thickness along the vertical direction. The width of the flared waveguide 107 may vary (e.g., increase) along the longitudinal direction. For example, the width of the flared waveguide 107 may increase linearly or nonlinearly in size from the input port 102 to the output port 103. In the example shown in FIG. 1A, the width of the flared waveguide 107 increases linearly in size from the input port 102 to the output port 103. In some examples, the flared waveguide 107 may have a width along the lateral direction that allows free (unbounded) expansion of a guided optical wave in the lateral direction (e.g., along a direction parallel to the x-axis) as the light propagates from the input port 102 to the output port 103. For example, in some implementations, the light input through the input port 102 may propagate from the input port 102 to the output port 103, expanding in the lateral direction without being reflected from the lateral sidewalls of the waveguide 107 (or 101). The width of the flared waveguide 107 may be configured to support a plurality of lateral modes at least in a longitudinal portion of the flared waveguide 107. In some examples, the width of the flared waveguide 107 may further confine the guided optical wave along the lateral direction (e.g., direction parallel to the x-axis).

In various implementations, the width of the flared waveguide 107 at the input port 102 may be from 0.1 to 0.5 microns, from 0.5 to 1.0 microns, from 1.0 to 5.0 microns, from 5.0 to 20.0 microns, or from 20 to 500 microns or any range formed by any of these values or may be larger or smaller. In some implementations, the width of the flared waveguide 107 at the output port 103 may be from 1 to 10 microns, from 10 to 50 microns, from 50 to 250 microns, from 250 to 1000 microns, or from 1000 to 20000 microns or any range formed by any of these values or large or smaller.

Similarly, in some examples, the rectangular waveguide 101 may have a thickness along the vertical direction and a width along the lateral direction that allows free (unbounded) expansion of a guided optical wave in the lateral direction (e.g., along a direction parallel to the x-axis) as the light propagates from the input port 102 to the output port 103. For example, in some implementations, the light input through the input port 102 may propagate from the input port 102 to the output port 103, expanding in the lateral direction without being reflected from the lateral sidewalls of the waveguide 101. The width and the thickness of the rectangular waveguide 101 may be constant along the longitudinal direction. In some examples, the width (e.g., constant width) of the rectangular waveguide 101 may be configured to support a plurality of transverse modes (e.g., lateral modes). The width of the rectangular waveguide 101 may be from 0.1 to 0.5 microns, from 0.5 to 1.0 microns, from 1.0 to 5.0 microns, from 5.0 to 20 microns, or from 20.0 to 500 microns or any range formed by any of these values or large or smaller.

The thickness of the flared waveguide 107 and the rectangular waveguide 101 may be constant with distance along the lateral and the longitudinal directions. In some examples, the thickness of the flared waveguide 107 and the rectangular waveguide 101 may be configured to support a single mode in the vertical (e.g., the "fundamental thickness mode"). The thickness of the flared waveguide 107 and the rectangular waveguide 101 may be from 0.1 to 1.0 microns, from 1.0 to 10 microns, from 10 to 100 microns, from 100 to 500 microns, or from 500 to 1000 microns or any range formed by any of these values or large or smaller.

In the absence of optical gain, the waveguide 107 (or 101) may support propagation of a guided optical wave having an optical intensity profile associated with a fundamental lateral mode of the waveguide. Such an optical intensity profile of the guided optical wave may, for example, comprise an optical intensity distribution of the optical wave in a plane parallel to x-z plane (e.g., a plane passing through the middle of the thickness of waveguide 101 or 107). The waveguide 107 (or 101) may enable free expansion of such guided optical wave in the lateral direction. In some examples, the width of the flared waveguide 107 may increase from the input port 102 to the output port 103 at a rate substantially equal or larger than a rate at which a width of optical intensity distribution associated with the fundamental guided optical wave increases when the wave propagates in the longitudinal direction. In some examples, the flared waveguide 107 may have a flare angle 108 (θ) matched to, at least as large as, or larger than a natural diffraction angle 109 (φ) of the fundamental guided optical mode in the lateral direction. The natural diffraction angle 109 (φ) may be controlled by a size (e.g., width) of the optical input port 102 or a lateral profile of the optical input wave; as such the flare angle 108 (θ) may be selected based on a size (e.g., width) of the optical input port 102 or a lateral profile of the optical input wave. In some cases, the waveguide 107 (or 101) may support propagation of a fundamental guided optical wave having an optical intensity profile associated with the fundamental thickness mode as well as the fundamental lateral mode of the waveguide 107 (or 101). In some cases, the waveguide 107 (or 101) may support propagation of guided optical waves having an optical intensity profile associated with a higher order lateral modes of the waveguide or a superposition of two or more lateral modes of the waveguide.

FIGS. 1A-1C illustrate the propagation of the fundamental guided optical wave in the semiconductor optical waveguide 100a along z-axis. The fundamental guided optical wave may be associated with an input optical wave that is launched into the semiconductor optical waveguide 100a via the optical input port 102 located at a first position 110 along z-axis. The cross-sectional optical intensity profile 106a of the input optical wave in the plane orthogonal to the length of the waveguide (e.g., parallel to the x-y plane), which is shown in FIG. 1B, may be associated with the fundamental lateral mode of the waveguide 107 (or 101) and may have a peak optical intensity less than a threshold optical intensity. The threshold optical intensity may be the intensity associated with the onset of one or more nonlinear optical interactions between the guided optical wave and the waveguide material. The fundamental guided optical wave may propagate along the length of the waveguide 107 (or 101) parallel to the z-direction as it freely diffracts in the lateral direction (e.g., parallel to the x direction). As discussed above, in various implementations, the flare of the waveguide may be such that the waveguide has sufficient width to accommodate the unbounded diffraction and expansion of the beam. FIG. 1C illustrates the cross-section of the output port of the semiconductor optical waveguide shown in FIG. 1A and the corresponding optical intensity profile 106c of the fundamental guide optical wave in the plane orthogonal to the length of the waveguide (e.g., plane parallel to the x-y plane). As shown in FIG. 1C, the optical intensity profile of the fundamental guide optical wave is expanded in the lateral direction due to diffraction.

The fundamental guided optical wave or a guided optical wave having an optical intensity profile associated with a fundamental lateral mode of the waveguide, may have a width, for example, a full-width-half-maximum (FWHM) width of the corresponding lateral optical intensity distribution at each position along z-axis. For example, the width of the guided optical wave 106b at a first position 110 (corresponding to the input port 102), a second position 112, and a third position 114 along z-axis, which may be the FWHM of the corresponding transverse (e.g., lateral) optical intensity distributions 116, 118 and 120, respectively, are shown at the bottom of FIG. 1A. As such, the optical intensity profile of the fundamental guided optical wave may be characterized by the locations of the half-maximums of the corresponding transverse or lateral optical intensity distribution. In the example shown in FIG. 1A, the optical field profile of the fundamental guided optical wave 106b and its corresponding width is depicted by two doted-dashed lines. The width 122 of the fundamental guided optical wave 106b at the second longitudinal position 112 may, for example, be the FWHM of the optical intensity distribution 118 although the width may correspond to other widths such as widths at 10%, 20%, 30%, or 40% of the peak of the optical distribution.

As shown in FIG. 1A, the lateral optical intensity distribution of the fundamental guided optical wave 106b, at any point along the length of the waveguide (e.g., the z-axis or lines parallel thereto), may in various implementations be symmetric with respect to the centerline (e.g., z-axis) through the input 102 and output 103 ports and/or the waveguide and may have a bell-shaped distribution in the orthogonal direction (e.g., along a direction parallel to the x-axis). In some cases, the bell-shaped distribution may be a Gaussian distribution. In some cases, the bell-shaped distribution may be a sinusoidal distribution or other distributions that are symmetric with respect to the centerline or the axis of symmetry of the waveguide (e.g., z-axis). In the absence of optical gain and nonlinear optical effects, the fundamental guided optical wave may maintain its bell-shaped transverse optical intensity distribution as it propagates along the length of the waveguide, e.g., along the z-axis or parallel thereto (the longitudinal direction). The peak of the corresponding bell-shaped distributions associated with different positions along z-axis may overlap with the center or centerline of the waveguide (e.g., the z-axis). As shown in FIG. 1A, in the absence of optical gain, the width of the guided optical wave may increase and its peak intensity may decrease as the finite optical power of the wave (associated with the input optical wave) spreads in the transverse or lateral direction (e.g., parallel to x axis). In some cases, optical absorption in the semiconductor waveguide may decrease the total optical power carried by the guided optical wave resulting in further suppression of the peak intensity associated with the propagation along the length of the waveguide, the longitudinal direction or the z-axis. Although in the absence of optical gain and nonlinear optical effects, the fundamental guided optical wave may maintain its bell-shaped transverse optical intensity distribution as it propagates along the length of the waveguide, this optical intensity distribution may be distorted for active waveguides with optical gain due to nonlinear optical effects.

FIG. 2A shows a semiconductor optical amplifier 100b configured to provide optical gain. The semiconductor optical amplifier 100b may comprise one or more of the structural and geometrical features described with respect to the semiconductor optical waveguide 100a. However, the semiconductor optical amplifier 100b may be an activated (e.g., electrically pumped) semiconductor optical amplifier configured to provide optical gain and amplify a guided optical wave propagating in the semiconductor optical amplifier 100b.

The semiconductor optical amplifier 100b may comprise an active flared waveguide 105 extending in the longitudinal direction (e.g., along the z-direction) between the optical input port 102 and the optical output port 103. In some other cases, the semiconductor optical amplifier 100b may comprise an active rectangular waveguide 104 extending in the longitudinal direction between the optical input port 102 and the optical output port 103. In some cases, the semiconductor optical amplifier 100b only supports a single mode in the vertical direction (e.g., the fundamental thickness mode). The active flared waveguide 105 may be an activated (pumped) flared waveguide 107 and the active rectangular waveguide 101 may be an activated (pumped) rectangular waveguide 101. In some cases, the semiconductor optical amplifier 100b may comprise an active waveguide with an arbitrary shape that confines an optical wave along the vertical direction (e.g., y-axis) and allows free or nearly free propagation of the optical wave in the lateral and longitudinal directions (e.g., along x-axis and z-axis). For example, the semiconductor optical amplifier 100b may comprise a slab waveguide extended between the optical input port 102 and the optical output port 103.

In some cases, the input port 102 and output port 103 depict longitudinal positions along the active waveguide 104, 105, or the slab waveguide at which a optical wave enters and exits the waveguide and may not be structurally distinguishable features.

In some examples, at least a portion of the active flared waveguide 105 or active rectangular waveguide 104 may provide optical gain to a guided optical wave propagating in the waveguide. The active flared waveguide 105 or active rectangular waveguide 104, may include an active gain layer that is pumped to provide optical gain to a guided wave propagating in the waveguide. In some embodiments, the gain layer may comprise a semiconductor gain material that can be pumped, for example, by injecting current through the gain layer. In some cases, the entire gain layer may be pumped to provide a spatially uniform optical gain across the waveguide (e.g., in a plane parallel to the x-z plane). In some other cases, selected regions of the gain layer may pumped to provide a spatially non-uniform gain across the waveguide (e.g., in a plane parallel to the x-z plane).

Figure 2B:
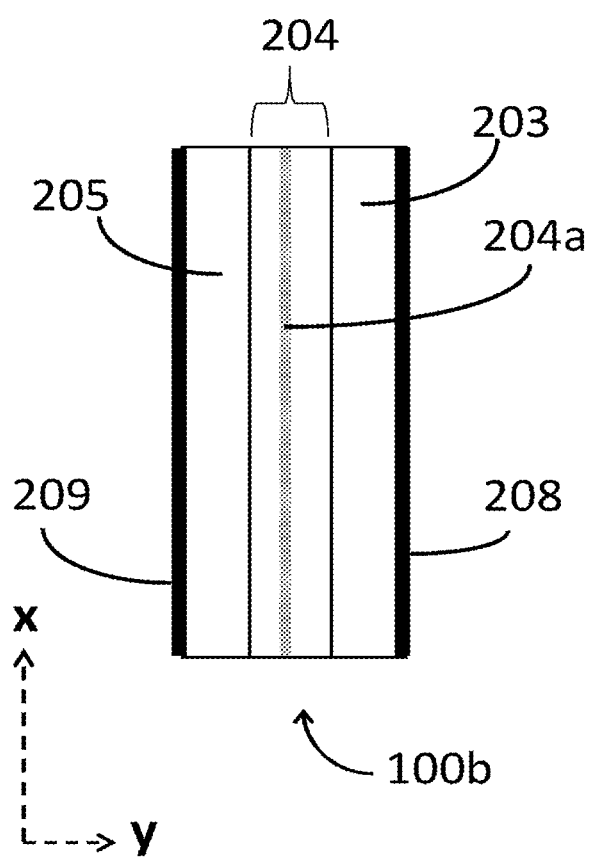
FIG. 2B illustrates an example vertical cross-section of the semiconductor optical amplifier shown in FIG. 2A in the x-y plane or a plane parallel thereto.

FIG. 2B shows a vertical cross-section (e.g., cross-section through a plane orthogonal to length of waveguide or parallel to x-y plane) of an example active flared waveguide 105 (or active rectangular waveguide 104) of the semiconductor optical amplifier 100b. In some cases, the vertical direction (y-axis) may be the growth direction of the active waveguide. In the example shown, the active flared waveguide 105 (or active rectangular waveguide 104) comprises a top layer 203, a waveguide layer 204, and a bottom layer 205. In some cases, the optical wave (e.g., the fundamental optical wave) may be vertically confined (along y axis) by in the waveguide layer 204. In some such cases, an optical refractive index of the waveguide layer 204 may be larger than the refractive index of the top layer 203 and the refractive index of the bottom layer 205. The waveguide layer 204 may include the gain layer 204a. In some cases, the top layer 203, the waveguide layer 204 and the bottom layer 205 may each comprise multiple sublayers. In some cases, the gain layer 204a may comprise one or more quantum well sublayers configured to provide optical gain upon being pumped by a current. In some cases, the gain layer 204a may include one or more quantum wire sublayers or quantum dot sublayers. In some implementations, a thickness and refractive index of the sublayers of the waveguide layer 204 may be tailored to increase the overlap between the guided optical wave and the gain layer. In various implementations, the thickness of a sublayer may be from 0.01 µm to 0.1 µm, 0.1 µm to 1 µm, 1 µm to 10 µm, 10 µm to 100 µm, 100 µm or any other range formed by any of these values or may be outside these ranges.

Figure 2C:
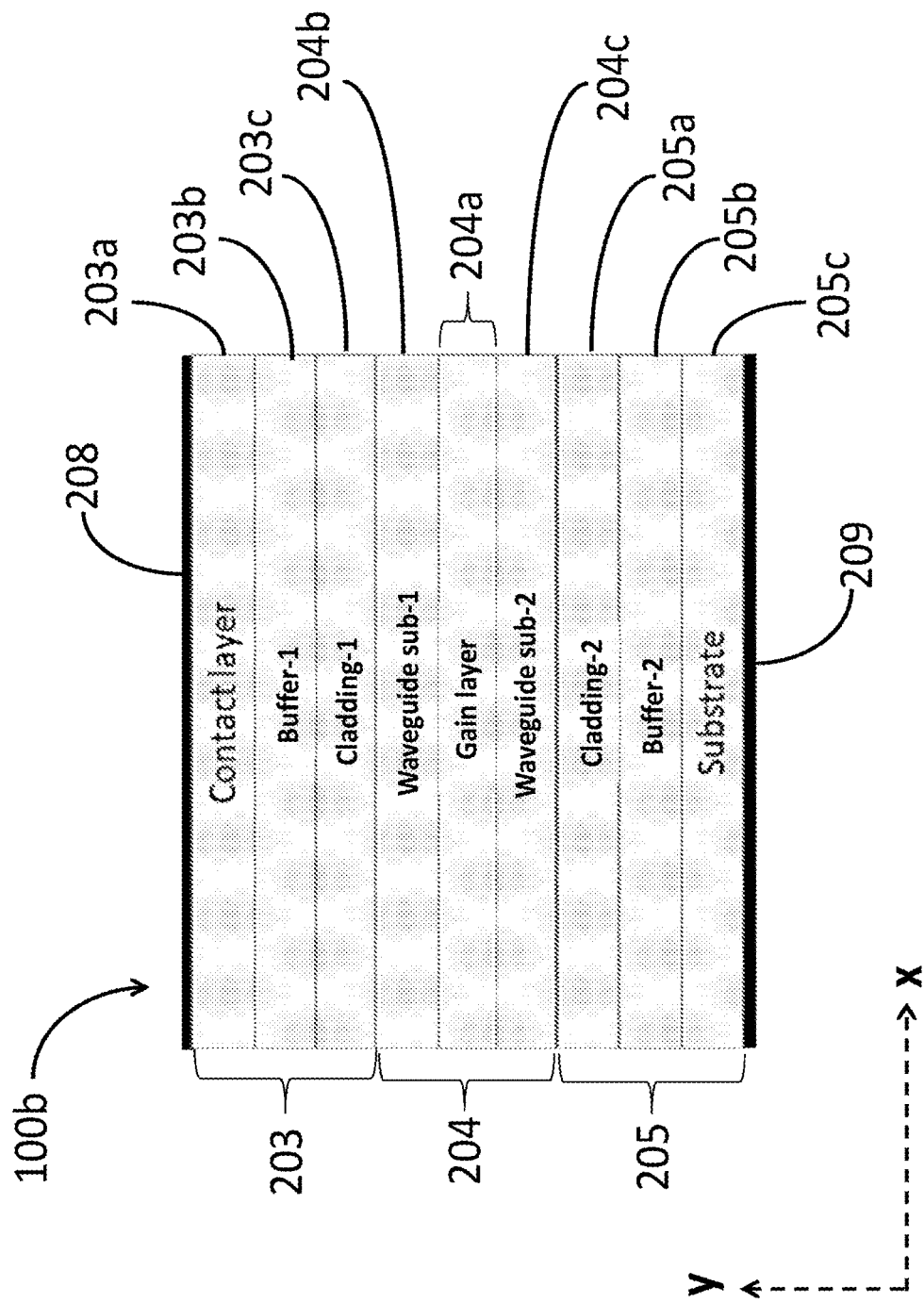
FIG. 2C illustrates another example vertical cross-section of the semiconductor optical amplifier shown in FIG. 2A in x-y plane.

FIG. 2C shows a vertical cross-section (e.g., cross-section through a plane orthogonal to length of waveguide or parallel to x-y plane) of another example active waveguide 105 (or 104) of the semiconductor optical amplifier 100b. In the example shown, the top layer 203, the waveguide layer 204 and the bottom layer 205, each comprise three sublayers. The top layer 203 comprises a contact layer 203a, a first buffer sublayer 203b and a first cladding sublayer 203c. In some implementations, the contact layer 204a can be a doped semiconductor layer (e.g., a dope p-type semiconductor material). The waveguide layer 204 comprises a first waveguide sublayer 204b, the gain layer 204a, and a second waveguide sublayer 204c. The bottom layer 205 comprises a second cladding sublayer 205a, a second buffer sublayer 205b and a substrate sublayer 205c. In some implementations, a dielectric layer may included as an additional sublayer in the active waveguide or be disposed on the top layer 203 (e.g., on the contact layer 203a). In some such implementations, this dielectric layer may be patterned to control a distribution of the current injected into the gain layer 204a.

An active region of the gain layer 204a that is activated by an injection current distributed over the active region, may provide optical gain to a guided optical wave whose optical field at least partially overlaps with the active region of the gain layer as the guided optical wave propagates in the waveguide along the length of the waveguide (e.g., along a direction parallel to the z-axis). As such, a spatial distribution of optical gain in the semiconductor optical amplifier 100b across a plane parallel to the x-z plane may be controlled by controlling a spatial distribution of the injected current in the gain layer (e.g., across a plane parallel to the x-z plane). The spatial distribution of the injected current in the gain layer 204a across a plane parallel to the x-z plane may be referred to herein as the "injection current profile".

In some cases, the top layer 203, the waveguide layer 204 and/or the bottom layer 205 may comprise semiconductor materials. In some cases, the top layer 203, the waveguide layer 204 and/or the bottom layer 205 may comprise doped semiconductor material (e.g., p-type or n-type doped semiconductor material). The sublayers in each layer may comprise different types of semiconductor materials and may have different doping levels.

In various implementations, materials used in the semiconductor optical amplifier and the layers therein comprise III-V semiconductor materials. In some implementations, the top layer 203, the waveguide layer 204 or the bottom layer 205 can include one or more materials selected from the group: gallium arsenide (GaAs), indium phosphide (InP), sapphire, silicon, or gallium nitride (GaN). In some cases, the layers or the sublayers may include binary, ternary, quaternary, and quinternary alloys formed from one or more of the following: Ga, As, In, P, N, Al, Sb The gain layer 204a can comprise one or more materials selected from the group: gallium arsenide (GaAs), Indium Gallium Arsenide (InGaAs), indium phosphide (InP), Aluminum Indium Arsenide (AlInAs), indium gallium arsenide phosphide (InGaAsP), any ternary from InGaAsP, aluminum gallium arsenide (AlGaAs), indium aluminum gallium arsenide (InAlGaAs), indium aluminum phosphide (InAlP), indium aluminum gallium arsenide phosphide (InAlGaAsP) or any other ternary, quaternary, or quinternary compound.

In some cases, the gain layer 204a may comprise one or more quantum-well sub-layers. In some cases, the quantum-well sub-layers may be configured to support quantum cascade amplification. In some cases, the gain layer 204a may comprise one or more quantum-dot sub-layers or quantum wire sublayers.

In some implementations, the bottom layer 205 can comprise one or more materials selected from the group: gallium arsenide (GaAs), indium phosphide (InP), sapphire, silicon, or gallium nitride (GaN).

In various implementations, a thickness of the top layer (in vertical direction along y axis or a direction parallel thereto) may be from 0.001 to 0.1 microns, from 0.1 to 1 microns, from 1 to 2 microns, from 2 to 4 microns, or from 4 to 6 microns or any range formed by any of these values or large or smaller.

A thickness of the gain layer (in vertical direction) may be from 0.001 to 0.1 microns, from 0.1 to 1 microns, from 1 to 2 microns, from 2 to 4 microns, or from 4 to 6 microns or any range formed by any of these values or large or smaller.

A thickness of the bottom layer (in vertical direction) may be from 0.001 to 0.1 microns, from 0.1 to 1 microns, from 1 to 2 microns, from 2 to 4 microns, or from 4 to 6 microns or any range formed by any of these values or large or smaller.

In various implementations, the material and/or composition of any of the sublayers may be selected based on the input wavelength or a target laser wavelength generated in the flared active waveguide 105. In some cases, the gain layer 204a may be composed of: GaN based material (e.g., compounds), GaAs based material, InP based material, GaSb based material, and InP based material. In some such cases, the gain layer may amplify optical waves having wavelength from 300 nm to 550 nm, from 600 nm to 1200 nm, from 1200 nm to 2100 nm, from 2100 nm to 3500 nm, from 2100 nm to 8000 nm, or any other wavelength range formed by any of these values or may be outside these ranges.

In some implementations, at any position point along the length of the waveguide (or the z-axis or a direction parallel thereto), a width of the top layer 203, the gain layer, and the bottom layer 205, establish the width/lateral dimension of the active flared waveguide 105 (or the active rectangular waveguide 104). In some other implementations, for example when the gain layer 204b is a tailored gain layer, at any position or point along the length of the waveguide (or the z-axis or a direction parallel thereto), a width of the top layer 203, and the bottom layer 205, may establish the width/lateral dimension of the active flared waveguide 105 (or the active rectangular waveguide 104).

The semiconductor optical amplifier 100b may further comprise a top electrode 208 and a bottom electrode 209 configured to inject current through the gain layer 204a. In some cases, the bottom electrode 209 uniformly covers at least a region of a bottom surface of the active waveguide associated with an optical intensity profile of the guided optical wave.

In some examples, such as example shown in FIGS. 2B and 2C, the top electrode 208 may be disposed on the top layer 203 (e.g., top surface of the top layer 203) and the bottom electrode 209 may be disposed on the bottom layer (e.g., bottom surface of the bottom layer 205). In some such examples, the top layer 203 may comprise a highly doped semiconductor material (e.g., a p-type material). Other configurations are possible. For example, one or more intermediate layers or sublayers may be included between the top electrode 208 and the top layer 203, and/or the bottom electrode 209 and the bottom layer 205. In some cases, an intermediate layer or sublayer may have low resistivity (e.g., a highly doped semiconductor layer). In some cases, an intermediate layer or sublayer may have high resistivity (e.g., a dielectric layer). In some implementations, a shape of the intermediate layer or sublayer (e.g., in a plane parallel to x-z plane), may be tailored such that a potential difference between the top electrode 208 and the bottom electrode 209 generates a desired injection current distribution (e.g., a desired injection current profile) in the gain layer 204a.

The bottom electrode 209 may be an electrically conductive layer in electrical contact with the bottom layer 205 and the top electrode 208 may be another electrically conductive layer in electrical contact with the top layer 203. In some examples, the top and bottom electrodes may comprise metal. In some examples, the top and bottom electrodes 208/209 may comprise one or more materials selected from the group: aluminum, gold, copper, tin, germanium, titanium, platinum, nickel, or any conductive alloy of these and other materials. Other materials may also be used. A thickness of any of the electrically conductive layers may be from 0.001 to 0.1 microns, 0.1 to 1 microns, from 1 to 2 microns, from 2 to 4 microns, from 4 to 6 microns, from 6 to 20 microns, or any range formed by any of these values or large or smaller. In some examples, the bottom electrode 209 may have geometrical properties (e.g., length, width, shape and the like) similar or substantially identical to the geometrical properties described above with respect to the top electrode 208.

In one example design, the top electrode 208 may be connected to a current source and the bottom electrode 209 may be connected to a ground potential to support current injection to the gain layer 204a resulting in activation of at least a region (e.g., a region containing quantum wells, quantum wires or quantum dots) of the gain layer 204a although other configurations are possible. A spatial distribution of the optical gain in the gain layer 204a across a plane parallel to x-z plane may be tailored by controlling the spatial distribution of the current injection (e.g., the injection current profile in a plane parallel to x-z plane) through the gain layer 204a. The spatial distribution of the optical gain in the gain layer 204a across a plane parallel to x-z may be referred to herein as the "optical gain profile". The plane may, for example, pass through the middle of the thickness of the gain layer 204a in some designs. A magnitude and a spatial distribution of current injected into the gain layer 204a may be controlled based at least in part on one or more of the following factors: the electrical properties of: the top layer 203, gain layer 204a, and/or bottom layer 205, a shape of the top electrode 208 and/or a shape of the bottom electrode 209.

Advantageously, as discussed herein, the optical gain profile may be controlled by tailoring the shape, area and position of the top electrode 208 and/or the bottom electrode 209. Such tailoring of one or both electrodes may affect the quality of the beam produced and output by the device.

In some implementations, the optical gain profile may be controlled by tailoring the shape of the gain layer 204a (in a plane parallel to x-z plane or perpendicular to the growth direction of the gain layer 204a). Such tailoring of the gain layer may affect the quality of the beam produced and output by the device.

In some cases, a mismatch between an optical gain profile and the optical intensity profile of a guided optical wave propagating in the activated waveguide may result in an uneven amplification of different portions of the optical field associated the guided optical wave. This un-even amplification may affect the intensity profile of the optical wave or mode (e.g., in the lateral direction) guided by the waveguide and the beam output from the amplifier.

In some cases, the bottom electrode 209 and the top electrode 208 may be configured to support a uniform injection current profile across the waveguide 105 (or 104). For example, the bottom electrode 209 may cover the entire surface of the bottom layer 205 below the active waveguide 105 and the top electrode 208 may cover the entire surface of the top layer 203 above the active waveguide resulting in a uniform optical gain profile across the flared or rectangular area of the waveguide.

A uniform optical gain profile in the lateral direction (e.g., along direction parallel to x-axis) may result in non-uniform amplification of a guided optical wave (e.g., the fundamental guided optical wave) having a non-uniform optical intensity distribution along the lateral direction. In some examples, the optical amplification may be inversely proportional to the optical intensity of the guided optical wave propagating in the active waveguide 105 (or 104). As a result, variation in the optical intensity distribution along the lateral direction (e.g., along direction parallel to x-axis) may result in non-uniform amplification and modification of the intensity distribution along the lateral direction. For example, the optical gain profile (the spatial distribution of the optical gain across a plane parallel to x-z plane and passing through the middle the thickness of the gain layer) may comprise a top-hat function with a constant value over a portion of the lateral extent of a cross-section orthogonal to the length of the waveguide (e.g., along an axis parallel to the x-axis) that overlaps with the active waveguide 105 (or 104). When a guided optical wave (e.g., having a bell-shaped lateral mode profile) propagates in such active waveguide, a high intensity portion of the corresponding optical field near centerline through the waveguide (e.g., the z-axis) may be amplified less than a low intensity portion of the optical field farther from the centerline or z-axis. As a result, the low intensity portion (the tail of the bell-shaped distribution) may grow faster causing the single-peak bell-shaped optical intensity distribution to gradually turn into a multi-peak optical intensity distribution. In other words, a lateral mode profile of the guided optical wave (e.g., the number of lateral modes contributing to the wave propagation), gradually changes from a single mode lateral mode profile to a lateral mode profile comprising a superposition of multiple high order lateral modes. In some cases, the single mode lateral mode profile may be a fundamental lateral mode profile where the guided optical wave (e.g., the fundamental guided optical wave) has a single peak bell-shape lateral optical intensity distribution (e.g., a Gaussian distribution). In some cases, the high order lateral modes may turn into narrow optical intensity filaments as the wave propagates along the waveguide. In some such cases, these filaments can be asymmetrically distributed with respect to the centerline of the waveguide or z-axis. These filaments may distort the shape of the beam propagating within the waveguide. An example of such phenomena is shown in FIG. 2A for the fundamental guided optical wave propagating in the semiconductor optical amplifier 100b having a uniform optical gain profile. In this example, the fundamental guided optical wave is launched into the semiconductor optical amplifier 100b via the optical input port 102 located at a first longitudinal position 110 (e.g., by an input optical wave having an optical intensity profile matched to that of the fundamental guided optical wave). The corresponding lateral optical intensity distribution 116 at the first longitudinal position 110, is a bell-shaped distribution (e.g., a Gaussian distribution) with a fundamental peak intensity overlapping with the centerline of the waveguide (e.g. z-axis). As the guided optical wave propagates along the centerline or z-axis, near the second longitudinal position 112, two additional intensity peaks appear between the fundamental peak and the tail portion of the bell-shaped optical intensity distribution. The resulting lateral optical intensity distribution 218, is not a bell-shaped distribution anymore and in some cases (e.g., the case shown in FIG. 2A), may be asymmetric with respect to the centerline or z-axis. In FIG. 2A, the trajectories of the intensity peaks (filaments) formed near the middle of the waveguide are shown as dotted-dashed lines. As the guided optical wave propagates from the second longitudinal position 112 to the third longitudinal position 114, the additional intensity peaks are further amplified and may become as large as (or even larger than) the main peak, resulting in a multipeak lateral intensity distribution 220.

Filamentation phenomenon, induced carrier and current density distribution effects, refractive and temperature distribution nonuniformities in the semiconductor optical amplifier 100b having a uniform gain profile, may limit the ability of the semiconductor optical amplifier 100b to maintain a single lateral mode profile (e.g., a fundamental lateral mode profile bell-shaped lateral optical intensity distribution) while amplifying a guided optical wave (e.g., the fundamental guided optical wave or a guided optical wave having a fundamental lateral mode). In some examples, therefore, the guided optical wave may have a multimode optical intensity profile in the vertical direction (along the y-axis) and a single mode optical intensity profile in the lateral direction (along-x-direction) at the input port 102. If a uniform gain profile is provided across the active waveguide, the corresponding amplified guided optical wave at the output port 103 may also have a multimode optical intensity profile in the lateral direction.

Filamentation and/or generation of multimode optical intensity profile in the lateral direction while amplifying a guided optical wave, may degrade the quality of the resulting output optical wave output by the semiconductor optical amplifier 100b via the output port 103. For example, when the output optical wave comprises a free-space optical beam, the free-space optical beam may not be a diffraction limited beam (e.g., a Gaussian beam). In some examples, a free-space optical beam output by the semiconductor optical amplifier 100b having a uniform gain profile may a have Beam Propagation Factor ($M^2$) between 1.0 and 1.5, 1.5 and 3.0, 3.0 and 100 or any range formed by any of these values or other values outside these ranges.

In some implementations, however, providing a tailored gain profile (e.g., a non-uniform optical gain profile in a plane parallel to x-z plane) across the active waveguide may enable the active waveguide to maintain a lateral optical intensity profile (optical mode profile) of a guided optical wave (e.g., a fundamental guided optical wave without higher order lateral modes) while amplifying the guided optical wave. In various implementations, the non-uniform optical gain profile may maintain lateral optical intensity profiles having symmetric or asymmetric shapes with respect to a longitudinal axis of symmetry of the active waveguide.

In various implementations, a tailored gain profile in an active waveguide may be provided by tailoring injection current provided to the corresponding gain layer or by tailoring the corresponding gain layer. In some cases, a tailored optical gain profile may have a tailored spatial distribution across the lateral direction. In some cases, a tailored optical gain profile may have a tailored spatial distribution across the longitudinal and the lateral direction. Tailoring the injection current may include tailoring a top or bottom electrode that generate and support injection current flow through the gain layer, or tailoring a layer between the top (or bottom) electrode and the gain layer. Tailoring an electrode may include tailoring a shape or thickness of the electrode. Tailoring a layer may include tailoring a shape of the layer and/or tailoring a parameter (e.g., a doping level, ion concentration level, composition, resistance, conductance, electrical impedance, and the like) that controls current flow through the layer. Tailoring the gain layer may include tailoring a shape or a thickness of the gain layer and/or tailoring a parameter that controls generation or optical gain at a given wavelength in the gain layer upon being activated by a current injection.

In some cases, a tailored optical gain profile may provide more gain to an optical wave (propagating in the active optical waveguide) having a fundamental lateral mode profile, compared to other optical waves having higher order lateral mode profiles. In some such cases, the optical waves having higher order lateral mode profiles may be suppressed as a result of receiving less optical gain along the active optical waveguide. In some implementations, a tailored optical gain profile within an active waveguide may suppress at least one lateral mode of the active waveguide. For example, the tailored optical gain profile within said active waveguide may have a spatial distribution across the lateral direction and/or the longitudinal direction so as to suppress at least one of said lateral modes. In some cases, a tailored optical gain profile may suppress a lateral mode (or an optical wave having a lateral mode profile associated with the lateral mode), by providing less gain to that lateral mode, compared to other lateral modes (or optical waves having other lateral mode profiles) such as the fundamental mode.

In some implementations, for example, the tailored optical gain profile may be a matched optical gain profile that is matched to the optical intensity profile of the guided optical wave both in the lateral and the longitudinal directions (e.g. having similar or substantially the same size, shape, and alignment with respect to the waveguide). A tailored optical gain profile may have a lateral width (e.g., along x-direction) that change along the longitudinal direction (e.g., z-axis). A rate of change of the lateral width of the tailored optical gain profile may be substantially equal to a rate of change of the FWHM of optical intensity distribution of the guided optical wave that is amplified by the active waveguide (which may be the fundamental mode). For example, at locations within the waveguide where the optical intensity is less, less optical gain may be provided while at locations within the waveguide where optical intensity is higher, more optical gain may be provided. Similarly, in various implementations, less current can be injected from the electrode into the waveguide (e.g., active layer of the waveguide) at locations where optical intensity is less or proximal thereto while more current can be injected from the electrode into the waveguide (e.g., active layer of the waveguide) at locations where optical intensity is higher or proximal thereto. In some implementations, the matched optical gain profile may be matched to the optical intensity profile of a guided optical wave having a fundamental lateral mode profile along the waveguide. In some cases, providing a matched optical gain profile across the active waveguide may mitigate the filamentation of a guided optical wave having a fundamental lateral mode profile (e.g., the fundamental guided optical wave). In some cases, a matched optical gain profile across the active waveguide may provide more gain for a lateral mode of the waveguide (e.g., the fundamental mode) compared to other lateral modes (e.g., higher order lateral modes). In some such cases, providing the matched optical gain profile across the active waveguide may suppress the lateral modes that receive less gain compared to the fundamental lateral mode. In some cases, a matched optical gain profile may be a flared optical gain profile having a flare angle substantially equal to the natural diffraction angle 109 ($\phi$) of the fundamental guided optical mode in the lateral direction.

In some implementations the matched optical gain profile may be generated by providing a matched injection current profile in the gain layer 204a that is matched to the profile of the guided optical wave along the lateral or lateral and the longitudinal directions. In some cases, a rate of change of the FWHM of the lateral current distribution of the matched injection current may be substantially equal to a rate of change of the FWHM of the optical intensity distribution of the guided optical wave propagating in the waveguide. Both the matched injection current profile and the optical intensity profile of the optical wave may be profiles in a plane parallel to x-z plane and passing through the middle of the thickness of the gain layer. With reference to FIG. 1A, in some cases a lateral current profile of the matched injection current profile, at different positions along z-axis or axis parallel thereto, may be substantially equal to the intensity profile (along the lateral direction, e.g., parallel to the x-axis) of the fundamental guided optical wave 106b. Likewise, in some cases a matched injection current profile, may have a distribution along the lateral direction (e.g., parallel to the x-axis) at different positions along z-axis or axis parallel thereto, that is substantially equal to the optical intensity profile (along the lateral direction, e.g., parallel to the x-axis) of the fundamental guided optical wave 106b. For example, a width of the lateral current profile associated with the matched injection current may increase from the input port 102 to the output port 103 with a rate substantially equal to the growth rate of the width of the fundamental guided optical wave 106b. In some cases, a difference between a current distribution of a matched injection current profile along the lateral direction (e.g., parallel to the x-axis) at different positions along z-axis, with the optical intensity profile (along the lateral direction, e.g., parallel to the x-axis) of the fundamental guided optical wave 106b, may be less than 5% of the FWHM of the optical intensity profile.

In some implementations, the tailored optical gain profile may be generated by tailoring the shape of the gain layer 204a such that an average width of the tailored gain layer in the lateral direction increases along the longitudinal direction (z-direction) from the input port 102 to the output port 103. In some cases, a width of the tailored gain section may increase and decrease multiple times with position along the longitudinal direction. In some cases, the average width of the tailored gain layer in the lateral direction may increase proportional to the width of the guided optical wave that is being amplified in the optical amplifier. In some cases, a lateral density profile of the quantum wells (or a lateral density profile of quantum dots, or quantum wires) in the gain layer 204a may be tailored. For example, at any point along the longitudinal direction, the tailored lateral density profile of the quantum wells (or a lateral density profile of quantum dots, or quantum wires) in the gain layer 204a may be substantially proportional to the lateral optical intensity distribution of the guided optical wave that is being amplified in the optical amplifier.

In some implementations, the matched injection current profile may be generated in the gain layer 204a by a matched top electrode. The matched top electrode may be obtained by tailoring a shape of the top electrode 208. For example, the matched top electrode (also referred to as tailored top electrode) may be obtained by patterning the top electrode 208 into a shape that provides a non-uniform current injection across the waveguide (e.g., waveguide 107 or 101). In some such implementations, the bottom electrode 209 may at least cover a surface region of the bottom layer 205 corresponding to an optical intensity profile of the guided optical wave having a fundamental lateral mode profile although generally the bottom electrode 209 will extend over regions of the waveguide where the optical intensity of the fundamental lateral mode is reduced or negligible. The bottom electrode 209, for example, may have the same shape and size as the waveguide (e.g., as seen from a cross-section parallel to the x-z plane). In some such implementations, the top electrode 208, however, may be tailored or patterned and/or have a shape (e.g., as seen from a cross-section parallel to the x-z plane) to provide coverage over the waveguide in a manner to provide an injection current corresponding more to the optical intensity profile of the guided optical wave having a fundamental lateral mode profile than an electrode that has the same shape and size as the waveguide. The matched top electrode and the uniform bottom electrode may support generation of a matched injection current profile in the gain layer 204a of an active waveguide for amplifying a guided optical wave having a fundamental lateral mode profile. A shape of the matched top electrode may be determined based at least in part on the optical intensity profile of the input optical wave and the corresponding guided optical wave that is amplified in the optical amplifier. The shape of the matched top electrode may be further determined based on the thickness and electric properties of the top layer 203, the gain layer 204a, and the bottom layer 205 of the active waveguide. In some implementations, the matched or tailored top electrode may have a symmetric shape having an axis of symmetry (e.g., matched to that of the guided optical wave and/or to the centerline of the waveguide and/or z axis or line parallel thereto). In some designs, the matched top electrode may have a width that alternatively increases and decreases along the longitudinal direction. Additionally, in some designs, the matched top electrode can have an average width that may vary (e.g., increase) proportional to a width of the guided optical wave that expands along the longitudinal direction.

Figure 2D:
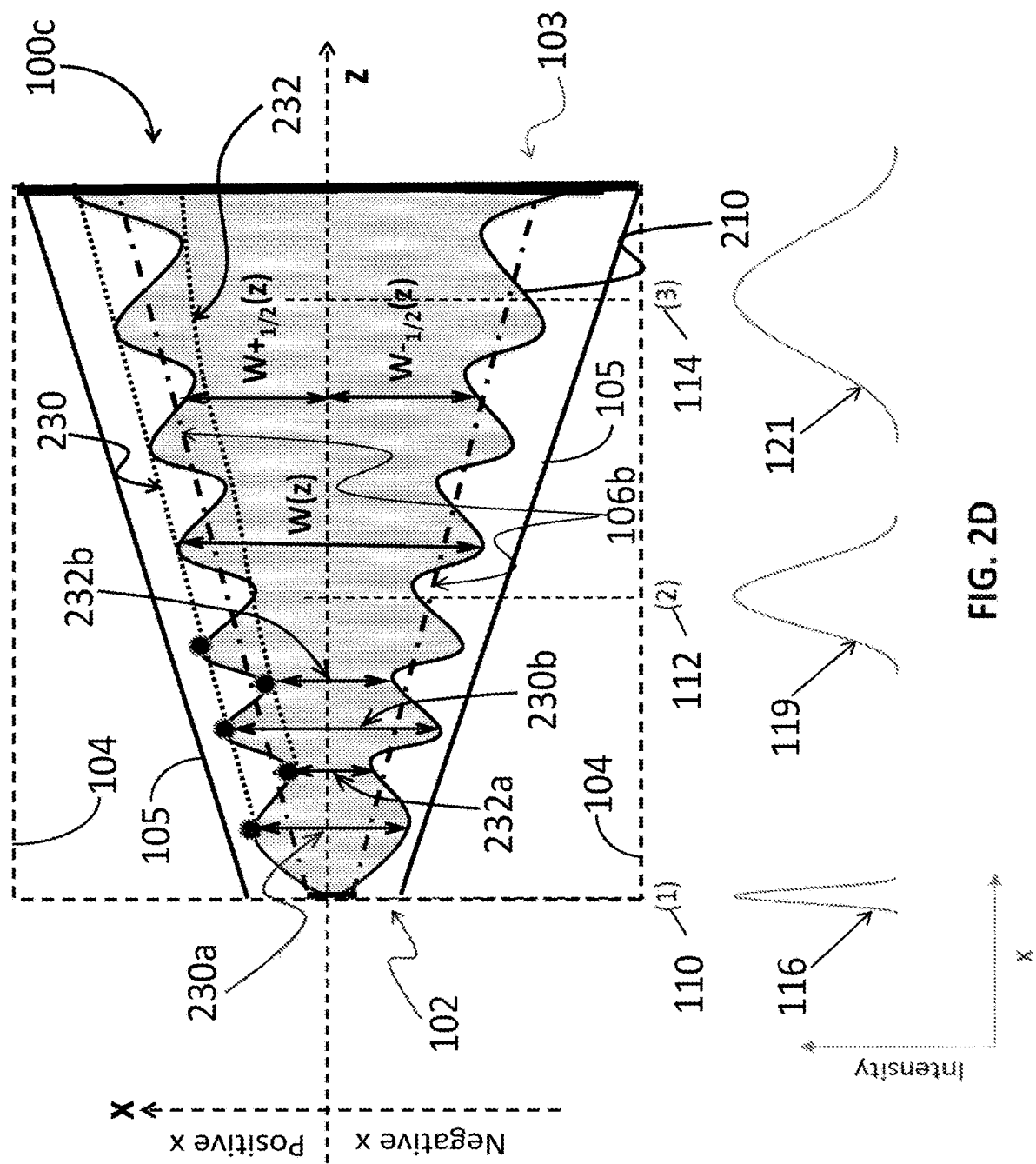
FIG. 2D illustrates a cross-sectional profile of a semiconductor optical amplifier having a flared top electrode, in the x-z plane or in a plane parallel thereto), and the lateral optical intensity profile of the light guided in optical amplifier at various locations along the z-axis, where the flared electrode has non-linear (e.g., undulating) lateral edges and the optical amplifier has a flared optical gain profile (e.g., with linear lateral edges).

FIG. 2D illustrates a cross-section along the length of the waveguide, e.g., along the x-z plane or a plane parallel thereto through the electrode having a tailored shape. This cross-sectional profile of a semiconductor optical amplifier 100c shows a tailored (e.g. top) electrode and a flared optical gain profile, and the optical intensity profile of a guided optical wave propagating and being amplified in the semiconductor optical amplifier 100c. In the example shown, the top electrode 208 comprises the tailored top electrode 210. The tailored top electrode 210 is disposed on top of the active waveguide 105 (or active waveguide 104) and extends from the input port 102 to the output port 103 along the longitudinal direction. This tailored top electrode 210 has a first end closer to the input port 102 and a second end closer to the output port 103. In various implementations, the tailored top electrode 210 has a length, and the first end of the top electrode is within 20%, 10%, 5%, 3%, 1% or 0.5% of the length from the input port or any range between any of these percentages or may be closer or farther. Similarly, in some implementations, the second end of the tailored top electrode 210 is within 20%, 10%, 5%, 3%, 1%, 0.5% of the length from the output port or any range between any of these percentages or may be closer or farther. The tailored top electrode 210 also has first and second lateral edges. In the example shown the first lateral edge may be the lateral edge located above z-axis (positivexregion) and the second edge may be the lateral edge located below z-axis (negativexregion). The electrode (e.g., the top electrode) comprises a conductive layer and is disposed with respect to the active waveguide to apply an electrical power to said active waveguide. In some cases, the tailored top electrode 210 may be disposed on the top layer 203 (e.g., for example on the contact layer 203a). In some other examples, the tailored top electrode 210 may be disposed on a dielectric layer disposed on the contact layer 203a. In some cases, the tailored top electrode 210 (e.g., a tailored top electrode) may cover only a portion of the semiconductor optical amplifier 100c along the longitudinal direction so as to tailor the current injected into the active layer. In some implementations, such as shown in FIG. 2D, the tailored top 210 electrode has a width extending in the lateral direction between the first and second lateral edges that that increases and decreases multiple times with position along the longitudinal direction. In some implementations, such as shown in FIG. 2D, one or both of the first and second lateral edges undulates in the lateral direction. In some implementations, such as shown in FIG. 2D, the electrode increases in lateral width on average from the first end to said second end of the electrode or a portion of the length from the input to the output such as 50%, 60%, 75%, 80%, 90%, 95% or any range formed by any of these values. In various implementations, the lateral width of the electrode 210 increases and decreases varying between a plurality of lower bound widths (a plurality of local minima) and a plurality of upper bound widths (a plurality of local maxima), increasing with longitudinal directions (e.g., along ±z directions) from the lower bound widths and decreasing with longitudinal direction (e.g., along ±z directions) from the upper bound widths. The result is a plurality of protrusions on the lateral edge of the electrode extending in the lateral direction. In various implementations, these protrusions can be on one or both sides of the electrode. The variations in said lateral width of the electrode 210 averaged over a distance in the longitudinal direction, that includes multiple lower bound widths (local minima) and multiple upper bound widths (local maxima) or multiple protrusions (e.g., 3, 5, 10, 15, 20, 30 on one side), produces an average width that increases (possibly progressively increases or continuously increase) with longitudinal direction from the first end to the second end of said electrode along most of the length of the electrode and/or from the input port 102 to the output port 103 or a portion of this length such at 50%, 75%, 90% or any range formed by any of these values. As shown in FIG. 2D, for example, the tailored top electrode 210 has a width W(z) in the lateral direction that alternatively changes along the longitudinal direction between a plurality of upper bound widths (e.g., 230a and 230b) and a plurality of lower bound widths (e.g., 232a and 232b). For example, the width of the tailored top electrode 210 changes from a first upper bound width 230a to a first lower bound width 232a, and from the first lower bound width 232a to a second upper bound width 230b. An upper bound width may be between 1.0 µm and 10 µm, 10 µm and 1000 µm, 1000 µm and 10000 µm. A lower bound width may be between 0.1 µm and 1 µm, 1 µm and 10 µm, 10 µm and 100 µm, 100 µm and 1000 µm, 1000 µm and 10000 µm or any range formed by any of these values or large or smaller. In some implementations, one or more (e.g., 2, 3, 4, 5, 8, 10) protrusions can extend in the lateral directions and have a length in the lateral direction that is 10%, 15%, 20%, 25%, 30%, 35%, 40% of the maximum lateral extent of the electrode (e.g., the maximum width of the electrode in the lateral direction) or any range formed by any of these values. In some implementations, one or more (e.g., 2, 3, 4, 5, 8, 10) protrusions can extend in the lateral direction and have a length in the lateral direction that is 10%, 15%, 20%, 25%, 30%, 35%, 40% of the average width of the electrode in the lateral direction or any range formed by any of these values. In some implementations, the lateral edge of the electrode (possibly both lateral edges of the electrode), including the protrusions, is smooth, or substantially smooth, or smooth over 99%, 97%, 95%, 90%, 85%, 80%, 75%, 60%, 50%, 40% thereof or any range formed by any of these values. In some implementations, the one or both lateral edges are not random or not pseudo-random. In some implementations, the shape of the electrode is not random or not pseudo-random.

In some cases, the upper bound widths (or local maxima) and the lower bound widths (or local minima) increase from the input port 102 to the output port 103. In some cases, the upper bound widths (or local maxima) increase, and the lower bound widths (or local minima) remain constant from the input port 102 to the output port 103. In some cases, an angle of the tailored electrode 210 associated with an average width of the matched top electrode may be matched to the natural diffraction angle ($\phi$) of a guided optical wave having a fundamental lateral mode profile (e.g., the fundamental guided optical wave). For example the angle of the tailored electrode 210 associated with an average width of the matched top electrode may be within 20%, 50%, 100%, 250% or 500% to the natural diffraction angle ($\phi$) of a guided optical wave having a fundamental lateral mode profile (e.g., the fundamental guided optical wave) or any range formed by any of these percentages or larger or smaller.

The width W(z) of the matched tailored top electrode 210 may change linearly or nonlinearly (e.g., sinusoidally, exponentially and the like) from an upper bound width (local maxima) to the subsequent lower bound width (local minima) or from a lower bound width (local minima) to the subsequent upper bound width (local maxima). In some examples, the shape of resulting tailored electrode between two consecutive lower bound widths may have a diamond like or triangular shape, a curved or wavy shape, or other shapes.

In some cases, the width of the tailored electrode may periodically vary along the longitudinal direction. In some such cases, a longitudinal distance between pairs of consecutive lower bound widths (or upper bound widths) may be equal to a period (also referred to as width variation period). The period can be between 0.1 µm and 1 µm, 1 µm and 10 µm, 10 µm and 100 µm, or 100 µm and 1000 µm or any range formed by any of these values or large or smaller.

In some cases, the variation of the width of the tailored top electrode along the longitudinal direction may be aperiodic. In some such cases, a longitudinal distance between positions at which sequential upper bound widths and lower bound widths occur may increase or decrease from the input port 102 to the output port 103. In some such cases, a longitudinal distance between positions at which sequential upper bound widths and lower bound widths occur may increase in a first portion and decrease in a second portion of the length of the active waveguide.

In some cases, the average width of the tailored electrode 210 may increase (possibly progressively or continuously) from a minimum average width at the input port 102 to a maximum average at the output port, where the average width corresponds to an average magnitude of the width calculated for at least one period of width variation or possibly more. The average width may for example, be determined over 3, 5, 10, 15, 20, 30 or more protrusions (local maxima) counted on one side of the electrode, or any range formed by any of these values or larger or smaller. The average width of the tailored electrode 210 may vary linearly or non-linearly from the minimum average width to the maximum average width.

In some cases, the average width of the tailored top electrode 210 may be substantially equal to the width of the guided optical wave (e.g., the FWHM of the corresponding optical intensity distribution in the lateral direction). In some cases, the average width of the tailored electrode 210 may change with a rate substantially equal to the rate at which the width of the guided optical wave (e.g., the fundamental optical wave 106b) changes along the longitudinal direction.

With continued reference to FIG. 2D, in some cases, the width of the tailored electrode 210 may be defined by two half-width functions, $W+_{1/2}(z)$ and $W-_{1/2}(z)$ functions that quantify lateral distances between the first lateral edge (in the positive×region) and the second lateral edge (in the negative×region) of the tailored top electrode 210 and the centerline through the waveguide, a longitudinal axis of symmetry of the guided optical wave and/or the active waveguide (e.g., z-axis in FIG. 2C), respectively. In some cases, $W+_{1/2}(z)$ and $W-_{1/2}(z)$ may be different functions of z. In some cases, $W+_{1/2}(z)$ and $W-_{1/2}(z)$ may be substantially the same functions of z. In some such cases, the tailored top electrode 210 may be symmetric with respect to z-axis. In some such cases, $W+_{1/2}(z)$ and/or $W-_{1/2}(z)$, each may be bound by an upper bound margin and a lower bound margin. In some cases, $W+_{1/2}(z)$ and/or $W-_{1/2}(z)$ may be a piecewise functions of z. For example, the shape of the tailored electrode 210 may be different between a first pair of consecutive lower band widths and a second pair of consecutive lower bound widths. In some cases, $W+_{1/2}(z)$ and/or $W-_{1/2}(z)$ each may be a periodic function of z oscillating between the corresponding upper bound margin and lower bound margins. The upper bound margins and the lower bound margins may be linear or nonlinear functions of z. In some examples, the upper bound margins and the lower bound margins may be linear function of z having different slopes. In some examples, the upper bound margins may be a linear function of z and the lower bound margins may be constant (does not change with respect to z). In some cases, the characteristics of the corresponding $W+_{1/2}(z)$ and/or $W-_{1/2}(z)$ functions may be determined based at least in part on the thickness and/or physical properties (e.g., electrical, thermal and optical) of the top layer, gain layer and the bottom layer of the corresponding active waveguide. In the example shown, $W+_{1/2}(z)$, that quantifies the lateral distance between the first lateral edge and the z-axis, is bound by the upper bound margin 230 and the lower bound margin 232 and oscillates between the upper bound margin 230 and the lower bound margin 232. In some cases, the upper bound margin 230 and/or the lower bound margin can be a nonlinear function of z (e.g., an exponential or a square root function).

Similarly, the lateral edges of the tailored top electrode 210 include a plurality of points corresponding to said upper bound widths (local maxima) that intersect and are bounded by an upper boundary and a plurality of points corresponding to said lower bound widths (local minima) that intersect and are bounded by a lower boundary. In some implementations, an upper boundary comprises a first straight line having a first slope. In some implementations, a lower boundary comprises a second straight line having a second slope. In some implementations, the first and second slopes are different. In some cases, first slope is higher than said second slope. In other cases, the first slope is lower than the second slope. In some designs, though, the first and second slopes are equal. In some designs, the upper and/or lower boundaries are a non-linear and may be curved (e.g., quadratically, exponentially or otherwise). Various combinations are possible. For example, the upper boundary may be nonlinear while the lower boundary is linear, or vice versa. Or both the upper and lower boundaries may be linear or both may be non-linear. In some designs, the lower boundary comprises a straight line that is parallel to the length of said electrode. Other variations and configurations are possible.

In various embodiments, applying a voltage between the tailored top electrode 210 and a uniform bottom electrode may generate an injection current profile in the gain layer (in a plane parallel to x-z plane that passed through the middle of the gain layer) that is substantially matched, correlated or corresponds with the optical intensity profile of the guided optical wave 106b (in the plane parallel to x-z plane passing through the middle of the gain layer).

In some cases, the semiconductor optical amplifier 100c with the matched optical gain profile (e.g., generated by the tailored top electrode 210), may amplify a guided optical wave initially having a fundamental lateral mode profile 116 while maintaining its original lateral optical intensity distribution or close thereto. The lateral optical intensity distribution of the fundamental guided optical wave 106b, at any position along longitudinal or z-axis (e.g., first position 110, second position 112 and third position 114), may be symmetric with respect to the longitudinal or z-axis and may have a bell-shaped distribution along x-axis or transverse direction. The peak of the corresponding bell shape distributions associated with different positions along the longitudinal axis or z-axis may overlap with the centerline of the waveguide or the z-axis. As shown in FIG. 2D, from the first position 110 to the second position 112, the initial lateral optical intensity distribution 116 changes to the lateral optical intensity distribution 119 with a larger under curve area but the same or essentially the same shape as the curve 116 (indicating that the optical power carried by the guided optical wave is increased but its lateral optical intensity distribution has not changed). Similarly, from the second position 112 to the third position 114, the lateral optical intensity distribution 119 changes to the lateral optical intensity distribution 121 with a larger under curve area but the same shape or essentially the same shape as the curve 119.

In some cases, the initial guided optical wave may be generated by coupling an input optical wave having a fundamental lateral profile (e.g., a bell-shaped of Gaussian profile) to the semiconductor optical amplifier 100c. In some other cases, the initial guided optical wave may be generated by coupling an input optical wave having an asymmetric optical intensity profile in the lateral direction (e.g., with respect to the longitudinal axis of symmetry of the optical amplifier or the z-axis). In some such cases, the initial guided optical wave may be the output of a single mode waveguide.

In some cases, the semiconductor optical amplifier 100c with the matched or tailored optical gain profile (e.g., generated by the tailored top electrode 210), may amplify a guided optical wave initially having an asymmetric lateral mode profile (e.g., with respect to z-axis), while maintaining the corresponding lateral optical intensity distribution or close thereto as it propagates in the longitudinal direction along the amplifier 100c. For example, the lateral optical intensity distribution of the optical wave, at any position along longitudinal or z-axis (e.g., first position 110, second position 112 and third position 114), may be asymmetric with respect to the longitudinal or z-axis and may have one or more peak intensities located in the positivexregion or negativexregion. In some such cases, said initial guided optical wave may be generated by coupling an input optical wave having an asymmetric lateral optical intensity profile to the waveguide 100c.

In some implementations, the tailored electrode 210 may comprise a segmented electrode with multiple electrically isolated conductive segments. In some such designs, an electric potential of a separate segment relative to the electric potential of the bottom electrode and/or other segments may be controlled separately. Advantageously, independent control of the potential or voltages of the segments of the tailored electrode 210 may enable further control over the distribution of the injected current in the gain layer and therefore the distribution of the optical gain across the active waveguide. In some implementations, an electronic system (e.g., a current supply system) may be used to apply separate voltages to the separate electrically isolated segments. The separate voltages may be applied such that the injection current profile in the gain layer 204a has a spatial distribution that varies across the lateral direction so as to suppress a lateral mode of the active waveguide. For example, the separate voltages applied by the electronic system may result in generation of a tailored (or matched) injection current profile in the gain layer 204a.

Figure 2E:
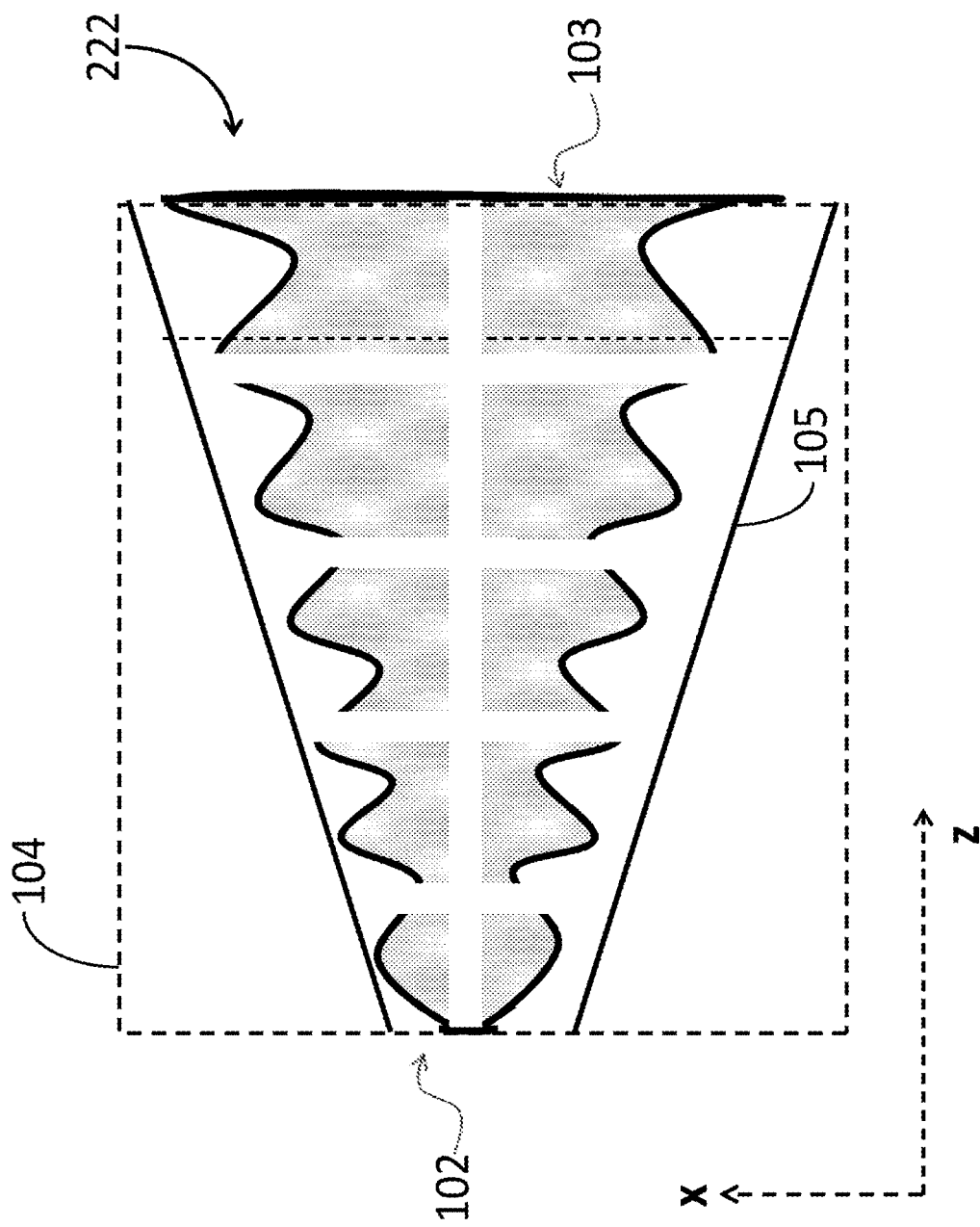
FIG. 2E illustrates a top view of a semiconductor optical amplifier having a segmented tailored top electrode with non-linear (e.g., undulating) lateral edges.

FIG. 2E shows an example of a segmented tailored electrode 222. The segmented tailored electrode 222 may be a segmented version of the tailored electrode shown in FIG. 2b. In the example shown, the electrode 222 comprises 10 electrically isolated segments. In various designs, a segmented tailored electrode may comprise 2, 4, 5, 6, 8, 10, 12, 14, 16, 18, or 20 segments or any range formed by any of these value or may include more segments in some cases. In various cases, the segments may be electrically isolated by gaps, e.g., etched through the corresponding conductive layer. In the example shown, the segmentation is symmetric with respect to the longitudinal axis of symmetry of the waveguide (e.g., z-axis); as such each segment has an identical counterpart that is its mirror image with respect to the centerline of the waveguide or z-axis. In some examples, one or more segments may have substantially equal areas. In some cases, the segmentation of the top electrode may not be symmetric with respect to the longitudinal axis of symmetry of the waveguide (e.g., z-axis). In some implementation, a plurality of the segments, possible all of the segments, are electrically connected by one or more conductive paths so as to be at a common voltage. In some designs, a plurality of the segments, possible all of the segments, are configured to be set at different voltages.

Figure 3F:
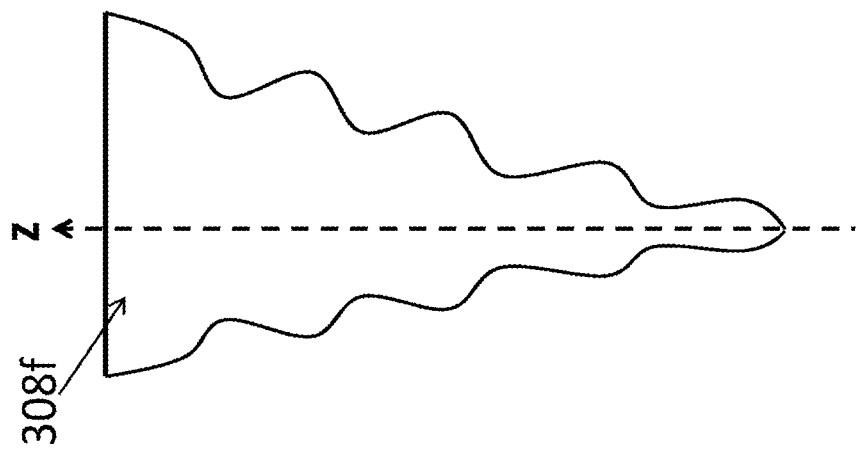
FIGS. 3D-3F illustrate three examples of top electrodes having asymmetric flared shapes with lateral widths that increase and decrease along the length of the electrode.

FIGS. 3A-3C illustrate three examples of tailored top electrodes 308a/308b/308c disposed on a rectangular active waveguide 304. The tailored top electrodes 308a/308b/308c are symmetric with respect to z-axis. In the example shown, the half-width functions, $W_{+1/2}(z)$ and $W_{-1/2}(z)$, of each of these electrodes may be substantially equal and have an absolute value of $W_{1/2}(z)$. $W_{1/2}(z)$ of the tailored electrodes 308a and 308b shown in FIGS. 3A and 3B may be a nonlinear periodic function bound by linear upper bound margins 330a/330b and a linear lower bound margins 332a/332b respectively where the slopes of the upper bound margins 330a/330b (with respect to centerline or z-axis) are larger than the slope of the lower bound margins 332a/332b. The $W_{1/2}(z)$ of the tailored top electrode 308c in FIG. 3C may be a stepwise linear periodic function bound by a linear upper bound margin 330c and a constant lower bound margin 332c. The bottom electrode associated with these matched top electrodes 308a/308b/308c may be a uniform conductive layer covering the entire area of the bottom surface of rectangular active waveguide 304 (the bottom layer 205) in some designs.

In some implementations, at least along a portion of the electrode along the longitudinal direction, the variation of W(z) from a local minimum (e.g., 232a) to a subsequent local maximum immediately after the local minimum (e.g., 230b) can be larger than 20%, 30%, 40%, 50%, 60%, 70%, 80%, or 90% of a global maximum of W(z) or the largest width of the electrode along its length or any range formed by any of these values.

Figure 3E:
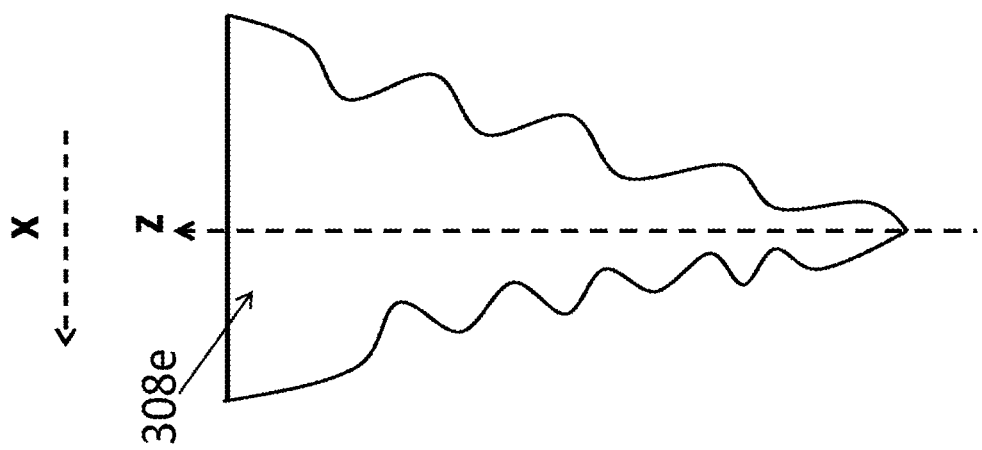
Figure 3D:
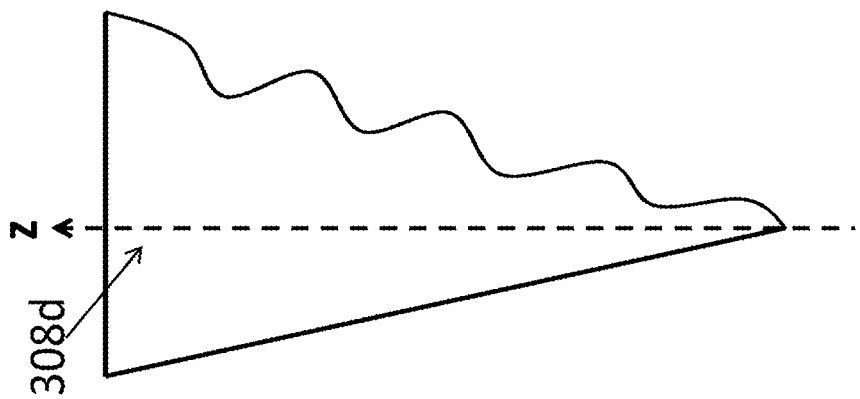

As indicated above, in some implementations, the tailored top electrode 210 may be asymmetric with respect to z-axis. FIGS. 3D-3E illustrate three examples of tailored top electrodes 308d/308e/308f having an asymmetric shape with respect to z-axis. The tailored top electrode 308d has a linear first lateral edge and undulated second lateral edge. The first and the second lateral edges of the tailored top electrode 308e are both undulated but they may be out of phase and/or have different periods. In some cases, the first lateral edge may vary periodically and the second lateral edge may vary aperiodically. The first and the second lateral edges of the tailored top electrode 308f are both undulate but their upper and lower boundaries change at different rates along the z-axis.

FIGS. 4A-4C illustrate three examples of segmented tailored electrodes 408a/408b/408c corresponding to the tailored electrodes 308a/308b/308c shown in FIGS. 3A-3C.

In some implementations, the bottom electrode 209 can be a tailored bottom electrode. In some cases, the tailored bottom electrode may have a width in the lateral direction (e.g., along x-axis) that increases and decreases multiple times with the position along the longitudinal direction (e.g., along z-axis). In some implementations, the tailored bottom electrode may be a segmented tailored bottom electrode where the voltage applied on each segment is controlled by an electronic system to generate a tailored (or matched) injection current profile in the gain layer 204a. In some examples, the tailored bottom electrode may have a shape substantially similar to the shape of the tailored top electrodes described with respect to FIGS. 2D, 2E, 3A-3F, and 4A-4C. Likewise, the discussions herein directed to the top electrode (e.g., the tailored top electrode) may equally apply to the bottom electrode (tailored bottom electrode). Similarly, the features described herein with regard to the top electrode (e.g., the tailored top electrode) may equally apply to the bottom electrode (tailored bottom electrode).

In some implementations, a tailored and/or matched optical gain profile may be provided along a semiconductor optical amplifier using a uniform top electrode disposed on a patterned material layer disposed on the top layer 203 (e.g., on the contact layer 203a). In these implementations, the patterned material layer may selectively attenuate current flow from the uniform top electrode to the gain layer 204a through the regions of the top layer 203 (or the contact layer) covered by the dielectric layer. In various implementations, the material layer can be a dielectric layer, an electrically insulating or semi-insulating layer. The uniform top electrode may be in electrical contact with a region of the top layer 203 or contact layer 203a that is not covered by the material layer. The material layer may be patterned such that the region not covered by the material layer has a shape substantially similar to the shape of the tailored top electrodes described with respect to FIGS. 2D, 2E, 3A-3F, and 4A-4C. Likewise, the discussions herein directed to the top electrode (e.g., the tailored top electrode) may equally apply to this region. Similarly, the features described herein with regard to the top electrode (e.g., the tailored top electrode) may equally apply to this region, e.g., not covered by the material layer. Other variations are possible. In some cases, a thickness of the material layer (along y-direction), may be graded. In some such cases, the material layer may have a lower thickness in a low thickness region and higher thickness in a high thickness region where the low thickness region has a shape substantially similar to the shape of the tailored top electrodes described with respect to FIGS. 2D, 2E, 3A-3F, and 4A-4C. Likewise, the discussions herein directed to the top electrode (e.g., the tailored top electrode) may equally apply to this region. Similarly, the features described herein with regard to the top electrode (e.g., the tailored top electrode) may equally apply to this region. In these cases, the thickness of the material layer may gradually change from the low thickness region to the high thickness region. Such gradual change of thickness may be generated, for example, by generating a photoresist layer having a graded thickness on top of the material layer (e.g., using photolithography and a gray scale mask), and etching the material layer via the photoresist layer.

In some implementations, a tailored and/or matched injection current profile may be provided along a semiconductor optical amplifier using a uniform top electrode disposed on an ion implanted top layer 203 (e.g., ions may be implanted in the contact layer 203a). For example, current-blocking ions may be implanted into selected regions of an implant plane perpendicular to the y-axis within a sub-layer of the top layer 203 (e.g., within a certain depth from the top surface of the top layer 203) to selectively block current flow though the selected regions. Current-blocking ions may include H+, O+, or any other molecule that increases the resistivity of the top layer or a sublayer of the top layer 203 upon implantation. For example, current blocking ions may be implanted into the contact layer 203a, first buffer sublayer 203b, or first cladding sublayer 203c.

The ion implanted regions may be selected such that a remaining portion of the implant plane, that is free of implanted ions, has a shape substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to ion implanted layers and/or regions, or regions adjacent to and/or surrounded by ion implanted regions. Similarly, the features described herein with regard to the top electrode (e.g., the tailored top electrode) may equally apply to ion implanted layers and/or regions or regions adjacent to and/or surrounded by ion implanted regions. Other variations are possible. In some cases, the remaining portion may have a boundary through which a concentration of ions abruptly changes (e.g., from zero to a given constriction). In some other cases, the concentration of ions may gradually change through the boundary between the ion implanted regions to the regions of the implant plane that are free of ions. In some implementations, a density of the implanted ions at a given depth of the top layer 203 may be graded. In some such implementations, the implant plane may include a low ion density region and a high ion density region where the low ion density region has a shape substantially similar to the shape of the tailored top electrodes described with respect to FIGS. 2D, 2E, 3A-3F, and 4A-4C. Likewise, the discussions herein directed to the top electrode (e.g., the tailored top electrode) may equally apply to ion implanted layers and/or regions or regions surrounded by ion implanted regions. Similarly, the features described herein with regard to the top electrode (e.g., the tailored top electrode) may equally apply to ion implanted layers and/or regions or regions surrounded by ion implanted regions. In these cases, the ion density may gradually change from the low ion density region to the high ion density region of the implant plane. In various implementations, a graded ion density or a gradual change of ion concentration through a boundary may be generated using a gray scale mask during the ion implantation process.

In some implementations, a depth of ion implantation (along y-axis) in the ion implanted top layer 203 may vary. In some cases, the depth of ion implantation with respect to the top surface of the top layer 203, may change along x-axis and/or z-axis. In some cases, a maximum depth of ion implantation can be tailored to control and tailor injection current distribution over the gain layer 204a. In some cases, the ion implantation depth may be graded. In some such cases, the ion implantation depth may gradually change along the lateral direction (along x-axis), from the longitudinal axis of symmetry (centerline) of the active waveguide 105 (or 104), toward the lateral edges of the active waveguide 105 (or 104). In some cases, the maximum depth of ion implantation may increase from the centerline toward the lateral edges of the active waveguide 105 (or 104). In some other cases, the maximum depth of ion implantation may decrease from the centerline toward the lateral edges of the active waveguide 105 (or 104). In some cases, the ions may be implanted deeper near the longitudinal axis of symmetry (centerline) of the active waveguide 105 (or 104), and shallower toward the lateral edges of the waveguide 104 (or 105). In some cases, the ions may be implanted shallower near the longitudinal axis of symmetry (centerline) of the active waveguide 105 (or 104), and deeper toward the lateral edges of the waveguide 104 (or 105). In some examples, ion implantation depth can be is graded such that a boundary defined by points within the top layer 203 having substantially the same ion implantation depth, or same maximum ion implantation depth, may have a shape similar to the shape of the tailored top electrodes described with respect to FIGS. 2D, 2E, 3A-3F, and 4A-4C. Likewise, the discussions herein directed to the top electrode (e.g., the tailored top electrode) may equally apply to ion implanted layers and/or regions or regions surrounded by ion implanted regions. Similarly, the features described herein with regard to the top electrode (e.g., the tailored top electrode) may equally apply to ion implanted layers and/or regions or regions surrounded by ion implanted regions.

In some cases, ions may be implanted into selected regions of the first and the second waveguide sublayers 204b/204c, and/or the gain layer. An ion implantation profile (e.g., in a plane parallel to xz-plane), or ion implantation depth in these layers may be similar to ion implantation profiles and ion implantation depths described with respect to an ion implanted top layer 203.

In some implementations, a tailored and/or matched injection current profile may be provided along a semiconductor optical amplifier using a uniform top electrode disposed on a contact layer 203a having a thickness (along y-axis) that varies from a low thickness region to a high thickness region where the thickness in the in low thickness region is lower than the thickness in the high thickness region. In some such implementations, the low thickness region and the high thickness regions may have different electrical conductivities. In these implementations, a shape of a region having higher conductivity may be substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. In some cases, the thickness of the contact layer 203a may smoothly change from the low thickness region to the high thickness region. Such smooth change of thickness may be generated, for example, by generating a patterned photoresist layer having a graded thickness on top of the contact layer 203a (e.g., using photolithography and a gray scale mask), and etching the contact layer 203a via the patterned photoresist layer.

As mentioned above, in some implementations instead of tailoring the current injected to the gain layer 204a, the gain layer 204a may be tailored such that applying an electric potential between the top electrode and a the bottom electrode, results in generation of a matched or a tailored optical gain profile. In some such implementations, the top electrode and the bottom electrode may be uniform electrodes (e.g., having shapes similar to the active waveguide) in a plane parallel to xz-plane). In some cases, a tailored or a matched optical gain profile may have a lateral distribution (e.g., along x-axis) substantially proportional to the optical intensity distribution of the lateral optical intensity distribution of the optical wave that is being amplified in the optical amplifier.

In some such implementations, the gain layer 204a may be tailored by tailoring a shape of the gain layer 204a in a plane perpendicular to the growth direction of the gain layer (e.g., the xz-plane or plane parallel thereto). The shape of the gain layer may be tailored such that an average width of the tailored gain layer in the lateral direction gradually increases from the input port 102 to the output port 103 (e.g., along the z-direction). In some cases, the tailored gain layer may be have flared shape, for example, where the average width of the tailored gain layer 204a in the lateral direction increases with (e.g., proportional to) the width (e.g., FWHM of the optical intensity distribution) of the guided optical wave that is being amplified in the optical amplifier. In some examples, the width of the optical gain layer may increase and decrease multiple times with the position along the longitudinal direction. In some such examples, the tailored gain layer may have a shape substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to these gain layers and/or regions. Similarly, the features described herein with regard to the top electrode (e.g., the tailored top electrode) may equally apply to these gain layers and/or regions. Other variations are possible. In some cases, the shape of the gain layer 204a in a plane perpendicular to the growth direction of the gain layer 204a (e.g., a plane parallel to x-z plane), may be tailored during fabrication of the optical amplifier. For example, with reference to FIG. 2C, after growing the gain layer 204a on the second waveguide sublayer 204c, the shape of the gain layer may be tailored by generating a photoresist layer (e.g., using photolithography and a mask) on the gain layer 204a and etching the regions of the gain layer 204a that are not covered by the photoresist.

In various implementations, a gap between the first waveguide sublayer 204b and the second waveguide sublayer 204c where the gain layer 204a is etched may be filled with a material similar or identical to the structural material of the first waveguide sublayer 204b or the second waveguide sublayer 204c. For example after etching the gain layer 204a to form a tailored gain layer, the second waveguide sublayer 204c may be conformably deposited on the gain layer 204a and regions of the first waveguide sublayer 204c that are not covered by the gain layer 204a, such that a top surface of the second waveguide sublayer-1 204b is planar.

In various implementations, a gap between the first waveguide sublayer 204b and the second waveguide sublayer 204c where the gain layer 204a is etched may be filled with a filler material having the same elements or similar compounds as the structural material of the gain layer 204a. For example, if the gain layer comprises GaAs quantum wells with AlGaAs barriers, the filler material may comprise AlGaAs.

Figure 4D:
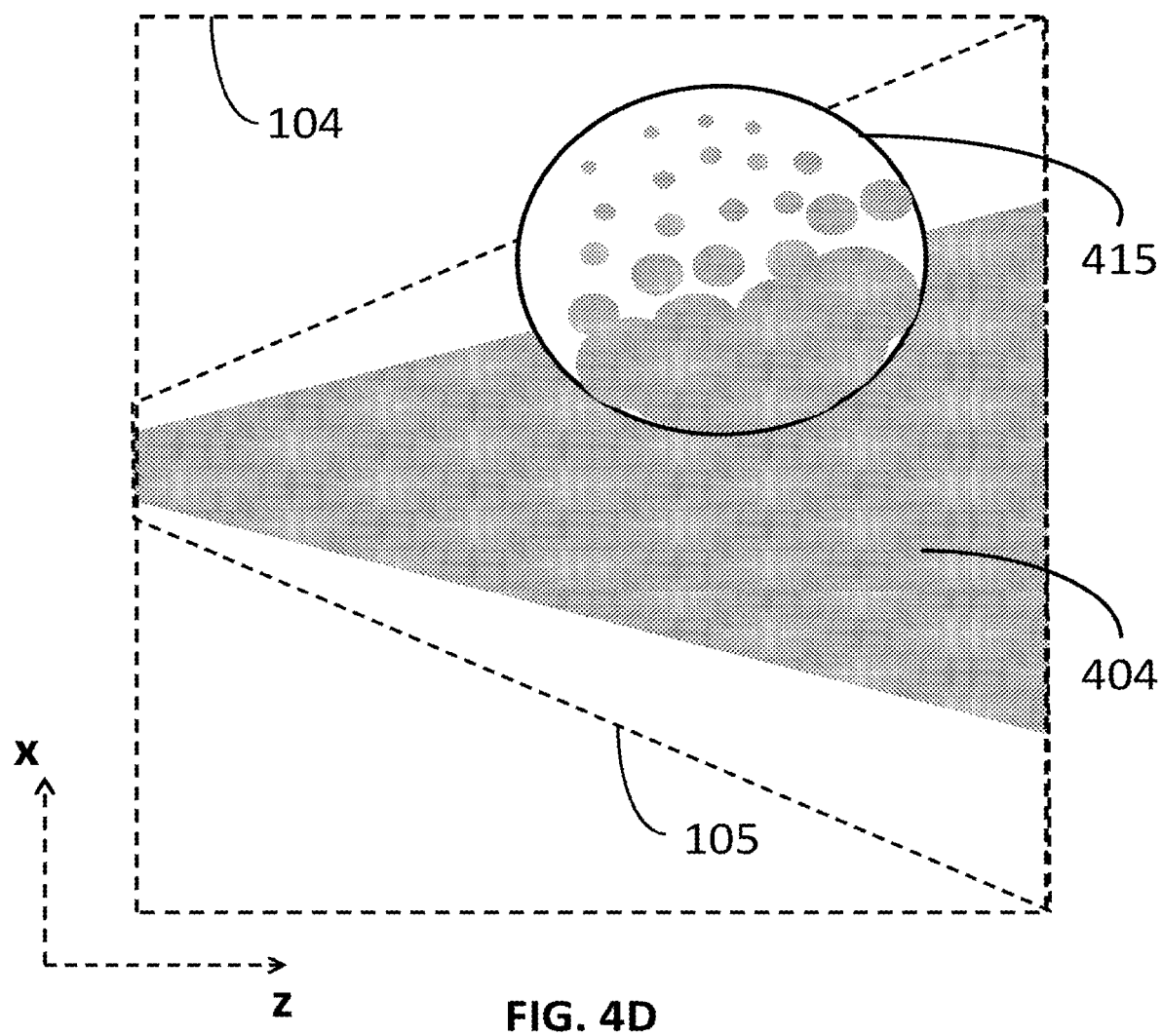
FIG. 4D illustrates cross-section of an example tailored gain layer having a flared shape with graded boundary, in the x-z plane or in a plane parallel thereto.

In some cases, the tailored gain layer may have a sharp boundary beyond which the gain layer is completely etched or removed. In some other cases, a surface coverage of the tailored gain layer may gradually decrease over a transition region. FIG. 4D shows an example of a tailored gain layer 404 having a flared shape with graded boundary. The flared gain layer of 404 may be the gain layer of the active waveguide 105 or the active rectangular waveguide 104. As shown in the close-up view 415, in this example the boundary of the gain layer 404 consists of islands distributed along the boundary of the tailored gain layer 404. A cross-sectional area of these islands may gradually decrease along the later direction (x-axis). In some cases, a width (e.g., and average width) of the flared tailored gain layer 404 may change along the longitudinal direction (z-axis) with a rate slower than that of the flared active waveguide 105. In some cases, the volume between the islands and a gap between the first waveguide sublayer 204b and the second waveguide sublayer 204c, where the gain layer 204a is etched may be filled with a filler material having the same elements or similar compounds as the structural material of the gain layer 204a. For example, if the gain layer comprises GaAs quantum wells with AlGaAs barriers, the filler material may comprise AlGaAs.

In some cases, a tailored top electrode 210 may have a graded boundary similar (e.g., geometrically similar) to the boundary described above with respect to the tailored gain layer. For example, the boundary of the tailored top electrode 210 may comprise a transition region similar to the close-up view 415 where the continuous conductive layer of the tailored top electrode 210 gradually turns into conductive islands whose size shrink proportional to a distance from a boundary of the tailored electrode 210.

In some implementations, the gain layer 204a may be tailored by tailoring a thickness (along y-axis) of the gain layer 204a across a plane perpendicular to the growth direction of the gain layer (e.g., the xz-plane). In some cases, the thickness of the gain layer 204a may gradually change (e.g., decrease) along the lateral direction (along x-axis), from the longitudinal axis of symmetry (e.g., a centerline line) of the active waveguide 105 (or 104), toward the lateral edges of the active waveguide 105 (or 104). In some such cases, a boundary defined by points in xz-plane associated with the same thickness of the gain layer may have a shape similar to the shape of the tailored top electrodes described with respect to FIG. 2D, 2E, 3A-3F, 4A-4C.

In some other implementations, the gain layer 204a may be tailored by tailoring a density of the quantum wells (or density of quantum dots or quantum wires) in the gain layer 204a. In some such implementations, a lateral density profile of the quantum wells (or density of quantum dots or quantum wires) in the tailored gain layer 204a may be tailored such that an average width of a quantum well region (or a quantum dot or quantum wire region) within the gain layer 204a gradually increases in the longitudinal direction from the input port 102 to the output port 103. In some examples, the quantum well region (or a quantum dot or quantum wire region) may comprise a region of the gain layer 204 in a plane perpendicular to the growth direction of the gain layer 204a where the density of the quantum wells (or density of quantum dots or quantum wires) is larger than a set density. In some cases, the average width of the quantum well region (or a quantum dot or quantum wire region) in the lateral direction may increase proportional to the width (e.g., FWHM of the optical intensity distribution) of the guided optical wave that is being amplified in the optical amplifier. In some examples, the width of the quantum well region (or a quantum dot or quantum wire region) may increase and decrease multiple times with the position along the longitudinal direction. In some such examples, the quantum well region (or a quantum dot or quantum wire region) may have a shape substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. In some cases, the shape of the quantum well region (or a quantum dot or quantum wire region) may be tailored during fabrication of the optical amplifier. With reference to FIG. 2C, in some such cases, after growing the gain layer 204a on the second waveguide sublayer 204c, the shape of the quantum well region (or a quantum dot or quantum wire region) may be tailored by generating a photoresist layer with graded thickness (e.g., using photolithography and a gray scale mask) on the gain layer 204a and etching the regions of the gain layer 204 that are not covered by the photoresist.

In yet other implementations, the gain layer 204a may be tailored by tailoring a shape of an active quantum well region in the gain layer 204a. The active quantum well region may comprise a region of the gain layer 204 in a plane perpendicular to the growth direction of the gain layer 204b that includes quantum wells that can amplify an optical wave having an input optical wavelength within a target amplification spectral region. In some such examples, the quantum wells not included in the active quantum well region, may not amplify optical wavelengths within the target amplification spectral region. For example, the quantum wells outside of the active quantum well region may have a bandgap different from a bandgap of the quantum wells inside the active quantum well region. In some cases, the average width of the active quantum well region in the lateral direction may increase proportional to the width (e.g., FWHM of the optical intensity distribution) of the guided optical wave that is being amplified in the optical amplifier. In some cases, the width of the active quantum well region may increase and decrease multiple times with the position along the longitudinal direction. In some such examples, the active quantum well region may have a shape substantially similar to the shape of the matched top electrodes described with respect to FIG. 2D, 2E, 3A-3F, 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. In some cases, the shape of the active quantum well region may be tailored during fabrication of the optical amplifier. With reference to FIG. 2C, in some such cases, after growing the gain layer 204a on the second waveguide sublayer 204c, the shape of the active quantum well region may be tailored by changing the bandgap of quantum wells outside the quantum well region (e.g., using quantum well intermixing process). In some examples, the active quantum well region may not have a sharp margin. I these examples, the active quantum well region may comprise a region where a ratio between the density of the quantum wells that can and cannot provide optical gain within the optical amplification spectral region exceeds a set ratio. In some such examples, the ratio between the density of the quantum wells that can and cannot provide optical gain within the optical amplification spectral region may gradually decrease from a point inside the active quantum well region to a point outside the quantum well region.

In yet other implementations, the gain layer 204a may be tailored by tailoring a shape of an intermixed region in the gain layer 204a. The intermixed region may comprise a region of the gain layer that includes quantum wells, quantum dots, or quantum wires that cannot amplify an optical wave having an input optical wavelength within a target amplification spectral region. For example, the quantum wells, quantum dots and/or quantum wires inside the intermixed region may have a bandgap different from a bandgap of the quantum wells, quantum dots and quantum wires outside of the active quantum well region. In some cases, a shape of the intermixed region in a plane perpendicular to the growth direction of the gain layer 204a may be selected such that a remaining portion of the gain layer 204a, that can amplify the optical wave having the input optical wavelength within the target amplification spectral region is substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. In some cases, an average width of the remaining portion in the lateral direction may increase proportional to the width (e.g., FWHM of the optical intensity distribution) of the guided optical wave that is being amplified in the optical amplifier. In some cases, the width of the remaining portion may increase and decrease multiple times with the position along the longitudinal direction. In some cases, the shape of the intermixed region may be tailored during fabrication of the optical amplifier. With reference to FIG. 2C, in some such cases, after growing the gain layer 204a on the second waveguide sublayer 204c, the shape of the gain layer 204a may be tailored by changing the bandgap of quantum wells, quantum dots or quantum wires in the intermixed region (e.g., using an intermixing process). In some examples, the intermixed region may not have a sharp boundary. In these examples, the active quantum well region may comprise a region where a ratio between the density of the quantum wells, quantum dots and quantum wires that can and cannot provide optical gain within the optical amplification spectral region exceeds a set ratio. In some such examples, the ratio between the density of the quantum wells, quantum dots or quantum wires that provide optical gain within optical amplification spectral region and density of those that they do not provide optical gain within optical amplification spectral region may gradually increase or decrease from a point inside the intermixed region to a point inside the quantum well region. In some cases, the intermixing process may be a post growth process that change the bandgap of selected regions of the gain layer 204a. In some other cases, an intermixed composition may be grown in the selected regions of the gain layer 204a during the growth process (e.g., using an etch-regrowth-etch process).

In some implementations, the gain layer 204a may be tailored by tailoring a strain or a composition of the quantum wells (or quantum dots, or quantum wires) in the gain layer 204a. In some cases, a strain or a composition of the quantum wells (or quantum dots, or quantum wires) in the gain layer 204a may be tailored such that when current is uniformly injected to the gain layer 204a, one or more lateral modes of the waveguide layer 204 are suppressed or receive less gain compared to the fundamental mode. In some cases, a strain or a composition of the quantum wells (or quantum dots, or quantum wires) in the gain layer 204a may be tailored such that when current is uniformly injected to the gain layer 204a the shape (e.g., the shape in the xz-plane) of a region of the gain layer that amplifies light having the input wavelength (for which the amplifier is designed), is substantially similar to the shape of the matched top electrodes described with respect to FIGS. 2D, 2E, 3A-3F, and 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions.

In some cases, a quantum well region may sublayers forming a plurality of quantum wells. In various embodiment a quantum well region may comprise: a quantum wire region having a plurality of quantum wires, and/or a quantum dot region having a plurality of quantum wires.

A voltage applied between a uniform top electrode 208 disposed on an active waveguide having: a patterned dielectric layer on the top layer 203, a patterned contact layer 203a, an ion implanted top layer 203, or a tailored gain layer (e.g., having a tailored shape, a tailored intermixed region, or a tailored density of quantum dots or quantum wires), and a uniform bottom electrode 209 may generate a tailored and or matched injection current profile in the gain layer 204a.

In some implementations, a combination of dielectric patterning, top electrode patterning, selective ion implantation, and/or gain layer patterning may be used to generate a matched injection current profile and the corresponding matched optical gain profile.

In various implementations, a semiconductor optical amplifier with a tailored and/or matched optical gain profile enabled using any of the designs described above may provide a gain between at least or larger than 1 dB at least or larger than 10 dB, or at least or larger than 20 dB or any range formed by any of these values or more for some designs. Further, an output optical beam of such semiconductor optical amplifier may be a diffraction limited optical beam (e.g., a Gaussian beam).

In various implementations, at least one gain profile parameter of one of the layers or sublayers of the semiconductor optical amplifier 100b (or 100c) between the top electrode 208 (or tailored top electrode 210), and the bottom electrode 209 may spatially vary along the lateral direction and longitudinal direction to provide a matched (or tailored) optical gain profile across the active waveguide 104 (or 105). In some cases, a gain profile parameter may comprise a parameter of a layer or sublayer that can affect the injection current profile within the gain layer when a voltage difference is generated between the top electrode 208 and the bottom electrode 209. In some cases, a layer of the semiconductor optical amplifier 100b (or 100c) may be a layer of the active waveguide 104 (or 105), or an active slab waveguide. When a voltage is applied between the top electrode 208 (or the tailored top electrode 210) and the bottom electrode 209, the spatial variation of the gain profile parameter of a layer or sublayer may result in generation of a tailored (or matched) optical gain profile and therefore suppression of one or more lateral modes supported by the active waveguide 105 (or 104) or an active slab waveguide. In some cases, the variation of the gain profile parameter along the lateral and longitudinal directions may result in generation of tailored (or matched) injection current profile in the gain layer 204a. In some cases, the gain profile parameter along the lateral and/or longitudinal direction may be tailored such that one or more lateral modes of the active waveguide 104 (or 105) receive less gain compared to the fundamental mode.

In some cases, a layer or sublayer of the semiconductor optical amplifier 100b (or 100c) may include: the top layer 203, the waveguide layer 204, or the bottom layer 205 or any layer or sublayer within these layers (e.g., contact layer 203a, first buffer sublayer 203b, the first cladding sublayer 203c, first waveguide sublayer 204b, the gain layer 204a, the second waveguide sublayer 204c, the second buffer sublayer 205b, the second cladding sublayer 205a, and the substrate sublayer 205c).

In some cases, a layer may be a layer between or within the layers or sublayers described with respect to FIG. 2B and FIG. 2C. In some cases, the layer may be formed or fabricated on or within the semiconductor optical amplifier 100b after fabricating one or more layers described with respect to FIG. 2B and FIG. 2C.

In some cases, at least a layer or sublayer of the semiconductor optical amplifier 100b (or 100c) may comprise a current control layer (e.g., an impedance layer, a current blocking layer, or a conductive layer) that selectively controls the attenuation or generation of current flow from the top electrode 208 (e.g., a uniform top electrode) to the gain layer 204a. In some cases, a current control layer may be a dielectric layer, a conductive layer, a partially conductive layer, or a resistive layer that impedes current flow from the top electrode 208 to the gain layer 204a. In some cases, an electrical impedance of the current control layer maybe tailored to provide a tailored current flow from the top electrode 208 to the gain layer 204a. A tailored current may provide a matched injection current profile to the gain layer 204a such that one or more lateral modes of the active waveguide 104 (or 105) are suppressed, or receive less gain compared to the fundamental mode.

In some implementations, a current control layer may be a semiconductor layer. In some such implementation may be a doped semiconductor layer. For example, the semiconductor layer can be a highly dope or conductive semiconductor layer.

In some cases, a current control layer may be an ion implanted layer where ions are configured to impede current flow via selected region of the ion implanted layer.

In some implementations, a current control layer may be a patterned layer with a flared shape having a width in the lateral direction that increases and decreases between the input port 102 and output port 103.

In some implementations, a current control layer may have a lateral width of that increases and decreases varying between a plurality of lower bound widths and a plurality of upper bound widths, increasing with longitudinal direction from the lower bound widths and decreasing with longitudinal direction from the upper bound widths. In some cases, the lateral width variations averaged over a distance in the longitudinal direction that includes multiple lower bound widths and multiple upper bound widths produces an average width that increases with longitudinal direction from the input port 102 and output port 103.

In some implementations, a shape of the current control layer may be determined by a vertical distance (e.g., along y-axis) of the current control layer from the gain layer 204a. For example, the difference between a lower bound width and a subsequent upper bound width may be smaller for a current control layer that is closer to the gain layer compared to that of a current control layer that is farther from the gain layer.

In some implementations, a current control layer may be a patterned layer with a flared shape having a width in the lateral direction that monotonously increases from the input port 102 to the output port 103.

In some cases, a current control layer may have a top and a bottom major surface and edges therebetween. In some such cases, at least one of top or bottom major surfaces may have an areal pattern shaped such that the optical gain profile within the active waveguide has a spatial distribution across the lateral direction so as to suppress one or more lateral modes, or to provide less gain to the one or more lateral modes compared to the fundamental mode.

In some cases, a gain profile parameter may include a width or thickness of a layer or sublayer, or patterned portion of a layer or sublayer, in the lateral and longitudinal direction. In some implementations, a gain profile parameter may vary abruptly in the lateral and/or longitudinal direction.

In some cases, a gain profile parameter may include a size (e.g., lateral size, a height, or a diameter) of one or more quantum wells, quantum wires, and/or quantum dots in the gain layer 204a. In some cases, the spatial distribution of a gain profile parameter may include a spatial distribution of quantum wells, quantum wires, and/or quantum dots within the gain layer 204a. In some cases, the gain profile parameter may include a density of the quantum dots and the quantum wires. For example, the gain profile parameter may include a surface density in a plane within the gain layer 204a parallel to the longitudinal and lateral directions. In some cases, the gain profile parameter may be a number of quantum dots or quantum wires per unit area of the plane. As another example, the gain profile parameter may include a fraction of an area (e.g., unit area) in a plane within the gain layer 204a parallel to the longitudinal and lateral directions, that contains quantum wells. For example, with reference to FIG. 4D, the gain profile parameter may be a fraction of the area in the close-up view 415 that is covered by the quantum well islands)

In some cases, a gain profile parameter may include a band gap of one or more quantum wells, quantum wires, and/or quantum dots included in the gain layer 204a.

In some cases, a gain profile parameter may include a strain of one or more quantum wells, quantum wires, and/or quantum dots included in the gain layer 204a.

In some cases, the gain profile parameter may be number of quantum wells in the gain layer 204a.

In some cases, the gain profile parameter may be a doping density or doping level of a sublayer of the gain layer. For example, the doping density of a layer from which electrons are move into a quantum well.

In some cases, a gain profile parameter may include a density or depth of ions in the ion implanted layer.

In some cases, a gain profile parameter may include a concentration of dopants in a current control layer where dopants are configured to increase conductivity.

In some cases, a gain profile parameter may be an electrical or optical property of the layer. For examples, the gain profile parameter can be a resistance, conductance, or electrical impedance of the layer, or optical absorption of the payer.

In some cases, a gain profile parameter may include a material composition of the current control layer.

In some cases, a gain profile parameter may include a bandgap of the current control layer.

In some cases, a gain profile parameter may include a density of a dopant within the current control layer.

In some cases, a gain profile parameter may include an ion or a dopant species within the current control layer.

In some cases, a gain profile parameter may be associated with a composition of a layer or sublayer. For example, a gain profile parameter may control the alloy composition (e.g., a ratio between density of two elements in an alloy). In some cases, the gain profile parameter associated with a composition of a layer/sublayer may be used to spatially vary an electrical or optical property of the layer/sublayer.

In some cases, a spatial distribution of a gain profile parameter of a layer across lateral and longitudinal directions may result in formation of a first and a second region of the layer in a plane parallel to the lateral and longitudinal direction (e.g., parallel to the xz-plane). In some cases, the first region and the second region may be identified by a boundary or a perimeter. A value of the corresponding gain profile parameter may be a constant boundary value along the boundary. The boundary value may be a value between the value of the gain profile parameter in the first and the second region. In some such cases, the first and the second regions may be non-overlapping complementary regions of the layer.

In some cases, a shape of the first or the second region may be substantially similar to the shape of the matched or tailored top electrodes described with respect to FIG. 2D, 2E, 3A-3F, 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. In some cases, the first or the second region may have a width extending in the lateral direction that that increases and decreases multiple times with position along the longitudinal direction. In some cases, the shape of the first and/or the second region may be symmetric (e.g., with respect to a longitudinal axis of symmetry of the active waveguide). In some other cases, the shape of the first and/or the second region may be asymmetric (e.g., with respect to a longitudinal axis of symmetry of the active waveguide). In some cases, a longitudinal axis of symmetry of the active waveguide can be a longitudinal centerline extending along the length of the waveguide.

In some implementations, a gain profile parameter may abruptly change from the first region to the second region. In some implementations, the gain profile parameter may gradually change from the first region to the second region over a transition region.

In some cases, the gain profile parameter may be resistance or electrical impedance of the gain layer. For example, the resistance of the first region can be smaller than that of the second region.

In some cases, a spatial distribution of a gain profile parameter across lateral and longitudinal directions may be a flared distribution having a width, extending in the lateral direction, which on average is larger closer to the output port compared to input port. In some such cases, the width may increase and decrease multiple times with position along the longitudinal direction. For example, a distribution of the thickness of the gain layer 204a may be such that a shape of the gain layer in a plane parallel to the top surface of the waveguide is a flared shape with a larger average width closer to said output port than the input port.

Figure 4E:
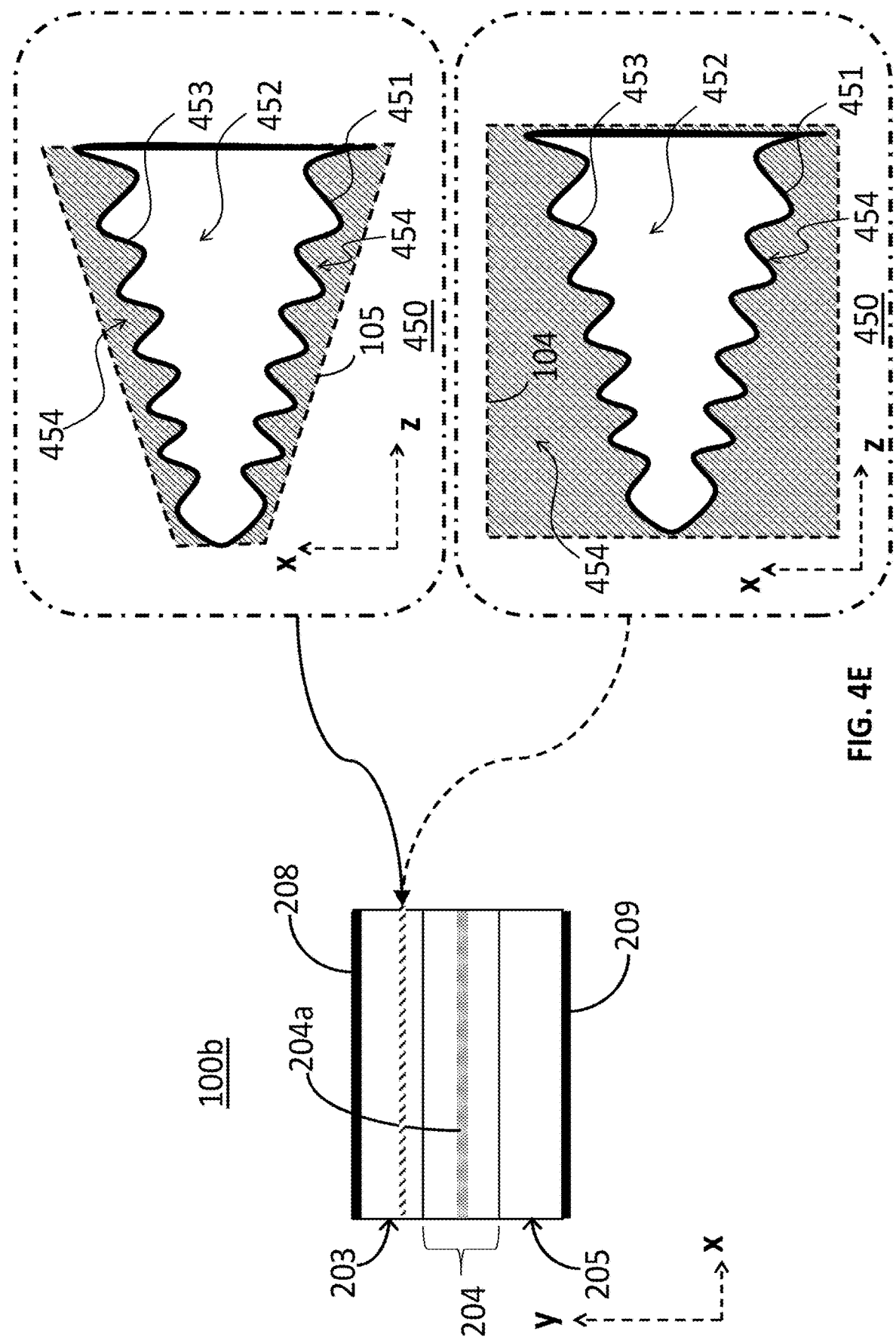
FIG. 4E illustrates cross-sectional views of an example semiconductor optical amplifier in the x-y plane or in a plane parallel thereto, and example tailored current control layer or a current blocking layer included in the top layer the amplifier, in the x-z plane or in a plane parallel thereto.

FIG. 4E illustrates, a layer 450 of the active waveguide 105 or the active waveguide 104. In some cases, the layer 450 may be a layer within the top layer 203 of the active waveguide 105 (or 104) between the top electrode 208 and the gain layer 204a. The layer 450 may include a first region 452 having a perimeter or boundary 451 and a second region 454 surrounding the first region 452, where the first and second regions are associated with a variation of a gain profile parameter of the layer 450. In some cases, a shape of the first region 452 (or boundary 451) may be substantially similar to the shape of the matched or tailored top electrodes described with respect to FIG. 2D, 2E, 3A-3F, 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. As shown in FIG. 4E, in some cases, the first region 452 may have a width extending in the lateral direction that that increases and decreases multiple times with position along the longitudinal direction. In some cases, the layer 450 may be a patterned dielectric layer, a patterned resistive layer (e.g., a patterned semiconductor layer), disposed between top electrode 208 and the gain layer 204a. For example, the layer 450 may be patterned such that first region 452 or the second region 454 are completely etched. In some cases, a thickness of the layer 450 in the first region 452 may be smaller than that of the second region 454. In some cases, the first region 452 may comprise a different material compared to the second region 454. For example, the first region 452 may comprise a doped semiconductor material while the second region 454 comprises a dielectric or a resistive material. In some cases, the first region 452 comprises a material similar to the structural material of a layer disposed above the layer 450 (e.g., a material used to form the contact layer 203a, the first buffer sublayer 203b, the first cladding sublayer 203c, or the first waveguide sublayer 204b). In some cases, a doping density of the first region 452 may different (e.g., higher) than the doping density of the second region 454.

Figure 4F:
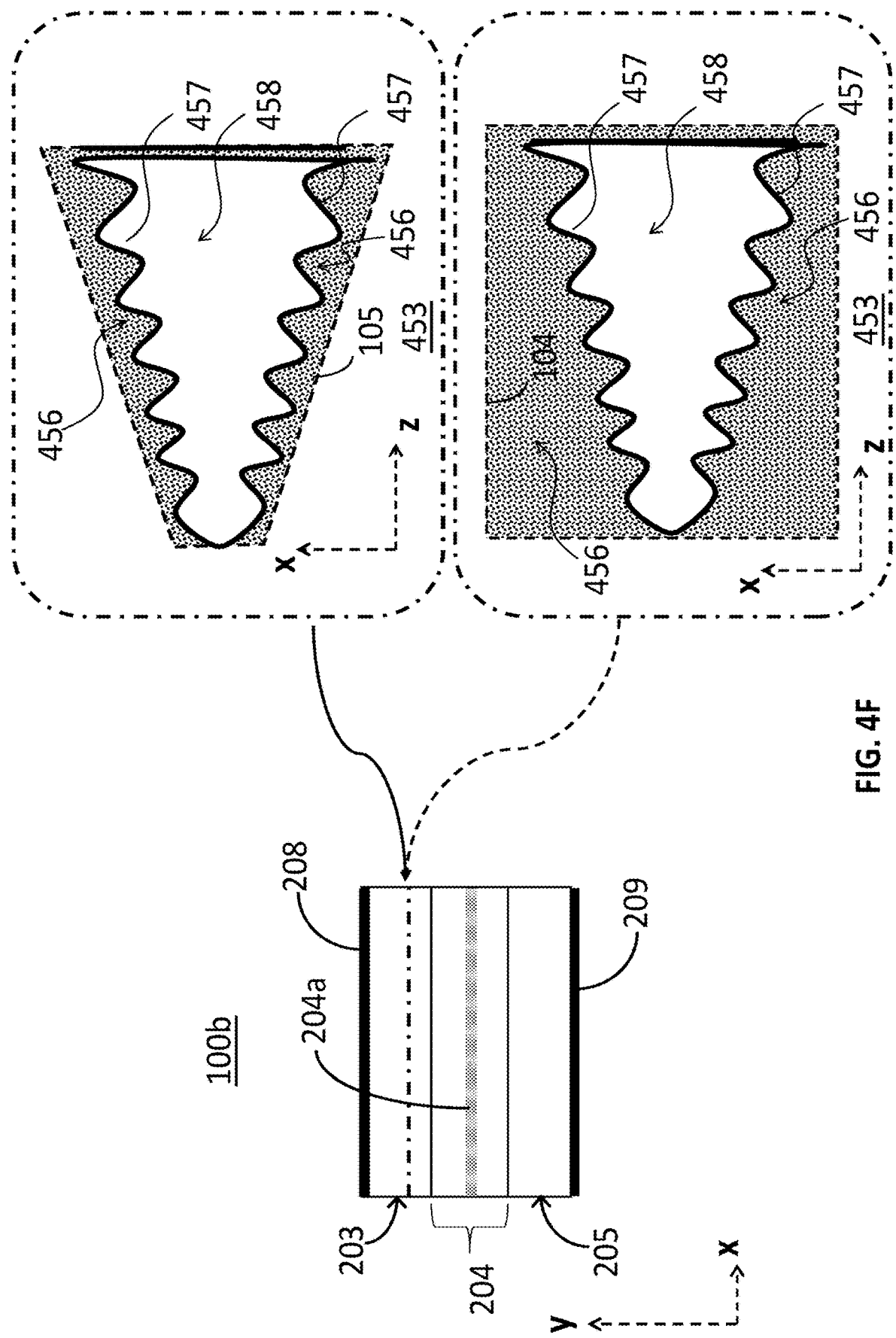
FIG. 4F illustrates cross-sectional views of an example semiconductor optical amplifier in the x-y plane or in a plane parallel thereto, and example ion implanted layers, included in the top layer of the amplifier, in x-z plane, where the ion implanted layers have a tailored ion density profile.

FIG. 4F illustrates, an ion implanted layer 453 of the active waveguide 105 or the active waveguide 104. In some cases, the ion implanted layer 453 may be a layer within the top layer 203 of the active waveguide 105 (or 104). The ion implanted layer 453 may include a first region 458 having a boundary 457 and a second region 456 surrounding the first region 458, where the first region 458 and the second region 456 are associated with a variation of ion density over the layer 453. In some cases a shape of the first region 458 (or boundary 457) may be substantially similar to the shape of the matched or tailored top electrodes described with respect to FIG. 2D, 2E, 3A-3F, 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions. Other variations are possible. As shown in FIG. 4F, in some cases, the first region 458 may have a width extending in the lateral direction that that increases and decreases multiple times with position along the longitudinal direction. In some cases, a density of ions in the first region 458 may be smaller than that of the second region 458. In some such cases, the ions may impede current flow through the ion implanted layer 453 resulting in higher current flow through the first region 458 compared to the second region 456.

A value of the corresponding gain profile parameter may be a constant boundary value along the boundary 457. The boundary value may be a value between the value of the gain profile parameter in the first and the second region.

In some cases, with reference to FIG. 4E and FIG. 4F, a flow of the injection current via the first region 452 may be larger than the flow of injection current via the second region 454, and the flow of the injection current via the first region 458 may be larger the flow of injection current via the second region 456. In some cases, where the layer 450 is a contact layer on which the top electrode 208 is disposed, an injection current generated in the first region 452 may be larger than the injection current generated in the second region 454.

In various examples, when a voltage is applied between a uniform top electrode (e.g., top electrode 208) and a uniform bottom electrode (e.g., bottom electrode 209), the presence of the layer 450 or the ion implanted layer 453, may result in formation of a tailored (or matched) injection current profile in the gain layer 204a. In some examples, a uniform top electrode covers the entire top surface area of the active waveguide 105 (or 104). In some examples, a uniform bottom electrode covers the entire bottom surface of the active waveguide 105 (or 104).

In some cases, when a voltage is applied between a tailored top electrode (e.g., tailored top electrode 210) and a uniform or tailored bottom electrode (e.g., bottom electrode 209), the presence of the current control layer 450 or the ion implanted layer 453 combined with the shape of the tailored top electrode 210, may result in formation of a tailored (or matched) injection current profile in the gain layer 204a. In some such cases, the presence of the current control layer 450 or the ion implanted layer 453 within a semiconductor optical amplifier having a tailored top electrode may improve a level of suppression of one or more lateral modes supported by the corresponding active waveguide.

In various implementations, a shape of the first region 452 or the first region 458 may be determined based on a vertical distance (along y-axis) between the layer 450 or the layer 453 from the gain layer 204a, respectively. For example, a variation of the width (e.g., difference between upper bound and lower bound widths) of the first region 452 (or first region 458) along the longitudinal direction (z-axis) may be less when the layer 450 (or 453) is closer to the gain layer 204a. In some cases, when the layer 450 is disposed (or layer 453 is formed) on top of the gain layer 204a, the first region 458 may have a flared shape with linear lateral edges. In some cases, when the layer 450 or layer 453 is closer to the gain layer 204a than a threshold vertical distance, the first region 458 may have a flared shape with linear lateral edges.

FIG. 4G illustrates, an example of a tailored gain layer 455 of the active waveguide 105 or the active waveguide 104. The tailored gain layer 455 may include a first region 460 having a flared perimeter or boundary 463, and a second region 468 surrounding the first region 460, where the first region 460 and the second region 468 are associated with a variation of optical gain that may be provided to an optical wave guided by the waveguide layer 204, over the tailored gain layer 455. In some implementations, the first region 460 may have a width in the lateral direction that increases along the longitudinal direction (z-axis) from the input port to the output port. The flared perimeter or boundary 463 may vary linearly or nonlinearly from the input port 102 to the output port 103 of the active waveguide 105 or active waveguide 104. In some implementations, where the active waveguide is flared with a linear lateral edge, a rate at which the width of the first region 460 increases may be different (e.g., smaller) than the rate at which the width of the flared active waveguide 105 increases along the longitudinal direction. For example, the width of the first region 460b may increase at a rate substantially equal to the rate at which the FWHM of the lateral optical intensity distribution of the guided optical wave (that is amplified by the active waveguide) increases.

In some implementations, the width of the first region 460 increases and decreases multiple times with position along the longitudinal direction (z-axis). In some such implementations, a shape of the first region 460 in a plane parallel to xz-plane may be substantially similar to the shape of the matched or tailored top electrodes described with respect to FIG. 2D, 2E, 3A-3F, 4A-4C. Likewise, the discussions herein directed to the top electrode (e.g., the tailored top electrode) may equally apply to these regions. Similarly, the features described herein with regard to the top electrode (e.g., the tailored top electrode) may equally apply to these regions.

In some cases, the tailored gain layer 455 may be a patterned gain layer where a portion of gain layer outside the first region 460 is completely etched. In some such cases, the second region 468 may comprise a different material compared to the first region 460. For example, the first region 468 may comprise a material similar to the structural material of a layer disposed above the tailored gain layer 455 (e.g., a material used to form the contact layer 203a, the first buffer sublayer 203b, the first cladding sublayer 203c, or the first waveguide sublayer 204b). In some cases, a thickness of the tailored gain layer 455 in the first region 460 may be smaller than that of the second region 468.

In some cases, a thickness of the tailored gain layer 455 along the vertical direction (e.g., along the growth direction of the gain layer or the y-axis) may change gradually or abruptly from the first region 460 of to the second region 468. In some such cases, the thickness of the tailored gain layer 455, may linearly change from a first thickness to a second thickness across the boundary 463.

In some cases, an optical property of the second region 468 of the tailored gain layer 455 may be different than that of the first region 452. For example, the quantum wells, the quantum wires or the quantum dots in the first region 460, may have a different band gap compared to the quantum wells, the quantum wires or the quantum dots in the second region 468. For example, the quantum wells, the quantum wires or the quantum dots in the first region 460 may have a smaller bandgap compared to the quantum wells, the quantum wires or the quantum dots in the second region 468. In some cases, the quantum wells, the quantum wires or the quantum dots in the second region 468, may not amplify light having the input wavelength (for which the amplifier is designed). For example, during the fabrication of the semiconductor optical amplifier 100b, the band gap of the quantum wells, the quantum wires or the quantum dots in the second region 468 may be increased using an intermixing process such that they cannot amplify light having the input wavelength. In various implementations, a range of techniques, including but not limited to impurity diffusion, dielectric capping and laser annealing may be used intermixing the quantum wells in the second region 468.

In some cases, a strain and/or a composition of the quantum wells, quantum dots, or quantum wires in the first region 460 and the second region 468 may be different. For example, the composition or the strain of the quantum wells, quantum dots, or quantum wires in these regions may be tailored such that an optical gain property (e.g., the band gap) of the tailored gain layer 204a is different in the first region 460 and the second region 468. In some cases, the strain or the composition may gradually change across the boundary 463.

In the example shown in FIG. 4G when a voltage is applied between a uniform top electrode (e.g., the top electrode 208) and a uniform bottom electrode (e.g., the bottom electrode 209) of the semiconductor optical amplifier 100b, the tailored gain layer 455 may provide a tailored (or matched) optical gain profile across the active waveguide 105 or the active waveguide 104.

In some cases, when a voltage is applied between a tailored top electrode (e.g., tailored top electrode 210) and a uniform or tailored bottom electrode (e.g., bottom electrode 209) of a semiconductor optical amplifier (e.g., semiconductor optical amplifier 100c) having a tailored gain layer may generate a matched optical gain profile in the corresponding active waveguide. In some such cases, the shape of the tailored gain layer or distribution of a gain profile parameter in the tailored gain layer combined with a shape of the tailored top electrode may improve a level of suppression of one or more lateral modes supported by the corresponding active waveguide.

In various implementations, one or more gain profile parameters described above can be graded across the lateral and longitudinal direction (along x-axis) or longitudinal direction (along y-axis) of the active waveguide 105 (or the active waveguide 104). For example, a gain profile parameter of a layer may gradually or smoothly change across the lateral and longitudinal direction. In some cases, a graded gain profile parameter may vary across a lateral and longitudinal direction such that the gain profile parameter has three, four, five, eight, or ten levels of magnitude across one of said plurality of layers.

In some cases, the gain profile parameter of a layer or sublayer may be graded in a region in the vicinity of a boundary between the two regions in the layer or sublayer. For example, with reference to FIG. 4E, a thickness of the layer 450 may gradually change from a first thickness in the first region 452 to a second thickness in the second region 454 such that within a transition region near the boundary 451, the thickness of the layer 450 is graded. As another example, with reference to FIG. 4F, a density of ions in the ion implanted layer 453 may gradually change from a low density in the first region 458 to a high density in the second region 456 such that within a transition region near the boundary 457 the density of ions is graded. Similarly with reference to FIG. 4G, a surface density of quantum dots or quantum wires in the tailored gain layer 455 may gradually change from a high density in the first region 460 to a low density in the second region 468 such that within a transition region near the boundary 463 the density of quantum dots or quantum wires is graded. In some cases, a fraction of an area (e.g., a unit area) in a transition region near the boundary 463 that is covered by quantum dots, quantum wells or quantum wires, may gradually change in a direction from the first region 460 to the second region 468 (e.g., similar to the spatial distribution shown in the close-up view 415 of FIG. 4D). In some such cases, in a transition region between the first region 460 and the second region 468, the gain layer 204a be broken into islands of quantum wells, quantum wires or quantum dots where spacing between the islands increase and the area of the islands decrease in a direction from the first region 460 to the second region 468 (e.g., in a direction perpendicular to the boundary 463).

In various implementations, a gain profile parameter of a layer may be graded during the fabrication of the optical amplifier using photolithography, a grayscale mask and etching. For example, using the grayscale mask may be used to generate a graded photoresist layer on a layer of the optical amplifier and subsequently etching the layer covered by the graded photoresist layer may result in a layer with graded thickness.

In some implementations, a gain profile parameter of a layer of the active waveguide 105 (or 104) in the amplifier 100b may decrease away from a centerline of the active waveguide 104 (or 105).

In some implementations, a spatial distribution of a gain profile parameter in a layer of the active waveguide 105 (or 104) may be a spatial distribution different than the spatial distributions described above with respect to FIG. 4D-4G that suppresses one or more lateral modes the active waveguide 105 (or 104), for example, by supporting generation of a tailored (or matched) optical gain profile.

In some implementations, an optical amplifier may comprise an active slab waveguide that includes a current control layer (e.g., layer 450 or layer 453), or the tailored gain layer 455. In such implementations, when a voltage is applied between a top electrode (e.g., a uniform top electrode) and a bottom electrode (e.g., a uniform bottom electrode), the resulting optical gain profile within the active slab waveguide may suppress amplification of optical waves having an optical intensity profile different than or substantially different than a target optical intensity profile (e.g., an optical intensity profile that is symmetric with respect to a longitudinal axis of symmetry of the optical amplifier or the slab waveguide).

In various implementations, a semiconductor optical amplifier with a matched optical gain profile enabled using any of the designs described above may have a power conversion efficiency at least or larger than or at least or larger than 1%, or at least or larger than 10%, or at least or larger than 30%, or at least or larger than 50%, or any range formed by any of these values or large or smaller for some designs.

Semiconductor Laser with Tailored Electrode

In some embodiments, any of the designs described above may be employed in a laser (e.g., a semiconductor laser) or a master oscillator-power amplifier (MOPA) device to provide a tailored and/or matched optical gain profile in the optical gain section of the laser (oscillator) and/or the optical gain section of the power amplifier (e.g., a semiconductor optical amplifier). Advantageously, providing a tailored and/or matched optical gain profile in the optical gain section of a laser or in the gain section of the optical amplifier section of a MOPA device may enable generation of high power diffraction limited or near diffraction limited optical output beams having a Gaussian beam profile or close thereto.

In some implementations, the tailored and/or matched optical gain may be provided in the optical gain section of an optoelectronic device (e.g., a semiconductor laser) using a tailored top electrode and a uniform bottom electrode. In some implementations, the tailored and/or matched optical gain may be provided in the optical gain section of an optoelectronic device using a uniform bottom electrode and a uniform top electrode disposed on a patterned dielectric layer disposed on the optical gain section, on a patterned dielectric sublayer of the optical gain section, or on an ion implanted gain section. Correspondingly, a fundamental lateral mode profile of a guided optical wave sustained in a laser or amplified in the amplifier section of a MOPA device, may be preserved or substantially preserved during oscillation or amplification by using the above-mentioned designs.

For example, the semiconductor optical amplifier 100c with a tailored and/or matched electrode or segmented tailored or matched electrode may be employed in a master oscillator-power amplifier (MOPA) system where the output of a master optical oscillator (e.g., a semiconductor laser) is coupled to the semiconductor optical amplifier 100c via the input port 102.

In some cases, the semiconductor optical amplifier 100c and the laser may be fabricated or disposed on a single chip. In some examples, the laser may be a semiconductor laser and the laser and the semiconductor optical amplifier 100c may be monolithically fabricated on the same bottom layer. In some examples, the laser and the active waveguide may share the same gain layer. In some examples, the laser and the active waveguide may share the same gain layer and the same top layer. In some examples, the laser and the optical amplifier may be formed on a different layer such as a layer with a different composition.

In some cases, the laser may be a single mode laser that outputs a guided optical wave having a single mode lateral optical intensity profile matched with the fundamental lateral mode of the active waveguide 105 (or 104). In such cases, the guided optical wave output by the laser may be directly coupled to the active waveguide via the input port 102. In some cases. The semiconductor optical amplifier 100c with the tailored or matched electrode may amplify the output of the laser while maintaining its single fundamental lateral mode profile. In some such cases, the semiconductor optical amplifier 100c may generate a diffraction limited or near diffraction limited output beam.

In some cases, the laser may comprise an optical resonator formed in a waveguide by at least two optical reflectors such as front and rear or forward and rearward optical reflectors. The optical resonator may be referred to herein as an optical cavity or laser cavity in some instances. An optical gain region capable of providing optical gain may be included in the laser cavity such as between the front and rear optical reflectors such that an optical wave guided by the waveguide is sustained and the laser lases outputting light through the front optical reflector. The light output from the laser may have one or more laser wavelengths. The one or more laser wavelengths may be determined based at least in part on a spectrum of the optical gain and wavelengths of one or more cavity modes (laser cavity modes). The laser wavelength can be from 300 nm to 600 nm, 600 nm to 1000 nm, 1000 nm to 1500 nm, 1500 nm to 2000 nm, 2000 nm to 10000 nm or any range formed by any of these values or large or smaller.

Figure 5A:
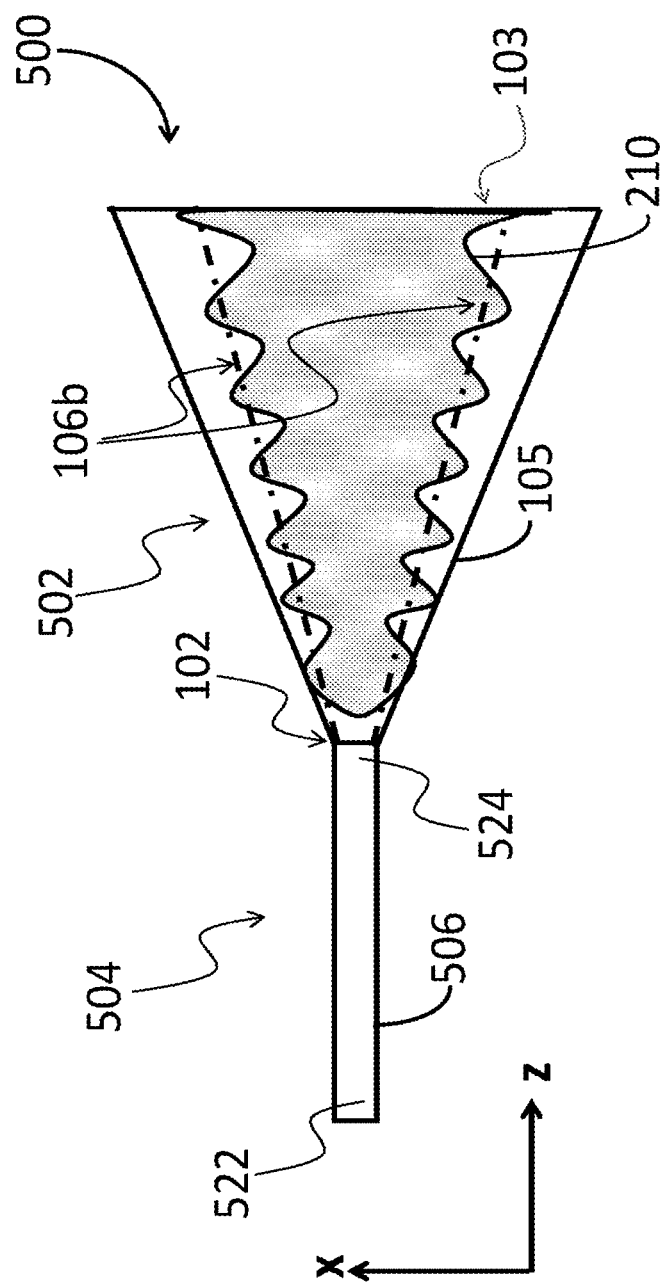
FIG. 5A illustrates the x-z plane cross-sectional profile of an example of a MOPA device having a flared amplifier section with a flared top electrode with non-linear (e.g., undulating) lateral edges and a flared optical gain profile (e.g., with linear lateral edges).

FIG. 5A shows an example of a MOPA device 500 comprising a laser section 504, serving as master oscillator, and an amplifier section 502, serving as the power amplifier. In some implementations, the laser section 504 may comprise a semiconductor laser and the amplifier section may comprise the semiconductor optical amplifier 100c having a tailored and/or matched top electrode.

The laser section 504 may comprise a waveguide 506 having a width, a first end 522 and a second end 524, and a first optical reflector disposed at the first end 522. In some cases, the waveguide 506 may be a ridge waveguide. In some cases, the waveguide 506 may be a buried channel waveguide, a rib waveguide, or a strip-loaded waveguide. In some cases, the laser section 504 may further comprise a second optical reflector disposed at the second end 524 of the waveguide 506. Both reflectors are distributed Bragg reflectors (DBRs). Either or both of these reflectors may be formed on the same layer as the waveguide 506 or on a different layer such as a layer with a different composition.

In various implementations, the width of the waveguide 506 may be constant along a longitudinal direction (e.g., z-direction) extending from the first end 522 to the second end 524. In some cases, the waveguide 506 may be a single mode waveguide supporting only a fundamental lateral mode (e.g., in the lateral or x-direction). In some cases, the width of the waveguide 506 may increase from the first end 522 to the second end 524. In some such cases, at least a portion of the waveguide 506 may support one or more higher order lateral optical modes. In some cases, the waveguide 506 may be a curved waveguide having one or more curved regions between the first end 522 and the second end 524. In some cases, a curved region of the curved waveguide may cause excess radiative loss of higher order lateral modes on the curved waveguide and effectively support propagation of a single lateral mode (e.g., the fundamental lateral mode).

Additionally, the waveguide 506 may comprise at least an active region that provides optical gain. The waveguide 506 can be activated (pumped) using an electric contact that provides a current flow thought the active region. The active region of the waveguide 506 may comprise, single junction, heterojunction, multi-quantum well heterojunction semiconductor gain material.

The first reflector, the waveguide 506 (with at least one active region) and the second reflector form a laser cavity that can support lasing at one or more laser wavelengths corresponding to wavelengths of one or more cavity modes (e.g., the longitudinal cavity modes) of the laser cavity. The active region may provide optical gain at the one or more laser wavelengths. The laser cavity can generate, amplify and sustain laser light a portion of which is output as the laser output. The one or more laser wavelengths may be determined by a spectrum of the optical gain provided by active region and/or wavelengths of the one or more cavity modes (laser cavity modes). The laser wavelength can be from 800 nm to 1000 nm, 1000 nm to 1500 nm, 1500 nm to 2000 nm, 2000 nm to 2500 nm, 2500 nm to 3000 nm or outside such ranges. The laser output of the laser section 504 may comprise a guided optical wave having a single mode lateral optical intensity profile.

In some cases, the laser section 504 may be a tapered laser, a flared laser, or laser having at least a flared waveguide region. Examples of tapered lasers are discussed in U.S. patent application Ser. No. 17/163,028 filed on Jan. 29, 2021, which is hereby incorporated by reference herein in its entirety.

In the example shown, the amplifier section 502 comprises a flared active waveguide 105 having an input port 102 and output port 103, and a tailored top electrode 210 disposed on the active waveguide 105. In some cases, a structure of the amplifier section 502 (e.g., a type, arrangement and number of layers/sublayers) may be similar or substantially identical to a structure of the semiconductor optical amplifier 100b shown in FIG. 2B or FIG. 2C. A flare angle of the flared active waveguide 105 may be matched to the natural diffraction angle of a guided optical wave associated with the fundamental lateral mode profile of the active waveguide 105 at the input port 102 in some designs.

In various implementations, the laser section 504 and the amplifier section 502 may be monolithically fabricated on a single chip. In some cases, the second reflector of the laser section 504 may overlap with the input port 102 of the amplifier section 502. In some cases, the interface between the laser section 504 and the amplifier section 502 may be configured to allow a guided optical wave output by the laser section to propagate into the active waveguide 105 while maintaining its lateral optical intensity profile. In some examples, the guided optical wave output by the laser section 504 may have a lateral optical intensity profile matched with the fundamental lateral mode of the active waveguide 105 at the input port 102.

Figure 5B:
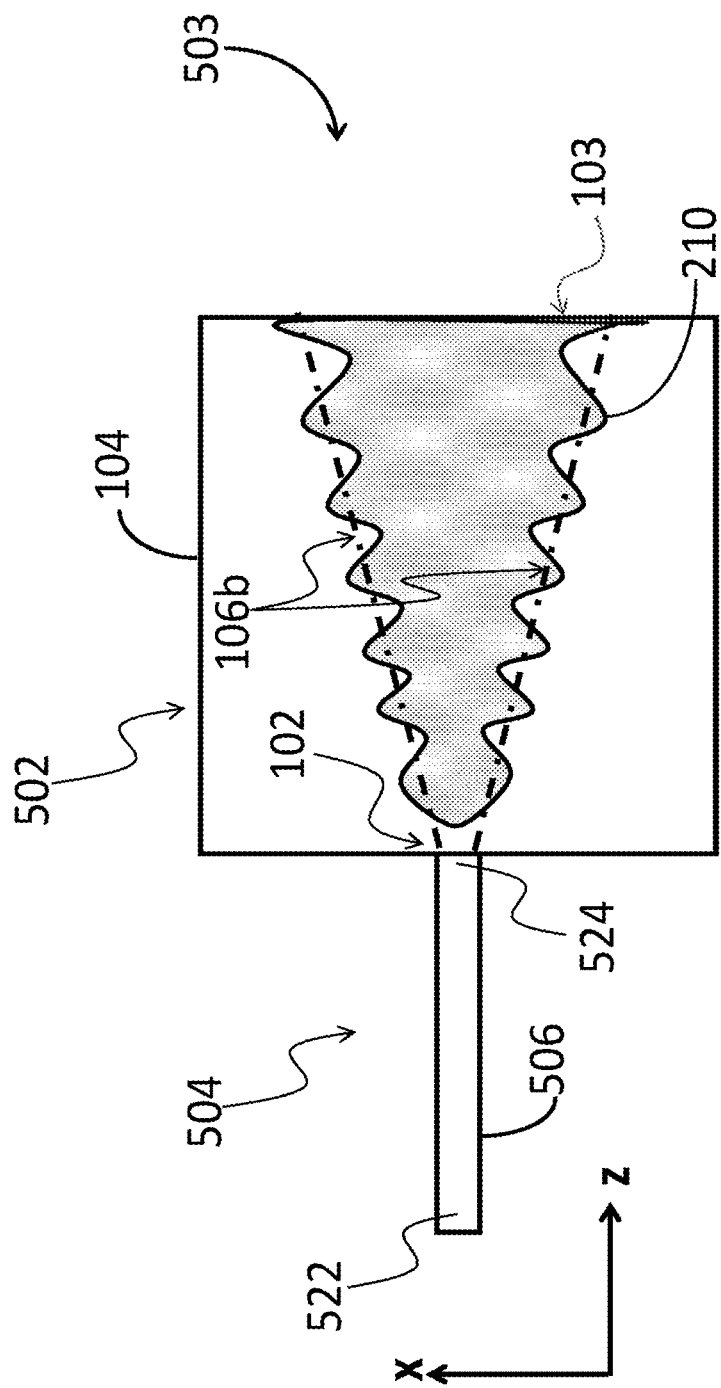
FIG. 5B illustrates the x-z plane cross-sectional profile of an example of a MOPA device having a rectangular amplifier section with a flared top electrode with non-linear (e.g., undulating) lateral edges and a rectangular optical gain profile (e.g., with linear lateral edges).

FIG. 5B shows an example of a MOPA device 503 comprising a laser section 504, serving as master oscillator, and an amplifier section 502, serving as the power amplifier. The MOPA device 503 may comprise one or more features described with respect to MOPA device 500 (FIG. 5B). The amplifier section 502 of the MOPA device 503 comprises a rectangular active waveguide 104 having an input port 102 and output port 103, and a tailored top electrode 210 disposed on the active waveguide 104.

In any of the MOPA devices 500 or 503, single-mode laser oscillation occurs within the laser section 504 (the master oscillator section). The laser light generated by the laser section 504 then is coupled into the amplifier section 502 (the power amplifier section) where laser light propagates as the fundamental guided optical wave of the active waveguide 105. The fundamental guided optical wave freely expands in the lateral direction by natural diffraction while being amplified while propagating in the longitudinal direction. Because the fundamental guided optical wave freely expands lateral direction, its peak intensity may remain below a threshold associated with onset of nonlinear optical effects. Additionally, since the tailored top electrode 210 generates an optical gain profile matched with the optical intensity profile of the fundamental guided optical wave, for example, the bell-shaped (e.g., Gaussian) optical intensity profile of the fundamental guided optical wave may be maintained as the fundamental guided optical wave is amplified along the amplifier section 502 (as described with respect to FIG. 2D). As a result, the optical amplification process becomes stable, and therefore a power extracted from the amplifier section 502 may be greater than power extracted from a flared amplifier with a uniform top electrode and uniform optical gain profile. In some cases, the MOPA device 500 may generate a diffraction-limited output beam while providing a power amplification and a conversion efficiency as large as a conventional broad area laser.

In some embodiments, the laser section 504 may output an optical wave with an asymmetric optical intensity profile in the lateral direction (e.g., with respect to a longitudinal axis of symmetry of the laser section 504 or the amplifier section 502). In such examples, the tailored top electrode 210 may generate an optical gain profile matched with the lateral optical intensity profile of the resulting guided optical wave in the amplifier section 502. In some cases, a portion of the resulting guided optical wave (e.g., the far field portion may have a symmetric optical intensity profile in the lateral direction.

In some embodiments, the laser cavity may be formed between the first optical reflector (disposed at the first end 122 of the waveguide 506) and the output port 103 of the amplifier section 502. In some such embodiments, a third reflector may be disposed at the output 103 and the second optical reflector may have low level of reflection (e.g., e.g., less than 10%) or may not exist. In these embodiments, the laser may be sustained by the cavity formed between the first optical reflector and the output port 103. In such embodiments, the waveguide 506 filters the higher order lateral modes that may initially exist in the laser cavity (effectively making the cavity a single mode cavity), while both the waveguide 506 and the amplifier section 502 amplify the single mode supported by cavity. In some cases, where the laser cavity is formed between the first optical reflector and the output port 103, a length of the waveguide 506 may be very small or the waveguide 506 may be a passive waveguide without optical gain. In such cases, intracavity amplification happens in the amplifier section 502 while waveguide 506 eliminates the higher order lateral modes.

In the example described above, the waveguide 506 and the active waveguide 105 may be monolithically fabricated by etching a single layer on a substrate. The reflectors of the laser section 504 may be part of the structure of the waveguide 506. The input port 102 and output port 103 in the MOPA device 500 and 503 depict longitudinal positions along the waveguide 506 and active waveguide 105 and may not be structurally distinguishable features.

Figure 6C:
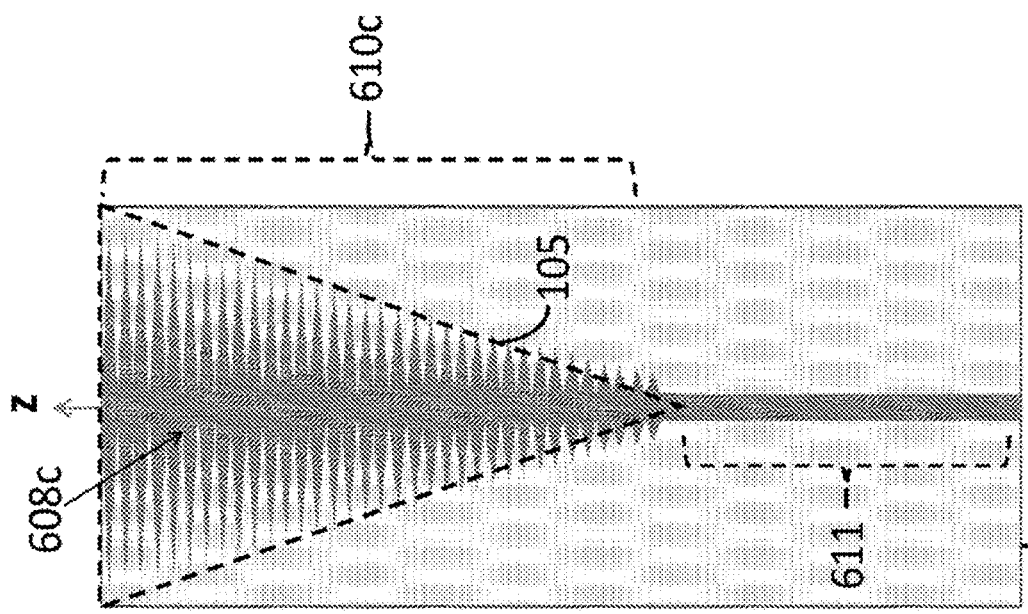
FIGS. 6A-6C illustrate three examples a MOPA device having a flared amplifier section with a flared top electrode having lateral widths that increase and decrease along the length of the electrode produced by lateral edges comprising a plurality of protrusions.
Figure 6B:
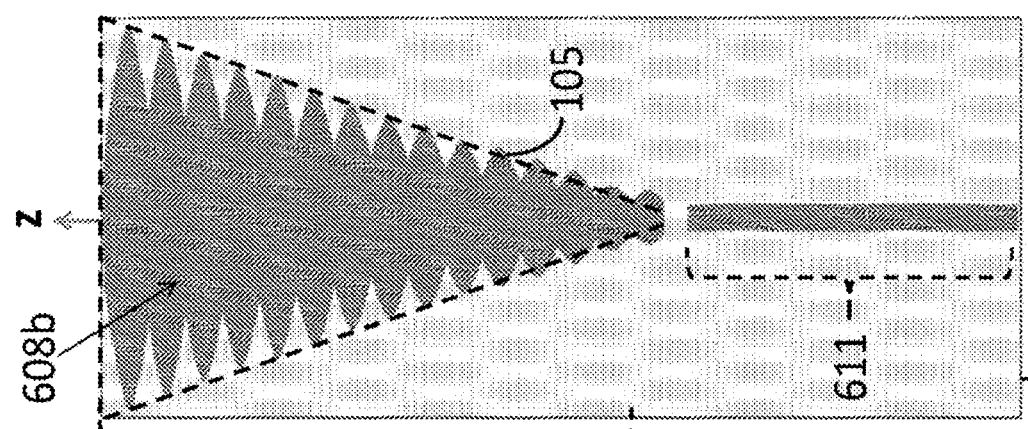
Figure 6A:
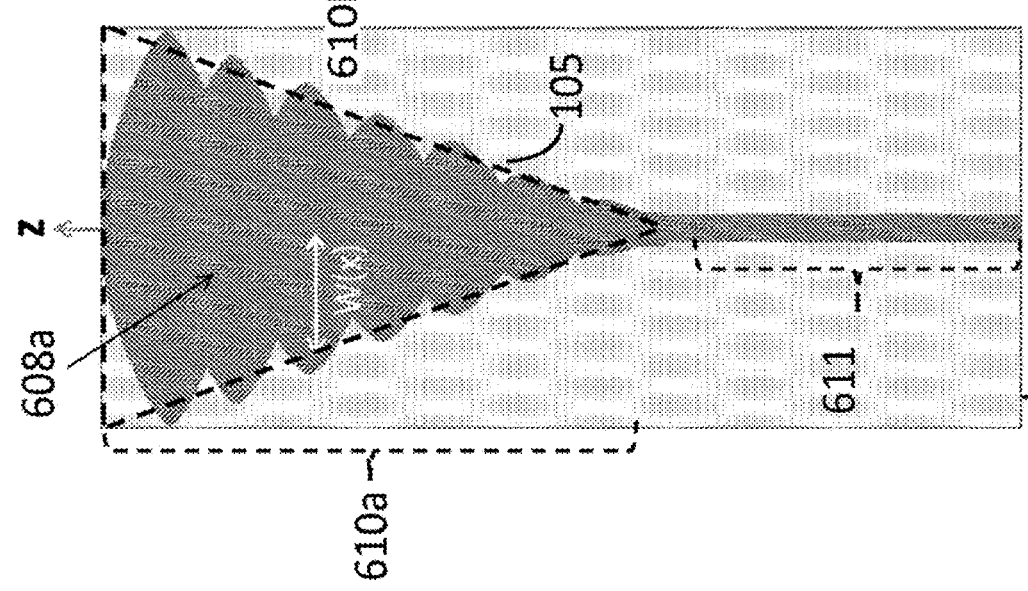

FIG. 6A-6C illustrates three examples 608a/608b/608c of top electrode structures for a MOPA device having a flared amplifier comprising an active waveguide 105 with a tailored top electrode. In the examples shown, the active waveguide is a flared active waveguide 105 (depicted by dashed line). The top electrode structure may have a first electrode section comprising a tailored top electrode 610a/610b/610c disposed on top of the active amplifier and a second electrode section comprising a laser electrode 611 disposed on top of the laser (e.g., single-mode laser). In some cases, such as the example shown in FIGS. 6A and 6C, the first electrode section and the second electrode section may be electrically connected. In these cases, the top electrode structure may be a single conductive layer. In some other cases, such as the example shown in FIG. 6B, the first electrode section and the second electrode section may be electrically isolated. Accordingly, in some cases, the top electrode structure may comprise two electrically isolated conductive layers.

The tailored top electrodes 610a/610b/610c may be configured to provide a matched injection current profile in the gain layer of the active waveguide 105. The laser electrode 611 may be configured to provide a uniform current distribution to the active region of the laser cavity.

Figure 7C:
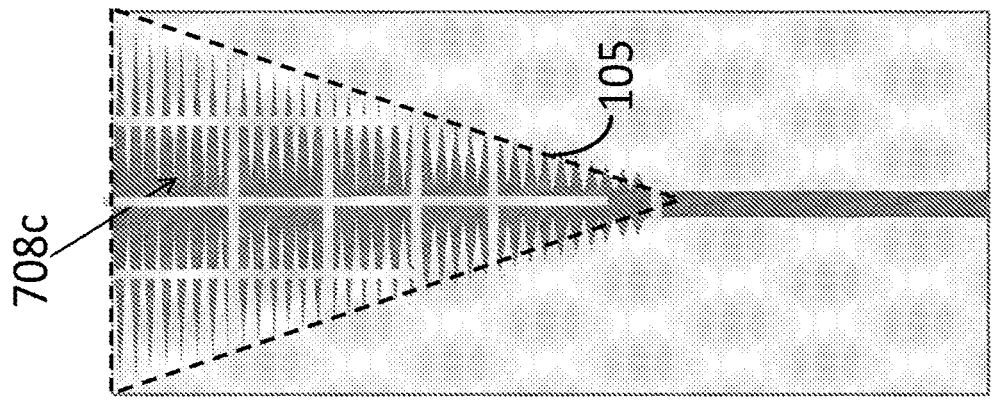
FIGS. 7A-7C illustrate three examples of a MOPA device having a flared amplifier section with a segmented top electrode in aggregate having a flared shape with lateral widths that increase and decrease along the length of the plurality of electrode segments produced by lateral edges comprising a plurality of protrusions.
Figure 7B:
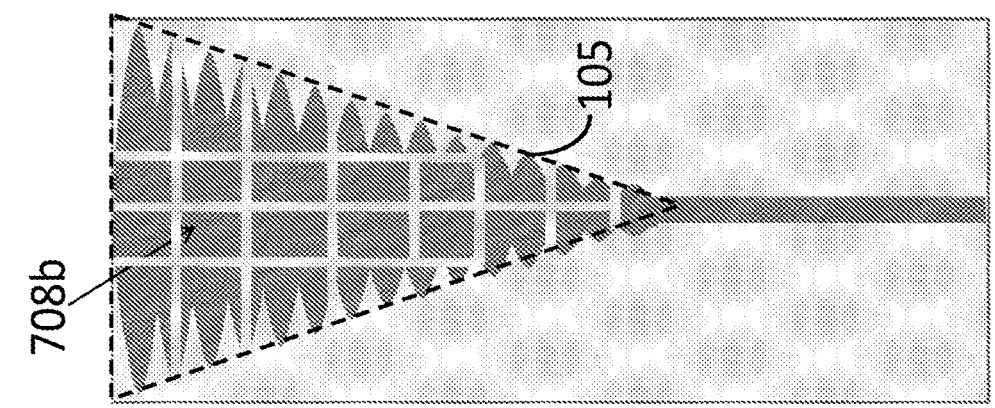
Figure 7A:
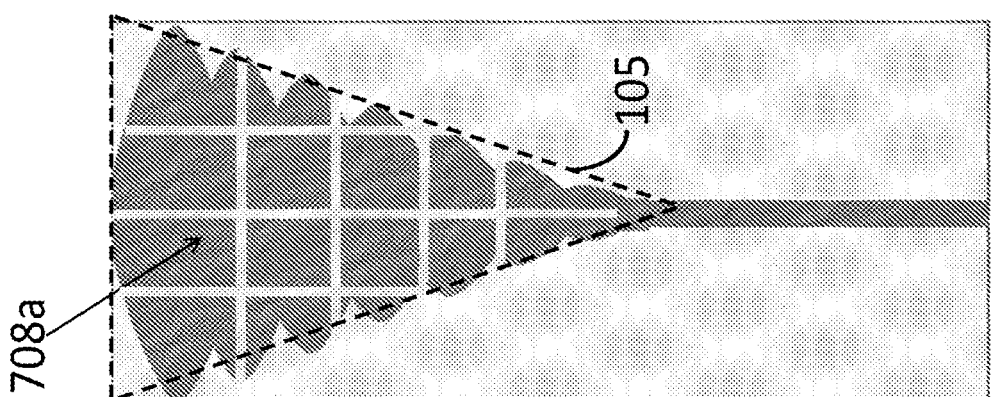

FIG. 7A-7C illustrates three examples of top electrode structure 708a/708b/708c for a MOPA device having a flared amplifier section with a segmented matched top electrode. Various features of segmented electrodes discussed above and elsewhere herein apply to the structures shown in FIGS. 7A-7C as well.

Figure 8:
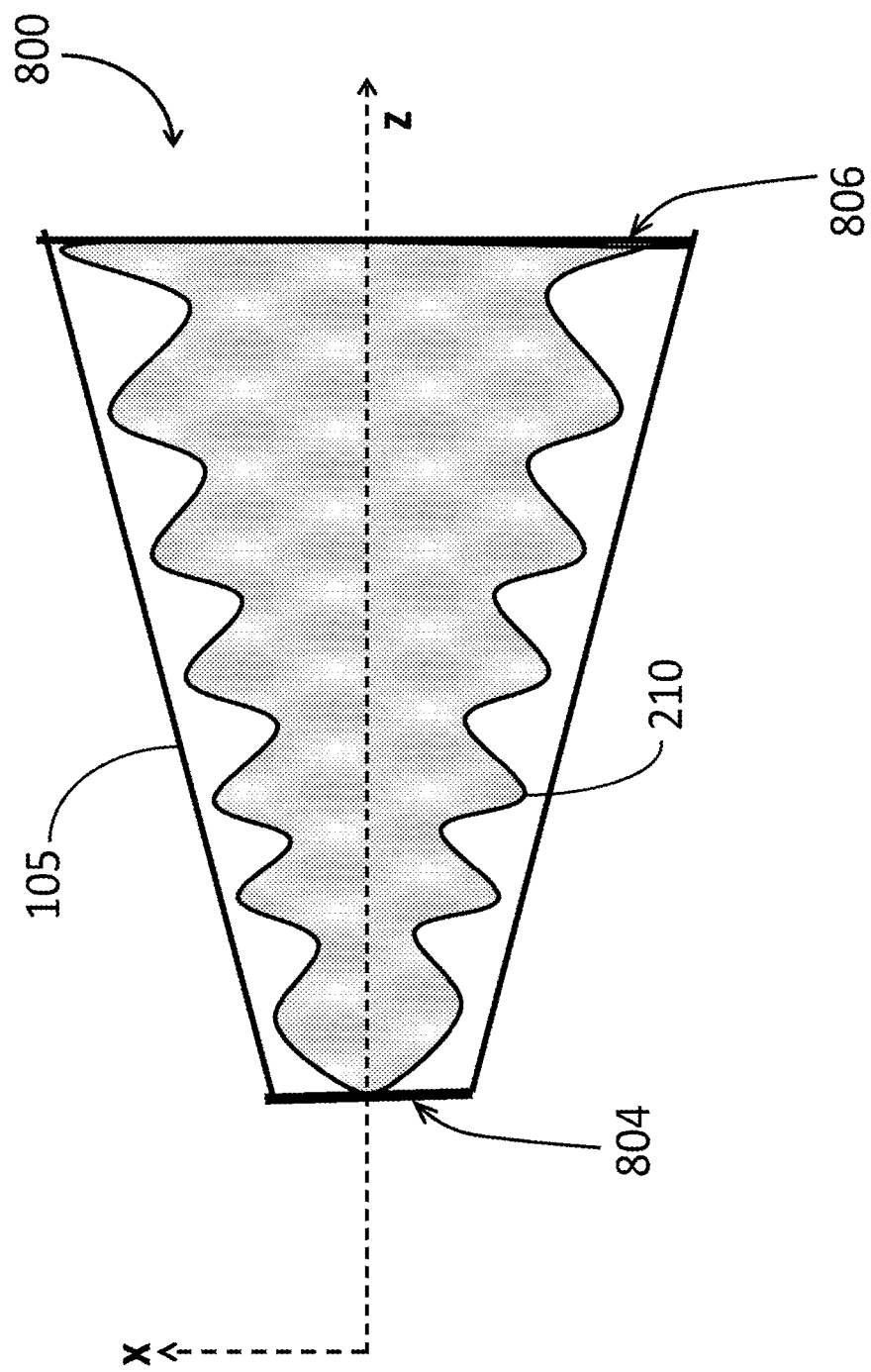
FIG. 8 illustrate a top view of a flared semiconductor laser having a tailored top electrode with a flared shape and lateral widths that increase and decrease along the length of the electrode produced by lateral edges comprising a plurality of protrusions.

With reference to FIG. 2D, in some implementations, the active flared optical waveguide 105 with the tailored top electrode 210 may be a portion of the gain region of a tapered laser. FIG. 8 shows an example of such tapered or flared laser having a tailored top electrode 210. The flared laser 800 may comprise the flared active waveguide 105 having a width, a first end 804 and a second end 806, and a first optical reflector disposed at the first end 804. In some cases, the flared laser 800 may further comprise a second reflector disposed at the second end 806 of the flared laser 800. In some cases, a cleaved facet of the active flared waveguide 105 at the output port 806 may serve as the second reflector.

The first reflector, the flared active waveguide 105 (pumped by the tailored top electrode 210) and the second reflector form a laser cavity that can support lasing at one or more laser wavelengths corresponding to wavelengths of one or more cavity modes of the laser cavity. The active waveguide 105 may provide optical gain at the one or more laser wavelengths. The laser cavity can generate, amplify and sustain laser light a portion of which is output as the laser output. The one or more laser wavelengths may be determined by a spectrum of the optical gain provided by the flared active waveguide 105 and/or wavelengths of the one or more cavity modes (laser cavity modes). The tailored top electrode 210 may be configured to generate a matched injection current profile in the gain layer of the active waveguide 105. As such, the optical gain profile generated in the active waveguide 105 may have a tailored or matched optical gain profile allowing a fundamental guided optical wave to be generated, amplified and sustained within the laser cavity while preserving its fundamental lateral mode profile.

In various designs, the laser section 504 or the laser 800 may further comprise a phase control section. The phase control section may comprise an electrode configured to apply an electrical signal to a portion of the waveguide to alter the refractive index thereof. Accordingly, in certain implementations, the phase control section may alter the optical path length inside the optical cavity formed between the first and the second reflectors and therefore adjust or tune the wavelength of the corresponding cavity modes (e.g., longitudinal cavity modes). As such, in some embodiments, the phase control section may be used to tune the one or more laser wavelengths.

In some designs, one or both reflectors of the laser section 504 or the laser 800 can comprise a narrowband reflector configured to reflect light having wavelengths within a limited spectral range or wavelength interval centered on a center wavelength. In some examples, a laser wavelength of the corresponding laser may be substantially equal to the center wavelength. In some examples, at least one of the reflectors can comprise a narrowband filter with a bandwidth smaller than wavelength spacing between longitudinal modes of the laser cavity (herein referred to as free spectral range). In such a case, only one longitudinal cavity mode is sustained inside the laser cavity. The laser wavelength may be substantially equal to wavelength of the single longitudinal mode.

In various implementations, the laser section 504 or the laser 800 may comprise any laser that outputs an optical wave or an optical guided wave having a single mode lateral optical intensity distribution or mode profile.

In any of the implementations discussed herein such as those described above, the narrow band reflectors (e.g., the spectral reflectance of the narrow band reflectors) can be electrically or thermally tunable. For example, for thermal tuning, resistive heaters can be disposed on or sufficiently close to the reflectors (e.g., narrow band reflectors) to change their center wavelength via thermo-optic effect. The temperature of the corresponding reflector can be changed by providing electric current to the resistive heater using individual electric contacts (electrodes). Other techniques can be used to provide tuning. For example, electric contacts can be directly disposed on the reflectors to change their center wavelength via electro-optic effect. As such the reflectance spectrum of each reflector can be independently controlled by the current or voltage provided via the electrodes disposed on the reflectors (which are electrically isolated from the other electrodes driving the gain and phase control regions). In some examples, the wavelengths of one or more cavity modes (e.g., longitudinal cavity modes) may be controlled by tuning the reflectance spectrum of a reflector (a narrow band reflector) using the methods described above. Accordingly, in various implementations, the one or more laser wavelength can be tuned, for example by applying an electrical signal to one or more electrodes associated with one or more reflectors. In some embodiments, at least one of the reflectors may have a plurality of narrowband reflection peaks (e.g., a comb line reflectance spectrum). In some such embodiments, tuning the reflectance spectrum of one or more reflectors (using the above-mentioned methods), or a phase section may be used to tune or select a single laser wavelength, for example, by controlling an alignments between the one or more narrow band reflection peaks and that cavity modes (longitudinal modes of the laser cavity).

Examples of configurations useful for providing laser wavelength tuning are discussed in U.S. Pat. No. 10,355,451 issued Jul. 16, 2019, U.S. Pat. Application No. 62/901,089 filed on Sep. 16, 2019, and U.S. patent application Ser. No. 17/021,993 filed on Sep. 15, 2020, which are hereby incorporated by reference herein in their entirety.

Accordingly, in various designs, the narrow band reflector can comprise a comb reflector such as described in U.S. Pat. No. 10,355,451 issued Jul. 16, 2019, U.S. Pat. Application No. 62/901,089 filed on Sep. 16, 2019, and U.S. patent application Ser. No. 17/021,993 filed on Sep. 15, 2020, which are incorporated in their entirety by reference herein. Such a comb reflector may be capable of producing a reflection spectrum comprising plurality of reflection peaks or amplitude peaks spaced apart in frequency. In some implementations, these reflection or amplitude peaks may be equally spaced apart in frequency. An example of a comb reflector is a sampled grating distributed Bragg reflector (SGDBR). Such a SGDBR may comprises, for example, a series of Bragg gratings spaced apart from each other by a region(s) that do not include grating structures. Using comb mirror as one of the reflectors may provide certain capabilities (e.g. tuning the laser wavelength, tailoring the laser spectrum) such as, for example, described in U.S. Pat. No. 10,355,451, titled "Laser with Sampled Grating Distributed Bragg Reflector", filed on Apr. 25, 2018 and issued on Jul. 16, 2019, U.S. Patent Application No. 62/901,089 filed on Sep. 16, 2019 titled "Tunable Laser with Active Material on at Least One End for Monitoring Performance", and U.S. patent application Ser. No. 17/021,993 filed on Sep. 15, 2020, titled "Tunable Laser with Active Material on at Least One End for Monitoring Performance", which are each hereby incorporated herein by reference in their entirety.

Figures 9A, 9B:
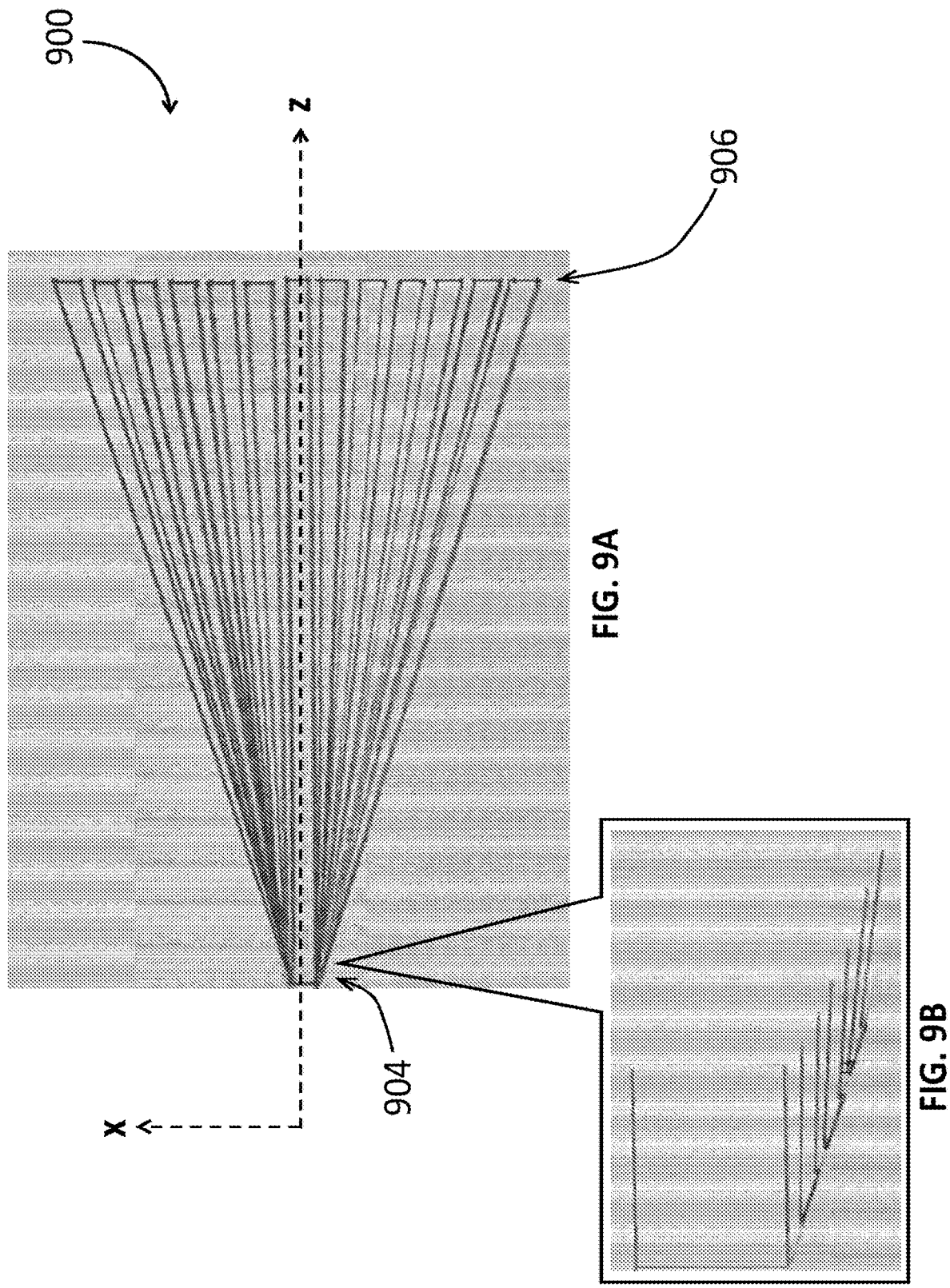
FIG. 9A illustrates a top view of an example segmented flared top electrode comprising a plurality of conductive strips.
FIG. 9B illustrates a close-up to view of the first end of the segmented flared electrode shown in FIG. 9A.

FIG. 9A shows another example of a tailored top electrode. The tailored top electrode 900 is a segmented flared electrode. The segmented top electrode 900 may extend from a first end 904 to a second end 906 in the longitudinal direction (e.g., along z-axis) and may have a width extending in the lateral direction. The width of the electrode 900 near the first end 904 may be smaller than the width near the second end 906. The width of the segmented flared electrode 900 may increase (e.g., linearly) from the first end 904 to the second end 906. The segmented flared 900 may comprise a plurality of conductive strips. In some cases, a strip may have first end near the input port 102 of the active waveguide 104 (or 105) and a second end near the output port 103 of the active waveguide. In some cases, a strip may have a flared shape having a width that increases (e.g., linearly or nonlinearly) from the first end to the second end of the strip. In some examples, the conductive strips may be electrically isolated. In some other examples, a resistance between a strip and adjacent strips may be significantly larger (e.g., by factor larger than $10^2$, $10^3$, $10^4$, or $10^5$) than the resistance between the strip and the bottom electrode. In various cases, the strips may be electrically isolated by gaps, e.g., etched through the corresponding conductive layer. In some examples, the segmented flared electrode may comprise a center strip, first set of side strips and a second set of side strips. A set of side strips may comprise one or more strips each having a width that increases along the longitudinal direction from the first end 904 of the electrode 900 to the second end 906 of the electrode 900. In various embodiments, the first and the second sets of side stipes may include equal or different number of strips. In the example shown in FIG. 9A, each set of side strips has 6 strips. In various designs, the segmented flared electrode 900 may comprise 2, 3, 4, 5, 6, 7, 8, 9, 10, 11, 12, 13, 14, 15, 16, 17, 18, 19 or 20 strips or any range formed by any of these value or may include more segments in some cases. FIG. 9B shows a close-up view of the first end of the segmented flared electrode 900.

In some cases, an electric potential of each conductive strips relative to the electric potential of the bottom electrode and/or other strips may be controlled separately. In these cases a distribution of the injected current in the gain layer 204a and therefore the distribution of the optical gain across the active waveguide may be by changing a voltage applied between each strip and the bottom electrode. Advantageously, independent control of the potential of the strips of the segmented tailored top electrode 900 may generate a matched injection current profile in the gain layer 204a, wherein the matched injection current profile generates the optical gain having a matched optical gain profile corresponding to an optical intensity distribution associated with the guided optical wave.

In some implementations, an electronic system (e.g., a current supply system) may be used to apply separate voltages to each conductive strip. The separate voltages may be applied such that the injection current profile in the gain layer 204a has a spatial distribution that varies across the lateral direction so as to suppress a lateral mode of the active waveguide. For example, the separate voltages applied by the electronic system may result in generation of a tailored (or matched) injection current profile in the gain layer 204a.

In some cases, a segmented top or bottom electrode, may have a shape different from the shape of the top electrodes described (e.g., segmented top electrode 900, segmented top electrode 222, or segmented top electrodes 408a-408c). For example, a segmented electrode may not have flared shape, the width of the electrode may not be undulated, and/or the segments may have arbitrary shapes. In some such cases, the voltage applied on each segment may be independently controlled (e.g., by an electronic system), to suppress one or more lateral modes of the active waveguide 104, active waveguide 105, or a slab waveguide (e.g., by generating a matched or tailored optical gain profile across the active waveguide).

EXAMPLE EMBODIMENTS

Example embodiments described herein have several features, no single one of which is indispensable or solely responsible for their desirable attributes. A variety of example systems and methods are provided below.
Part-1A Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction, wherein at least a portion of the active waveguide supports a plurality of lateral modes, and wherein the active waveguide comprises a gain layer configured to provide optical gain to light guided in said active waveguide; and
- at least one electrode disposed with respect to the active waveguide to apply an electrical voltage to said active waveguide, said at least one electrode comprising a conductive layer extending in the longitudinal direction and having a width extending in the lateral direction between first and second lateral edges, said width increasing and decreasing multiple times with position along the longitudinal direction, said at least one electrode having a first end closer to said input port than said output port and a second end closer to said output port than said input port, said first end having a smaller lateral width than said second end.

Example 2. The optical amplifier of any of the Examples above, wherein at least one of said first and second lateral edges undulates in the lateral direction.

Example 3. The optical amplifier of any of the Examples above, wherein both said first and second lateral edges undulate in the lateral direction.

Example 4. The optical amplifier of any of Examples 1-3, wherein the at least one electrode has a length, and said first end of said electrode is within 20% of said length from said input port and said second end of said electrode is within 20% of said length from said output port.

Example 5. The optical amplifier of any of Examples 1-3, wherein the at least one electrode has a length, and said first end of said electrode is within 10% of said length from said input port and said second end of said electrode is within 10% of said length from said output port.

Example 6. The optical amplifier of any of Examples 1-3, wherein the at least one electrode has a length, and said first end of said electrode is within 5% of said length from said input port and said second end of said electrode is within 5% of said length from said output port.

Example 7. The optical amplifier of any of Examples 1-3, wherein the at least one electrode has a length, and said first end of said electrode is within 3% of said length from said input port and said second end of said electrode is within 3% of said length from said output port.

Example 8. The optical amplifier of any of Examples 1-3, wherein the at least one electrode has a length, and said first end of said electrode is within 1% of said length from said input port and said second end of said electrode is within 1% of said length from said output port.

Example 9. The optical amplifier of any of the Examples above, wherein the at least one electrode increases in lateral width on average from said first end to said second end.

Example 10. The optical amplifier of any of the Examples above, wherein the lateral width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases with longitudinal direction from the first end to the second end of said electrode along most of the length of said electrode.

Example 11. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases with longitudinal direction from the first end to the second end of said electrode.

Example 12. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases progressively with longitudinal direction from the input port to the output port.

Example 13. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases continuously with longitudinal direction from the input port to the output port.

Example 14. The optical amplifier of any of the Examples above, wherein the width of the at least one electrode varies between a plurality of lower bound widths and a plurality of upper bound widths and an average width associated with the lower bound and upper bound widths increases progressively from the input port to the output port.

Example 15. The optical amplifier of any of Examples 10-14, wherein the lower bound widths progressively increase from the input port to the output port.

Example 16. The optical amplifier of any of Examples 10-15, wherein the upper bound widths progressively increase from the input port to the output port.

Example 17. The optical amplifier of any of Examples 10-16, wherein the lower bound widths remain constant from the input port to the output port.

Example 18. The optical amplifier of any of Examples 10-17, wherein the width changes linearly between the upper bound widths and the lower bound widths.

Example 19. The optical amplifier of any of Examples 10-18, wherein the width changes nonlinearly between the upper bound widths and the lower bound widths.

Example 20. The optical amplifier of any of the Examples above, wherein at least said first lateral edge includes a plurality of points corresponding to said upper bound widths that intersect and are bounded by an upper boundary and a plurality of points corresponding to said lower bound widths that intersect and are bounded by a lower boundary.

Example 21. The optical amplifier of Example 20, wherein said upper boundary comprises a first straight line having a first slope.

Example 22. The optical amplifier of Example 20 or 21, wherein said lower boundary comprises a second straight line having a second slope.

Example 23. The optical amplifier of Example 22, wherein said first and second slopes are different.

Example 24. The optical amplifier of Example 22, wherein said first slope is larger than said second slope.

Example 25. The optical amplifier of any of Examples 20-24, wherein said second straight line is parallel to the length of said electrode.

Example 26. The optical amplifier of any of Examples 1-25, wherein the width of the at least one electrode varies periodically in the longitudinal direction with a width variation period.

Example 27. The optical amplifier of any of Examples 1-26, wherein the at least one electrode comprises a single conductive layer.

Example 28. The optical amplifier of any of the Examples 1-26, wherein the at least one electrode comprises a plurality of electrically isolated segments.

Example 29. The optical amplifier of any of the Examples above, wherein the active waveguide supports a single mode in a vertical direction perpendicular to the longitudinal direction and the lateral direction.

Example 30. The optical amplifier of any of Examples 1-29, wherein the waveguide width progressively increases from the input port to the output port.

Example 31. The optical amplifier of any of Examples 1-29, wherein the waveguide width is constant from the input port to the output port.

Example 32. The optical amplifier of any of the Example above, further comprising a bottom electrode disposed on the bottom surface of said active waveguide.

Example 33. The optical amplifier of Example 32, wherein the bottom electrode uniformly covers at least a region of the bottom surface of the active waveguide associated with an optical intensity profile of the guided light.

Example 34. The optical amplifier of any of the Examples above, wherein the guided light has an optical intensity profile corresponding to that of a fundamental lateral mode of the active waveguide.

Example 35. The optical amplifier of Example 34, wherein the guided light is a fundamental guided optical wave having an optical intensity profile corresponding to that of a fundamental thickness mode of the waveguide.

Example 36. The optical amplifier of any of the Examples above, wherein the waveguide further comprises a top layer and a bottom layer.

Example 37. The optical amplifier of Example 36, wherein the at least one electrode is disposed on the top layer.

Example 38. The optical amplifier of Example 36 or 37, wherein the at least one electrode is disposed under the bottom layer.

Example 39. The optical amplifier of Example 37, wherein the top layer comprises p-type semiconductor material.

Example 40. The optical amplifier of any of Examples 1-39, wherein the input light is a free space Gaussian optical beam.

Example 41. The optical amplifier of any of Examples 1-40, wherein the portion of said amplified light output via the output port comprises a diffraction limited free-space optical beam.

Example 42. The optical amplifier of any of Examples 1-39, wherein the input light is another guided optical wave having an optical intensity distribution associated with the fundamental lateral mode of the active waveguide.

Example 43. The optical amplifier of any of Examples 1-39, wherein the portion of said amplified light output via the output port comprises another guided optical wave having a fundamental lateral mode profile, wherein the fundamental lateral mode profile comprises an optical intensity distribution associated with the fundamental lateral mode of the active waveguide.

Example 44. The optical amplifier of any of Examples 42 or 43, wherein an optical intensity distribution of output light is a Gaussian distribution.

Example 45. A master oscillator power amplifier (MOPA) device configured to generate an output optical beam, wherein the MOPA device comprising the optical amplifier of any of the Examples above.

Example 46. A semiconductor laser configured to generate an output optical beam, the semiconductor laser comprising the optical amplifier of any of the Examples above.

Example 47. The optical amplifier of any of Examples 1-37 and 39-46, wherein the at least one electrode comprises a top electrode.

Example 48. The optical amplifier of any of Examples 1-31, 34-36, 38, and 39-46, wherein said electrode comprises a bottom electrode.

Example 49. The optical amplifier of any of the Examples above, wherein said active waveguide comprises a slab waveguide.

Example 50. The optical amplifier of any of the Examples above, wherein said active waveguide is rectangular.

Example 51. The optical amplifier of any of the Examples above, wherein said active waveguide is flared.

Example 52. The optical amplifier of any of the Examples above, wherein said active waveguide is not flared.

Example 53. A master oscillator power amplifier (MOPA) device configured to generate an output optical beam, the MOPA device comprising:
 a semiconductor laser section configured to generate laser light, the semiconductor laser comprising:
 a first reflector and a second optical reflector;
 a waveguide disposed between the first and the second optical reflectors, said waveguide including at least an active region configured to provide optical gain, the first optical reflector, the second optical reflector and the waveguide forming an active laser cavity;
 a semiconductor optical amplifier section disposed to receive the laser light via an input port to be guided therein, amplify at least a portion of said input light that is guided in the optical amplifier, and output at least a portion of said amplified light via an output port, the semiconductor optical amplifier comprising:
 an active waveguide extending in a longitudinal direction between the input port and the output port and having a waveguide width extending in a lateral direction between first and second lateral edges, wherein at least a portion of the active waveguide supports a plurality of lateral modes, and wherein the active waveguide comprises a gain layer configured to provide optical gain to light guided in said active waveguide;
 at least one electrode disposed with respect to the active waveguide to apply a voltage to said active waveguide, said at least one electrode comprising a conductive layer extending in the longitudinal direction and having a width extending in the lateral direction that that increases and decreases multiple times with position along the longitudinal direction, said at least one electrode having a first end closer to said input port than said output port and a second end closer to said output port than said input port, said first end having a smaller lateral width than said second end.

Example 54. The master oscillator power amplifier (MOPA) device of Example 53 wherein said at least one electrode comprises a tailored electrode disposed on the active waveguide and configured to support a matched injection current profile in the gain layer, wherein the matched injection current profile generates a matched optical gain profile corresponding to an optical intensity distribution associated with the light guided in the active waveguide.

Example 55. A flared semiconductor laser configured to generate an output optical beam, the flared semiconductor laser comprising:
 a first optical reflector and a second optical reflector;
 an active waveguide extending in a longitudinal direction between the first and the second optical reflectors, said active waveguide having a waveguide width extending in a lateral direction between first and second lateral edges, wherein at least a portion of the active waveguide supports a plurality of lateral modes, and wherein the active waveguide comprises a gain layer configured to provide optical gain to light within an optical cavity formed by the first optical reflector, the second optical reflector and the active waveguide;
 at least one electrode disposed with respect to the active waveguide to apply a voltage to said active waveguide, said at least one electrode comprising a conductive layer extending in the longitudinal direction and having a width extending in the lateral direction that increases and decreases multiple times with position along the longitudinal direction, said at least one electrode having a first end closer to said first optical reflector than said second optical reflector and a second end closer to said second optical reflector than said first optical reflector, said first end having a smaller lateral width than said second end.

Example 56. The flared semiconductor laser of Example 55, wherein said at least one electrode comprises a tailored electrode disposed on the active waveguide and configured to support a matched injection current profile in the gain layer, wherein the matched injection current profile generates a matched optical gain profile corresponding to an optical intensity distribution of light guided within the active waveguide.

Example 57. The flared semiconductor laser of any of the Examples 55 and 56, wherein said electrode comprises a top electrode.

Example 58. The flared semiconductor laser of any of the Examples 55 to 57, wherein said electrode comprises a bottom electrode.

Example 59. An optical amplifier configured to receive input light via an input port to be guided therein, amplify at least a portion of said input light that is guided in the optical amplifier, and output at least a portion of said amplified light via an output port, wherein the optical amplifier comprises:
 an active waveguide extending in a longitudinal direction, said active waveguide disposed between the input port and the output port and having a waveguide width extending in a lateral direction between first and second lateral edges, said active waveguide supporting a plurality of lateral modes, said active waveguide providing optical gain to the input light that is guided; and
 at least one top electrode and one bottom electrode disposed with respect to the active waveguide to apply an electrical voltage to said active waveguide to direct an injection current into said active waveguide, and to generate an optical gain profile within said active waveguide.
 wherein said optical amplifier comprises a plurality of layers, at least some of said layers forming said active waveguide and said at least one top electrode and one bottom electrode, and
 wherein said top and/or bottom electrode is configured such that the optical gain profile within said active waveguide has a spatial distribution across said lateral direction so as to suppress at least one of said lateral modes, and wherein said active waveguide has a first end closer to said input port than said output port and a second end closer to said output port than said input port, said first end having a smaller lateral width than said second end.

Part-1B

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction, wherein at least a portion of the active waveguide supports a plurality of lateral modes, and wherein the active waveguide comprises a gain layer configured to provide optical gain to light guided in said active waveguide; and
- at least one electrode disposed with respect to the active waveguide to apply an electrical voltage to said active waveguide, said at least one electrode comprising a conductive layer extending in the longitudinal direction and having a width extending in the lateral direction between first and second lateral edges, said width increasing and decreasing multiple times with position along the longitudinal direction, said at least one electrode having a first end closer to said input port than said output port and a second end closer to said output port than said input port.

Example 2. The optical amplifier of any of the Examples above, wherein at least one of said first and second lateral edges undulates in the lateral direction.

Example 3. The optical amplifier of any of the Examples above, wherein both said first and second lateral edges undulate in the lateral direction.

Example 4. The optical amplifier of any of Examples 1-3, wherein the at least one electrode has a length, and said first end of said electrode is within 20% of said length from said input port and said second end of said electrode is within 20% of said length from said output port.

Example 5. The optical amplifier of any of Examples 1-3, wherein the at least one electrode has a length, and said first end of said electrode is within 10% of said length from said input port and said second end of said electrode is within 10% of said length from said output port.

Example 6. The optical amplifier of any of Examples 1-3, wherein the at least one electrode has a length, and said first end of said electrode is within 5% of said length from said input port and said second end of said electrode is within 5% of said length from said output port.

Example 7. The optical amplifier of any of Examples 1-3, wherein the at least one electrode has a length, and said first end of said electrode is within 3% of said length from said input port and said second end of said electrode is within 3% of said length from said output port.

Example 8. The optical amplifier of any of Examples 1-3, wherein the at least one electrode has a length, and said first end of said electrode is within 1% of said length from said input port and said second end of said electrode is within 1% of said length from said output port.

Example 9. The optical amplifier of any of the Examples above, wherein the at least one electrode increases in lateral width on average from said first end to said second end.

Example 10. The optical amplifier of any of the Examples above, wherein the lateral width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases with longitudinal direction from the first end to the second end of said electrode along most of the length of said electrode.

Example 11. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases with longitudinal direction from the first end to the second end of said electrode.

Example 12. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases progressively with longitudinal direction from the input port to the output port.

Example 13. The optical amplifier of any of the Examples above, wherein the width of the at least one electrode increases and decreases varying between a plurality of lower bound widths and a plurality of upper bound widths, increasing with longitudinal direction from the lower bound widths and decreasing with longitudinal direction from the upper bound widths, said variations in said lateral width of said electrode averaged over a distance in the longitudinal direction that includes multiple lower bound widths and multiple upper bound widths producing an average width that increases continuously with longitudinal direction from the input port to the output port.

Example 14. The optical amplifier of any of the Examples above, wherein the width of the at least one electrode varies between a plurality of lower bound widths and a plurality of upper bound widths and an average width associated with the lower bound and upper bound widths increases progressively from the input port to the output port.

Example 15. The optical amplifier of any of Examples 10-14, wherein the lower bound widths progressively increase from the input port to the output port.

Example 16. The optical amplifier of any of Examples 10-14, wherein the lower bound widths remain constant from the input port to the output port.

Example 17. The optical amplifier of any of Examples 10-16, wherein the upper bound widths progressively increase from the input port to the output port.

Example 18. The optical amplifier of any of Examples 10-17, wherein the width changes linearly between the upper bound widths and the lower bound widths.

Example 19. The optical amplifier of any of Examples 10-18, wherein the width changes nonlinearly between the upper bound widths and the lower bound widths.

Example 20. The optical amplifier of any of the Examples above, wherein at least said first lateral edge includes a plurality of points corresponding to said upper bound widths that intersect and are bounded by an upper boundary and a plurality of points corresponding to said lower bound widths that intersect and are bounded by a lower boundary.

Example 21. The optical amplifier of Example 20, wherein said upper boundary comprises a first straight line having a first slope.

Example 22. The optical amplifier of Example 20 or 21, wherein said lower boundary comprises a second straight line having a second slope.

Example 23. The optical amplifier of Example 22, wherein said first and second slopes are different.

Example 24. The optical amplifier of Example 22, wherein said first slope is larger than said second slope.

Example 25. The optical amplifier of any of Examples 20-24, wherein said second straight line is parallel to the length of said electrode.

Example 26. The optical amplifier of any of Examples 1-25, wherein the width of the at least one electrode varies periodically in the longitudinal direction with a width variation period.

Example 27. The optical amplifier of any of Examples 1-26, wherein the at least one electrode comprises a single conductive layer.

Example 28. The optical amplifier of any of the Examples 1-26, wherein the at least one electrode comprises a plurality of electrically isolated segments.

Example 29. The optical amplifier of any of the Examples above, wherein the active waveguide supports a single mode in a vertical direction perpendicular to the longitudinal direction and the lateral direction.

Example 30. The optical amplifier of any of Examples 1-29, wherein the waveguide width progressively increases from the input port to the output port.

Example 31. The optical amplifier of any of Examples 1-29, wherein the waveguide width is constant from the input port to the output port.

Example 32. The optical amplifier of any of the Example above, further comprising a bottom electrode disposed on the bottom surface of said active waveguide.

Example 33. The optical amplifier of Example 32, wherein the bottom electrode uniformly covers at least a region of the bottom surface of the active waveguide associated with an optical intensity profile of the guided light.

Example 34. The optical amplifier of any of the Examples above, wherein the guided light has an optical intensity profile corresponding to that of a fundamental lateral mode of the active waveguide.

Example 35. The optical amplifier of Example 34, wherein the guided light is a fundamental guided optical wave having an optical intensity profile corresponding to that of a fundamental thickness mode of the waveguide.

Example 36. The optical amplifier of any of the Examples above, wherein the waveguide further comprises a top layer and a bottom layer.

Example 37. The optical amplifier of Example 36, wherein the at least one electrode is disposed on the top layer.

Example 38. The optical amplifier of Example 36 or 37, wherein the at least one electrode is disposed under the bottom layer.

Example 39. The optical amplifier of Example 37, wherein the top layer comprises p-type semiconductor material.

Example 40. The optical amplifier of any of Examples 1-39, wherein the input light is a free space Gaussian optical beam.

Example 41. The optical amplifier of any of Examples 1-40, wherein the portion of said amplified light output via the output port comprises a diffraction limited free-space optical beam.

Example 42. The optical amplifier of any of Examples 1-39, wherein the input light is another guided optical wave having an optical intensity distribution associated with the fundamental lateral mode of the active waveguide.

Example 43. The optical amplifier of any of Examples 1-39, wherein the portion of said amplified light output via the output port comprises another guided optical wave having a fundamental lateral mode profile, wherein the fundamental lateral mode profile comprises an optical intensity distribution associated with the fundamental lateral mode of the active waveguide.

Example 44. The optical amplifier of any of Examples 42 or 43, wherein an optical intensity distribution of output light is a Gaussian distribution.

Example 45. A master oscillator power amplifier (MOPA) device configured to generate an output optical beam, wherein the MOPA device comprises the optical amplifier of any of the Examples above.

Example 46. A semiconductor laser configured to generate an output optical beam, the semiconductor laser comprising the optical amplifier of any of the Examples above.

Example 47. The optical amplifier of any of Examples 1-37 and 39-46, wherein the at least one electrode comprises a top electrode.

Example 48. The optical amplifier of any of Examples 1-31, 34-36, 38, and 39-46, wherein said electrode comprises a bottom electrode.

Example 49. The optical amplifier of any of the Examples above, wherein said active waveguide comprises a slab waveguide.

Example 50. The optical amplifier of any of the Examples above, wherein said active waveguide is rectangular.

Example 51. The optical amplifier of any of the Examples above, wherein said active waveguide is flared.

Example 52. The optical amplifier of any of the Examples above, wherein said active waveguide is not flared.

Example 53. The optical amplifier of any of the Examples above, wherein said at least one electrode is flared.

Example 54. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over multiple of said protrusions on one side of said electrode.

Example 55. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 3 said protrusions on one side of said electrode.

Example 56. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 5 said protrusions on one side of said electrode.

Example 57. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 10 said protrusions on one side of said electrode.

Example 58. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 15 said protrusions on one side of said electrode.

Example 59. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 20 said protrusions on one side of said electrode.

Example 60. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 30 said protrusions on one side of said electrode.

Example 61. The optical amplifier of any of the Examples above, wherein said at least one electrode has an average width extending in the lateral direction that increases over most the length of the electrode along the longitudinal direction.

Example 62. The optical amplifier of any of the Examples above, wherein said at least one electrode has an average width extending in the lateral direction that increases over 75% of the length of the electrode along the longitudinal direction.

Example 63. The optical amplifier of any of the Examples above, wherein said at least one electrode has an average width extending in the lateral direction that increases over 90% of the length of the electrode along the longitudinal direction.

Example 64. The optical amplifier of any of the Examples above, wherein said at least one electrode has an average width extending in the lateral direction that increases from said first end to said second end.

Example 65. The optical amplifier of any of the Examples above, wherein said first end of said at least one electrode has a smaller lateral width than said second end.

Example 66. The optical amplifier of any of the Examples above, wherein said at least one electrode extends in the longitudinal direction and has a width extending in the lateral direction between first and second lateral edges, said width increasing and decreasing multiple times with position along the longitudinal direction.

Example 67. The optical amplifier of any of the Examples above, wherein said at least one electrode extends in the longitudinal direction and has a width extending in the lateral direction between first and second lateral edges, said width increasing and decreasing multiple times with position along the longitudinal direction thereby forming protrusions.

Example 68. The optical amplifier of any of the Examples above, wherein at least some of said protrusions have a length extending in the lateral direction that is least 10% of the average width of the electrode extending in the lateral direction.

Example 69. The optical amplifier of any of the Examples above, wherein at least some of said protrusions have a length extending in the lateral direction that is at least 15% of the average width of the electrode extending in the lateral direction.

Example 70. The optical amplifier of any of the Examples above, wherein at least some of said protrusions have a length extending in the lateral direction that is at least 20% of the average width of the electrode extending in the lateral direction.

Example 71. The optical amplifier of any of the Examples above, wherein at least some of said protrusions have a length extending in the lateral direction that is at least 25% of the average width of the electrode extending in the lateral direction.

Example 72. The optical amplifier of any of the Examples above, wherein at least some of said protrusions have a length extending in the lateral direction that is at least 30% of the average width of the electrode extending in the lateral direction.

Example 73. The optical amplifier of any of the Examples above, wherein at least some of said protrusions have a length extending in the lateral direction that is at least 35% of the average width of the electrode extending in the lateral direction.

Example 74. The optical amplifier of any of the Examples above, wherein at least some of said protrusions have a length extending in the lateral direction that is at least 40% of the average width of the electrode extending in the lateral direction.

Example 75. The optical amplifier of any of the Examples above, wherein said a least some of said protrusions have a length extending in the lateral direction that is at least 10% of the maximum width of the electrode extending in the lateral direction.

Example 76. The optical amplifier of any of the Examples above, wherein said a least some of said protrusions have a length extending in the lateral direction that is at least 15% of the maximum width of the electrode extending in the lateral direction.

Example 77. The optical amplifier of any of the Examples above, wherein said a least some of said protrusions have a length extending in the lateral direction that is at least 20% of the maximum width of the electrode extending in the lateral direction.

Example 78. The optical amplifier of any of the Examples above, wherein said a least some of said protrusions have a length extending in the lateral direction that is at least 25% of the maximum width of the electrode extending in the lateral direction.

Example 79. The optical amplifier of any of the Examples above, wherein said a least some of said protrusions have a length extending in the lateral direction that is at least 30% of the maximum width of the electrode extending in the lateral direction.

Example 80. The optical amplifier of any of the Examples above, wherein said a least some of said protrusions have a length extending in the lateral direction that is at least 35% of the maximum width of the electrode extending in the lateral direction.

Example 81. The optical amplifier of any of the Examples above, wherein said a least some of said protrusions have a length extending in the lateral direction that is at least 40% of the maximum width of the electrode extending in the lateral direction.

Example 82. The optical amplifier of any of the Examples above, wherein at least one of said first and second lateral edges of said electrode is smooth.

Example 83. The optical amplifier of any of the Examples above, wherein at least one of said first and second lateral edges of said electrode is substantially smooth.

Example 84. The optical amplifier of any of the Examples above, wherein at least one of said first and second lateral edges of said electrode is mostly smooth.

Example 85. The optical amplifier of any of the Examples above, wherein at least one of said first and second lateral edges of said electrode is smooth over 90% thereof.

Example 86. The optical amplifier of any of the Examples above, wherein at least one of said first and second lateral edges of said electrode is smooth over 80% thereof.

Example 87. The optical amplifier of any of the Examples above, wherein at least one of said first and second lateral edges of said electrode is smooth over 70% thereof.

Example 88. The optical amplifier of any of the Examples above, wherein at least one of said first and second lateral edges of said electrode is smooth over 60% thereof.

Example 89. The optical amplifier of any of the Examples above, wherein at least one of said first and second lateral edges of said electrode is smooth over 50% thereof.

Example 90. The optical amplifier of any of the Examples above, wherein at least one of said first and second lateral edges of said electrode is smooth over 40% thereof.

Example 91. The optical amplifier of any of the Examples above, wherein at least one of said first and second lateral edges of said electrode is non-random.

Example 92. The optical amplifier of any of the Examples above, wherein at least one electrode has first and second lateral edges that is non-random.

Example 93. The optical amplifier of any of the Examples above, wherein said at least one electrode has non-random shape.

Example 94. The optical amplifier of any of the Examples above, wherein said at least one electrode extends in the longitudinal direction and has a width extending in the lateral direction between first and second lateral edges, said width increasing and decreasing multiple times with position along the longitudinal direction in a non-random manner.

Example 95. The optical amplifier of any of the Examples above, wherein at least one of said lateral edges of said conductive layer is non-random.

Example 96. The optical amplifier of any of the Examples above, wherein at least one of said first and second lateral edges of said conductive layer is non-random.

Example 97. The optical amplifier of any of the Examples above, wherein at least one of said first and second lateral edges of said conductive layer is smooth over 95% thereof.

Example 98. The optical amplifier of any of the Examples above, wherein at least one of said first and second lateral edges of said conductive layer is smooth over 90% thereof.

Example 99. The optical amplifier of any of the Examples above, wherein at least one of said first and second lateral edges of said conductive layer is smooth over 80% thereof.

Example 100. The optical amplifier of any of the Examples above, wherein at least one of said first and second lateral edges of said conductive layer are smooth over 70% thereof.

Example 101. The optical amplifier of any of the Examples above, wherein at least one of said first and second lateral edges of said conductive layer is smooth over 60% thereof.

Example 102. The optical amplifier of any of the Examples above, wherein at least one of said first and second lateral edges of said conductive layer is smooth over 50% thereof.

Example 103. The optical amplifier of any of the Examples above, wherein at least one of said first and second lateral edges of said conductive layer is smooth over 40% thereof.

Example 104. The optical amplifier of any of the Examples above, wherein both of said first and second lateral edges of said electrode are substantially smooth.

Example 105. The optical amplifier of any of the Examples above, wherein both of said first and second lateral edges of said electrode are mostly smooth.

Example 106. The optical amplifier of any of the Examples above, wherein both of said first and second lateral edges of said electrode are smooth over 95% thereof.

Example 107. The optical amplifier of any of the Examples above, wherein both of said first and second lateral edges of said electrode are smooth over 90% thereof.

Example 108. The optical amplifier of any of the Examples above, wherein both of said first and second lateral edges of said electrode are smooth over 80% thereof.

Example 109. The optical amplifier of any of the Examples above, wherein both of said first and second lateral edges of said electrode are smooth over 70% thereof.

Example 110. The optical amplifier of any of the Examples above, wherein both of said first and second lateral edges of said electrode are smooth over 60% thereof.

Example 111. The optical amplifier of any of the Examples above, wherein both of said first and second lateral edges of said electrode are smooth over 50% thereof.

Example 112. The optical amplifier of any of the Examples above, wherein both said first and second lateral edges of said electrode are smooth over 40% thereof.

Example 113. The optical amplifier of any of the Examples above, wherein both of said first and second lateral edges of said electrode are non-random.

Example 114. The optical amplifier of any of the Examples above, wherein both of said lateral edges of said conductive layer are non-random.

Example 115. The optical amplifier of any of the Examples above, wherein both of said first and second lateral edges of said conductive layer are non-random.

Example 116. The optical amplifier of any of the Examples above, wherein both of said first and second lateral edges of said conductive layer are smooth over 95% thereof.

Example 117. The optical amplifier of any of the Examples above, wherein both of said first and second lateral edges of said conductive layer are smooth over 90% thereof.

Example 118. The optical amplifier of any of the Examples above, wherein both of said first and second lateral edges of said conductive layer are smooth over 80% thereof.

Example 119. The optical amplifier of any of the Examples above, wherein both of said first and second lateral edges of said conductive layer are smooth over 70% thereof.

Example 120. The optical amplifier of any of the Examples above, wherein both of said first and second lateral edges of said conductive layer are smooth over 60% thereof.

Example 121. The optical amplifier of any of the Examples above, wherein both of said first and second lateral edges of said conductive layer are smooth over 50% thereof.

Example 122. The optical amplifier of any of the Examples above, wherein both of said first and second lateral edges of said conductive layer are smooth over 40% thereof.

Example 123. A master oscillator power amplifier (MOPA) device configured to generate an output optical beam, the MOPA device comprising:
a semiconductor laser section configured to generate laser light, the semiconductor laser comprising:
a first reflector and a second optical reflector;
a waveguide disposed between the first and the second optical reflectors, said waveguide including at least an active region configured to provide optical gain, the first optical reflector, the second optical reflector and the waveguide forming an active laser cavity;
a semiconductor optical amplifier section disposed to receive the laser light via an input port to be guided therein, amplify at least a portion of said input light that is guided in the optical amplifier, and output at least a portion of said amplified light via an output port, the semiconductor optical amplifier comprising:
an active waveguide extending in a longitudinal direction between the input port and the output port and having a waveguide width extending in a lateral direction between first and second lateral edges, wherein at least a portion of the active waveguide supports a plurality of lateral modes, and wherein the active waveguide comprises a gain layer configured to provide optical gain to light guided in said active waveguide;
at least one electrode disposed with respect to the active waveguide to apply a voltage to said active waveguide, said at least one electrode comprising a conductive layer extending in the longitudinal direction and having a width extending in the lateral direction that that increases and decreases multiple times with position along the longitudinal direction, said at least one electrode having a first end closer to said input port than said output port and a second end closer to said output port than said input port.

Example 124. The master oscillator power amplifier (MOPA) device of Example 66 wherein said at least one electrode comprises a tailored electrode disposed on the active waveguide and configured to support a matched injection current profile in the gain layer, wherein the matched injection current profile generates a matched optical gain profile corresponding to an optical intensity distribution associated with the light guided in the active waveguide.

Example 125. The device of any of the Examples above, wherein said at least one electrode is flared.

Example 126. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over multiple of said protrusions on one side of said electrode.

Example 127. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 3 said protrusions on one side of said electrode.

Example 128. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 5 said protrusions on one side of said electrode.

Example 129. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 10 said protrusions on one side of said electrode.

Example 130. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 15 said protrusions on one side of said electrode.

Example 131. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 20 said protrusions on one side of said electrode.

Example 132. The device of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 30 said protrusions on one side of said electrode.

Example 133. The device of any of the Examples above, wherein said at least one electrode has an average width extending in the lateral direction that increases over most the length of the electrode along the longitudinal direction.

Example 134. The device of any of the Examples above, wherein said at least one electrode has an average width extending in the lateral direction that increases over 75% of the length of the electrode along the longitudinal direction.

Example 135. The device of any of the Examples above, wherein said at least one electrode has an average width extending in the lateral direction that increases over 90% of the length of the electrode along the longitudinal direction.

Example 136. The device of any of the Examples above, wherein said at least one electrode has an average width extending in the lateral direction that increases from said first end to said second end.

Example 137. The device of any of the Examples above, wherein said first end of said at least one electrode has a smaller lateral width than said second end.

Example 138. A flared semiconductor laser configured to generate an output optical beam, the flared semiconductor laser comprising:
- a first optical reflector and a second optical reflector;
- an active waveguide extending in a longitudinal direction between the first and the second optical reflectors, said active waveguide having a waveguide width extending in a lateral direction between first and second lateral edges, wherein at least a portion of the active waveguide supports a plurality of lateral modes, and wherein the active waveguide comprises a gain layer configured to provide optical gain to light within an optical cavity formed by the first optical reflector, the second optical reflector and the active waveguide;
- at least one electrode disposed with respect to the active waveguide to apply a voltage to said active waveguide, said at least one electrode comprising a conductive layer extending in the longitudinal direction and having a width extending in the lateral direction that increases and decreases multiple times with position along the longitudinal direction, said at least one electrode having a first end closer to said first optical reflector than said second optical reflector and a second end closer to said second optical reflector than said first optical reflector.

Example 139. The flared semiconductor laser of Example 138, wherein said at least one electrode comprises a tailored electrode disposed on the active waveguide and configured to support a matched injection current profile in the gain layer, wherein the matched injection current profile generates a matched optical gain profile corresponding to an optical intensity distribution of light guided within the active waveguide.

Example 140. The flared semiconductor laser of any of the Examples 138 and 139, wherein said electrode comprises a top electrode.

Example 141. The flared semiconductor laser of any of the Examples 138 to 140, wherein said electrode comprises a bottom electrode.

Example 142. The laser of any of the Examples above, wherein said at least one electrode is flared.

Example 143. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over multiple of said protrusions on one side of said electrode.

Example 144. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 3 said protrusions on one side of said electrode.

Example 145. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 5 said protrusions on one side of said electrode.

Example 146. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 10 said protrusions on one side of said electrode.

Example 147. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 15 said protrusions on one side of said electrode.

Example 148. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 20 said protrusions on one side of said electrode.

Example 149. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 30 said protrusions on one side of said electrode.

Example 150. The laser of any of the Examples above, wherein said at least one electrode has an average width extending in the lateral direction that increases over most the length of the electrode along the longitudinal direction.

Example 151. The laser of any of the Examples above, wherein said at least one electrode has an average width extending in the lateral direction that increases over 75% of the length of the electrode along the longitudinal direction.

Example 152. The laser of any of the Examples above, wherein said at least one electrode has an average width extending in the lateral direction that increases over 90% of the length of the electrode along the longitudinal direction.

Example 153. The laser of any of the Examples above, wherein said at least one electrode has an average width extending in the lateral direction that increases from said first end to said second end.

Example 154. The laser of any of the Examples above, wherein said first end of said at least one electrode has a smaller lateral width than said second end.

Example 155. A laser configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction, said active waveguide disposed between the input port and the output port and having a waveguide width extending in a lateral direction between first and second lateral edges, said active waveguide supporting a plurality of lateral modes, said active waveguide providing optical gain to the input light that is guided; and
- at least one top electrode and one bottom electrode disposed with respect to the active waveguide to apply an electrical voltage to said active waveguide to direct an injection current into said active waveguide, and to generate an optical gain profile within said active waveguide.
- wherein said optical amplifier comprises a plurality of layers, at least some of said layers forming said active waveguide and said at least one top electrode and one bottom electrode, and
- wherein said top and/or bottom electrode is configured such that the optical gain profile within said active waveguide has a spatial distribution across said lateral direction so as to suppress at least one of said lateral modes, and
- wherein said active waveguide has a first end closer to said input port than said output port and a second end closer to said output port than said input port, said first end having a smaller lateral width than said second end.

Example 156. The laser of any of the Examples above, wherein said at least one electrode is flared.

Example 157. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over multiple of said protrusions on one side of said electrode.

Example 158. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 3 said protrusions on one side of said electrode.

Example 159. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 5 said protrusions on one side of said electrode.

Example 160. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 10 said protrusions on one side of said electrode.

Example 161. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 15 said protrusions on one side of said electrode.

Example 162. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 20 said protrusions on one side of said electrode.

Example 163. The laser of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 30 said protrusions on one side of said electrode.

Example 164. The laser of any of the Examples above, wherein said at least one electrode has an average width extending in the lateral direction that increases over most the length of the electrode along the longitudinal direction.

Example 165. The laser of any of the Examples above, wherein said at least one electrode has an average width extending in the lateral direction that increases over 75% of the length of the electrode along the longitudinal direction.

Example 166. The laser of any of the Examples above, wherein said at least one electrode has an average width extending in the lateral direction that increases over 90% of the length of the electrode along the longitudinal direction.

Example 167. The laser of any of the Examples above, wherein said at least one electrode has an average width extending in the lateral direction that increases from said first end to said second end.

Part-2

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction, said active waveguide disposed between the input port and the output port and having a waveguide width extending in a lateral direction between first and second lateral edges, said active waveguide supporting a plurality of lateral modes, said active waveguide providing optical gain to the input light that is guided therein; and
- at least one top electrode and one bottom electrode disposed with respect to the active waveguide to apply an electrical voltage to said active waveguide to direct an injection current into said active waveguide and to generate an optical gain profile within said active waveguide,
- wherein said optical amplifier comprises a plurality of layers, at least some of said layers forming said active waveguide and said at least one top electrode and one bottom electrode, and
- wherein at least one parameter of at least one of said plurality of layers varies spatially along said lateral direction such that the optical gain profile within said active waveguide has a spatial distribution across said lateral direction so as to suppress at least one of said lateral modes.

Example 2. The optical amplifier of Example 1, wherein said at least one of said plurality of layers having said at least one parameter that varies, comprises said top electrode.

Example 3. The optical amplifier of Example 1 or 2, wherein said at least one of said plurality of layers having said at least one parameter that varies, comprises said bottom electrode.

Example 4. The optical amplifier of any of the Examples 2 and 3, wherein said top electrode comprises metal.

Example 5. The optical amplifier of any of the Examples 2 to 4, wherein said bottom electrode comprises metal.

Example 6. The optical amplifier of any of the Examples above, wherein said at least one of said plurality of layers having said at least one parameter that varies comprises a contact layer.

Example 7. The optical amplifier of Example 6, wherein said contact layer comprises doped semiconductor.

Example 8. The optical amplifier of any of the Examples above, wherein said at least one of said plurality of layers having said at least one parameter that varies, comprises at least one buffer layer.

Example 9. The optical amplifier of any of the Examples above, wherein said at least one of said plurality of layers having said at least one parameter that varies, comprises a waveguide layer.

Example 10. The optical amplifier of any of the Examples above, wherein said at least one of said plurality of layers having said at least one parameter that varies, comprises an active waveguide layer.

Example 11. The optical amplifier of Example 10, wherein said waveguide layer comprises a gain layer, a first waveguide sublayer and a second waveguide sublayer.

Example 12. The optical amplifier of any of the Examples 2-11, wherein said at least one of said plurality of layers having said at least one parameter that varies comprises a dielectric layer that impedes current flow from said top or bottom electrode to at least a portion of said active waveguide.

Example 13. The optical amplifier of any of the Examples 2-11, wherein said at least one of said plurality of layers having said at least one parameter that varies comprises a partially resistive layer that impedes current flow from said top or bottom electrode to at least a portion of said active waveguide.

Example 14. The optical amplifier of any of the Examples 2-11, wherein said at least one of said plurality of layers having said at least one parameter that varies comprises a partially conductive layer that provides higher current flow from said top or bottom electrode to at least a portion of said active waveguide than to other portions of said active waveguide.

Example 15. The optical amplifier of any of the Examples above, wherein said at least one of said plurality of layers having said at least one parameter that varies, comprises a gain layer.

Example 16. The optical amplifier of any of the Examples above, wherein said at least one of said plurality of layers having said at least one parameter that varies, comprises a layer comprising one or more quantum wells, quantum wires, quantum dots or any combination thereof.

Example 17. The optical amplifier of Example 16, wherein said at least one parameter comprises a parameter of said one or more quantum wells, quantum wires, and/or quantum dots.

Example 18. The optical amplifier of Example 16 or 17, wherein said at least one parameter comprises the lateral size of said one or more quantum wells, quantum wires, and/or quantum dots.

Example 19. The optical amplifier of any of Examples 16-18, wherein said at least one parameter comprises the height or thickness of said one or more quantum wells, quantum wires, and/or quantum dots.

Example 20. The optical amplifier of any of Examples 16-19, wherein said at least one parameter comprises the density of said quantum wells, quantum wires, and/or quantum dots.

Example 21. The optical amplifier of any of Examples 16-19, wherein said at least one parameter comprises the area covered by said one or more said quantum wells, quantum lines, and/or quantum dots.

Example 22. The optical amplifier of any of Examples 16-18, wherein said at least one parameter comprises a fraction of unit area covered by said one or more said quantum wells, quantum wires, and/or quantum dots.

Example 23. The optical amplifier of any of Examples 16-22, wherein said at least one parameter comprises the spatial distribution of quantum wells, quantum wires, and/or quantum dots.

Example 24. The optical amplifier of any of Examples 16-23, wherein said at least one parameter comprises the band gap said one or more quantum wells, quantum wires, and/or quantum dots.

Example 25. The optical amplifier of any of Examples 16-24, wherein said at least one parameter comprises the density of ions in a layer.

Example 26. The optical amplifier of any of Examples 16-25, wherein said at least one parameter comprises the depth of ions in a layer.

Example 27. The optical amplifier of Example 26, wherein said ions are configured to impede current.

Example 28. The optical amplifier of any of Examples 16-27, wherein said at least one parameter comprises the concentration of dopants in a layer.

Example 29. The optical amplifier of Example 28, wherein said dopants are configured to increase conductivity.

Example 30. The optical amplifier of any Example 11 or 15, wherein said at least one parameter comprises a thickness of said gain layer.

Example 31. The optical amplifier of any of the Examples above, wherein said at least one parameter comprises the width of said at least one of said plurality of layers in the lateral direction.

Example 32. The optical amplifier of any of the Examples above, wherein said at least one parameter comprises the width of a patterned portion of said at least one of said plurality of layers.

Example 33. The optical amplifier of any of the Examples above, wherein said at least one parameter comprises the resistivity of said at least one of said plurality of layers.

Example 34. The optical amplifier of any of the Examples above, wherein said at least one parameter comprises the thickness said at least one of said plurality of layers.

Example 35. The optical amplifier of any of the Examples above, wherein said at least one parameter is graded across said lateral direction.

Example 36. The optical amplifier of any of the Examples above, wherein said at least one parameter is graded across said longitudinal direction.

Example 37. The optical amplifier of any of the Examples above, wherein said at least one parameter varies smoothly across said lateral direction.

Example 38. The optical amplifier of any of the Examples above, wherein said at least one parameter varies smoothly across said longitudinal direction.

Example 39. The optical amplifier of any of the Examples above, wherein said at least one parameter varies smoothly across said lateral and/or longitudinal direction such that said parameter has at least three levels of magnitude across one of said plurality of layers.

Example 40. The optical amplifier of any of the Examples above, wherein said at least one parameter varies smoothly across said lateral and/or longitudinal direction such that said parameter has at least four levels of magnitude across one of said plurality of layers.

Example 41. The optical amplifier of any of the Examples above, wherein said at least one parameter varies smoothly across said lateral and/or longitudinal direction such that said parameter has at least five levels of magnitude across one of said plurality of layers.

Example 42. The optical amplifier of any of the Examples above, wherein said at least one parameter varies smoothly across said lateral and/or longitudinal direction such that said parameter has at least eight levels of magnitude across one of said plurality of layers.

Example 43. The optical amplifier of any of the Examples above, wherein said at least one parameter varies smoothly across said lateral and/or longitudinal direction to create a grayscale-like variation of said parameter.

Example 44. The optical amplifier of any of the Examples above, wherein said at least one parameter varies abruptly in said lateral direction.

Example 45. The optical amplifier of any of the Examples above, wherein said at least one parameter of at least one of said plurality of layers varies spatially along said longitudinal direction such that said injection current provided to said active waveguide has a spatial distribution across said lateral direction that varies along the longitudinal direction.

Example 46. The optical amplifier of any of the Examples above, wherein said at least one parameter has a spatial distribution across lateral and longitudinal directions that is flared.

Example 47. The optical amplifier of any of the Examples above, wherein said at least one parameter has a spatial distribution across lateral and longitudinal directions having a width that is larger closer to said output port than said input port.

Example 48. The optical amplifier of any of the Examples above, wherein said at least one parameter has a spatial distribution across lateral and longitudinal directions having a width extending in the lateral direction that that increases and decreases multiple times with position along the longitudinal direction.

Example 49. The optical amplifier of any of the Examples above, wherein said at least one layer of said plurality of layers having said at least one parameter that varies has a width that is larger closer to said output port than said input port.

Example 50. The optical amplifier of any of the Examples above, wherein at least one layer of said plurality of layers having said at least one parameter that varies has a width extending in the lateral direction that that increases and decreases multiple times with position along the longitudinal direction.

Example 51. The optical amplifier of any of the Examples above, wherein said at least one parameter has a spatial distribution across lateral and longitudinal directions that is symmetric.

Example 52. The optical amplifier of any of the Examples above, wherein said at least one parameter has a spatial distribution across lateral and longitudinal directions that is asymmetric.

Example 53. The optical amplifier of any of the Examples above, wherein said at least one parameter of at least one of said plurality of layers is reduced further away from a centerline through said active waveguide than closer to said centerline.

Example 54. The optical amplifier of any of the Examples above, wherein said active waveguide has a first end closer to said input port than said output port and a second end closer to said output port than said input port, said first end having a smaller lateral width than said second end such that said active waveguide is flared.

Example 55. A master oscillator power amplifier (MOPA) device configured to generate an output optical beam, the MOPA device comprising the optical amplifier of any of the Examples above.

Example 56. A semiconductor laser configured to generate an output optical beam, the semiconductor laser comprising the optical amplifier of any of the Examples above.

Example 57. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction, said active waveguide disposed between the input port and the output port and having a waveguide width extending in a lateral direction between first and second lateral edges, said active waveguide having a first end closer to said input port than said output port and a second end closer to said output port than said input port, said active waveguide supporting a plurality of lateral modes; and at least one top electrode and one bottom electrode disposed with respect to the active waveguide to apply an electrical voltage to said active waveguide to direct an injection current into said active waveguide, wherein said top electrode, said bottom electrode or both are segmented such that said top electrode or said bottom electrode or both comprise a plurality of separate electrically isolated segments to which separate voltages can be applied such that said injection current provided to said active waveguide has a spatial distribution that varies across said lateral direction so as to suppress at least one of said lateral modes.

Example 58. The optical amplifier of Example 57, wherein said separate electrically isolated segments comprise strips.

Example 59. The optical amplifier of any of the Examples 57 and 58, wherein said separate electrically isolated segments comprise metal.

Example 60. The optical amplifier of any of the Examples 57-59, wherein separate electrically isolated segments have first ends closer to said input port than said output port and second ends closer to said output port than said input port, said first ends having a smaller lateral width than said second end.

Example 61. The optical amplifier of any of the Examples 57-60, wherein said active waveguide has a first end closer to said input port than said output port and a second end closer to said output port than said input port, said first end having a smaller lateral width than said second end such that said active waveguide is flared.

Example 62. The optical amplifier of any of the Examples 57-61, further comprising electronics configured to apply separate voltages to said separate electrically isolated segments such that said injection current provided to said active waveguide has a spatial distribution that causes suppression of at least one of said lateral modes.

Example 63. The optical amplifier of any of the Examples 57-61, further comprising electronics configured to apply separate voltages to at least some of said separate electrically isolated segments such that said injection current provided to said active waveguide has a spatial distribution that varies across said lateral direction so as to suppress at least one of said lateral modes.

Example 64. The optical amplifier of any of the Examples 57-63, wherein said plurality of separate electrically isolated segments are included in said top electrode.

Example 65. The optical amplifier of any of the Examples 57-64, wherein said plurality of separate electrically isolated segments are included in said bottom electrode.

Example 66. A master oscillator power amplifier (MOPA) device configured to generate an output optical beam, the MOPA device comprising the optical amplifier of any of the Examples 57-65.

Example 67. A flared semiconductor laser configured to generate an output optical beam, the flared semiconductor laser comprising the optical amplifier of any of the Examples 57-65.

Example 68. The optical amplifier of any of the Examples above, wherein said at least one electrode is flared.

Example 69. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over multiple of said protrusions on one side of said electrode.

Example 70. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 3 said protrusions on one side of said electrode.

Example 71. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 5 said protrusions on one side of said electrode.

Example 72. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 10 said protrusions on one side of said electrode.

Example 73. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 15 said protrusions on one side of said electrode.

Example 74. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 20 said protrusions on one side of said electrode.

Example 75. The optical amplifier of any of the Examples above, wherein said at least one electrode has a width extending in the lateral direction that increases and decreases multiple times with position along the longitudinal direction forming protrusions extending in the lateral direction on at least one side of said electrode, said at least one electrode having an average width extending in the lateral direction that increases along a distance in said longitudinal direction extending over at least 30 said protrusions on one side of said electrode.

Example 76. The optical amplifier of any of the Examples above, wherein said at least one electrode has an average width extending in the lateral direction that increases over most the length of the electrode along the longitudinal direction.

Example 77. The optical amplifier of any of the Examples above, wherein said at least one electrode has an average width extending in the lateral direction that increases over 75% of the length of the electrode along the longitudinal direction.

Example 78. The optical amplifier of any of the Examples above, wherein said at least one electrode has an average width extending in the lateral direction that increases over 90% of the length of the electrode along the longitudinal direction.

Example 79. The optical amplifier of any of the Examples above, wherein said at least one electrode has an average width extending in the lateral direction that increases from said first end to said second end.

Example 80. An optical amplifier configured to receive input light via an input port to be guided therein, amplify at least a portion of said input light that is guided in the optical amplifier, and output at least a portion of said amplified light via an output port, wherein the optical amplifier comprises:
  an active waveguide extending in a longitudinal direction, said active waveguide disposed between the input port and the output port and having a waveguide width extending in a lateral direction between first and second lateral edges, said active waveguide having a first end closer to said input port than said output port and a second end closer to said output port than said input port, said active waveguide supporting a plurality of lateral modes; and
  at least one top electrode and one bottom electrode disposed with respect to the active waveguide to apply an electrical voltage to said active waveguide to direct an injection current into said active waveguide,
  wherein said top electrode, said bottom electrode or both are segmented such that said top electrode or said bottom electrode or both comprise a plurality of separate electrically isolated segments to which separate voltages can be applied, said separate electrically isolated segments comprising strips, and
  wherein said top electrode, said bottom electrode or both have a first end closer to said input port than said output port and a second end closer to said output port than said input port, said first end having a smaller lateral width than said second end.

Example 81. The optical amplifier of Example 80, further comprising electronics configured to apply separate voltages to said separate electrically isolated segments such that said injection current provided to said active waveguide has a spatial distribution that causes suppression of at least one of said lateral modes.

Example 82. The optical amplifier of any of the Example 80, further comprising electronics configured to apply separate voltages to at least some of said separate electrically isolated segments such that said injection current provided to said active waveguide has a spatial distribution that varies across said lateral direction so as to suppress at least one of said lateral modes.

Part-3

Example 1. An optical amplifier configured to receive input light via an input port to be guided therein, amplify at least a portion of said input light that is guided in the optical amplifier, and output at least a portion of said amplified light via an output port, wherein the optical amplifier comprises:
  an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
  at least one electrode disposed with respect to the active waveguide to apply an electrical voltage to said gain layer; and
  a dielectric layer disposed between the electrode and the gain layer so as to reduce current injected into said gain layer, said dielectric layer having a perimeter that is spaced apart from said longitudinal centerline of the active waveguide by a distance that increases and decreases multiple times with position along the longitudinal direction.

Example 2. The optical amplifier of Example 1, wherein said the perimeter of said dielectric layer is spaced apart from said longitudinal centerline of the active waveguide by an average distance that increases from a first end to a second end, said first end closer to said input port than said output port and said second end closer to said output port than said input port.

Example 3. The optical amplifier of Examples 1 or 2, wherein said at least one electrode comprises a conductive layer extending in the longitudinal direction, said at least one electrode having a first end closer to said input port than said output port and a second end closer to said output port than said input port, said first end having a smaller lateral width than said second end.

Example 4. A master oscillator power amplifier (MOPA) device configured to generate an output optical beam, the MOPA device comprising the optical amplifier of any of the Examples above.

Example 5. A semiconductor laser configured to generate an output optical beam, the semiconductor laser comprising the optical amplifier of any of the Examples above.

Example 6. An optical amplifier configured to receive input light via an input port to be guided therein, amplify at least a portion of said input light that is guided in the optical amplifier, and output at least a portion of said amplified light via an output port, wherein the optical amplifier comprises:
  an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
  at least one electrode disposed with respect to the active waveguide to apply an electrical voltage to said gain layer; and
  a dielectric layer disposed between the electrode and the gain layer so as to reduce current injected into said gain layer, said dielectric layer configured such that an optical gain profile within said active waveguide has a spatial distribution across said lateral direction so as to suppress at least one of said lateral modes.

Example 7. The optical amplifier of Example 6, wherein said dielectric layer has top and bottom major surfaces and edges therebetween and at least one of said top or bottom major surfaces has an areal pattern shaped such that the optical gain profile within said active waveguide has a spatial distribution across said lateral direction so as to suppress at least one of said lateral modes.

Example 8. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
at least one electrode disposed with respect to the active waveguide to apply an electrical voltage to said gain layer; and
a dielectric layer disposed between the electrode and the gain layer so as to reduce current injected into said gain layer, said dielectric layer having a boundary that is spaced apart from said longitudinal centerline of the active waveguide by a distance that increases along the longitudinal direction with increasing distance from said input port, said boundary separating a first region with lower current injection into said gain layer than a second region.

Example 9. The optical amplifier of Example 8, wherein said boundary separates a region of dielectric from a region without said dielectric.

Example 10. The optical amplifier of Example 8, wherein said boundary separates regions of dielectric having different thickness.

Example 11. The optical amplifier of any of Examples 8-10, said boundary is abrupt.

Example 12. The optical amplifier of any of Examples 8-10, wherein said boundary is graded.

Example 13. The optical amplifier of any of Examples 8-12, wherein said dielectric is thicker on a side of said boundary farther from said centerline.

Example 14. The optical amplifier of any of Examples 8-12, wherein said dielectric is on one side of said boundary farther from said longitudinal centerline and not on another side of said boundary closer to said longitudinal center line.

Example 15. The optical amplifier of any of Examples 8-12, wherein said dielectric in said dielectric layer is thinner closer to said centerline and thicker farther from said centerline, said boundary separating thin and thick regions.

Example 16. The optical amplifier of any of Examples 8-12, wherein no dielectric is included in a region closer to said centerline and dielectric is included in a region of said layer farther from said centerline, said boundary separating said regions.

Example 17. The optical amplifier of any of Examples 8-16, wherein said boundary undulates with distance along the longitudinal directions.

Example 18. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
at least one electrode disposed with respect to the active waveguide to apply an electrical voltage to said gain layer; and
a dielectric layer disposed between the electrode and the gain layer so as to reduce current injected into said gain layer, wherein at least one parameter of said dielectric layer varies spatially along said lateral direction.

Example 19. The optical amplifier of Example 17, wherein at least one parameter comprises the thickness of said dielectric layer.

Example 20. The optical amplifier of Example 17, wherein at least one parameter comprises the composition of said dielectric layer.

Example 21. The optical amplifier of any of Examples 17, wherein at least one parameter comprises the resistance of said dielectric layer.

Example 22. The optical amplifier of any of Examples 17-19, wherein said variation comprise a gradation.

Example 23. The optical amplifier of any of Examples 17-20, wherein said parameter value increases for a portion of said dielectric layer closest in said lateral direction to said centerline.

Example 24. The optical amplifier of any of Examples 17-21, wherein said parameter value increases for at least a portion of said dielectric layer with increasing distance in a lateral direction from said centerline.

Example 25. The optical amplifier of any of Examples 17-22, wherein said parameter value changes for a portion of said dielectric layer closest in said lateral direction to said centerline.

Example 26. The optical amplifier of any of Examples 17-23, wherein said dielectric layer has a perimeter that is spaced apart from said longitudinal centerline of the active waveguide by a distance that increases along the longitudinal direction with increasing distance from said input port.

Example 27. The optical amplifier of Examples 25, wherein said perimeter of said dielectric layer undulates with distance in said longitudinal direction.

Part-4

Example 1. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
at least one electrode disposed with respect to the active waveguide to apply an electrical voltage to said gain layer; and
an ion implanted layer disposed between the electrode and the gain layer, said ion implanted layer comprising a region having ions implanted therein, said ion implanted region having a perimeter that is spaced apart from said longitudinal centerline of the active waveguide by a distance, wherein on average the distance increases with position along the longitudinal direction.

Example 2. The optical amplifier of Example 1, wherein said the perimeter of said ion implanted region is spaced apart from said longitudinal centerline of the active waveguide by a distance that increases and decreases multiple time from a first end to a second end, said first end closer to said input port than said output port and said second end closer to said output port than said input port.

Example 3. The optical amplifier of Example 2, wherein said the perimeter of said ion implanted region is spaced apart from said longitudinal centerline of the active waveguide by a distance that increases from a first end to said second end, said first end closer to said input port than said output port and said second end closer to said output port than said input port.

Example 4. The optical amplifier of an of Examples 1-3, wherein said ion implanted region has higher electrical resistivity than other portions of said ion implanted layer with less or no implanted ions.

Example 5. The optical amplifier of any of the Examples above, wherein said at least one electrode comprises a conductive layer extending in the longitudinal direction, said at least one electrode having a first end closer to said input port than said output port and a second end closer to said output port than said input port, said first end having a smaller lateral width than said second end.

Example 6. A master oscillator power amplifier (MOPA) device configured to generate an output optical beam, the MOPA device comprising the optical amplifier of any of the Examples above.

Example 7. A semiconductor laser configured to generate an output optical beam, the semiconductor laser comprising the optical amplifier of any of the Examples above.

Example 8. The optical amplifier of any of the Examples above, wherein said perimeter undulates with distance in said longitudinal direction.

Example 9. The optical amplifier of any of the Examples above, wherein on average the distance increases with position along the longitudinal direction over most of the distance from said input port to said output port.

Example 10. The optical amplifier of any of the Examples above, wherein on average the distance increases with position along the longitudinal direction over 75% of the distance from said input port to said output port.

Example 11. The optical amplifier of any of the Examples above, wherein on average the distance increases with position along the longitudinal direction over 90% of the distance from said input port to said output port.

Part-5

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- an impedance layer having electrical impedance disposed between the electrode and the gain layer configured to reduce current injected into said gain layer, said impedance layer having a boundary with a perimeter that is spaced apart from said longitudinal centerline of the active waveguide by a distance that increases and decreases multiple times with position along the longitudinal direction, said boundary separating a first region having increased electrical impedance with respect to a second region.

Example 2. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- an impedance layer having electrical impedance disposed between the electrode and the gain layer configured to reduce current injected into said gain layer, said impedance layer having a boundary with a perimeter that is spaced apart from said longitudinal centerline of the active waveguide by a distance that increases with longitudinal distance from said input port, said boundary separating a first region having increased electrical impedance with respect to a second region.

Example 3. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- an impedance layer having electrical impedance disposed between the electrode and the gain layer configured to reduce current injected into said gain layer such that an optical gain profile within said active waveguide has a spatial distribution across said lateral direction so as to suppress at least one of said lateral modes.

Example 4. The optical amplifier of Example 3, wherein said impedance layer has an areal pattern shaped such that the optical gain profile within said active waveguide has a spatial distribution across said lateral direction so as to suppress at least one of said lateral modes.

Example 5. The optical amplifier of any of the Examples 3 and 4, wherein said impedance layer has a boundary with a perimeter that is spaced apart from said longitudinal centerline of the active waveguide by a distance that increases with longitudinal distance from said input port, said boundary separating a first region having increased electrical impedance with respect to a second region.

Example 6. The optical amplifier of Example 5, wherein said second region has a first end closer to said input port than said output port and a second end closer to said output port than said input port, said first end having a smaller lateral width than said second end.

Example 7. The optical amplifier of any of the Examples 5 and 6, wherein said impedance layer has a boundary with a perimeter that is spaced apart from said longitudinal centerline of the active waveguide by a distance that increases and decreases multiple times with position along the longitudinal direction, said boundary separating a first region having increased electrical impedance with respect to a second region.

Example 8. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- an impedance layer having electrical impedance disposed between the electrode and the gain layer configured to reduce current injected into said gain layer, wherein at least one parameter of said impedance layer varies spatially along said lateral direction.

Example 9. The optical amplifier of Example 8, wherein the at least one parameter comprises the thickness of said impedance layer.

Example 10. The optical amplifier of any of Examples 8 and 9, wherein the at least one parameter comprises a resistance of said impedance layer.

Example 11. The optical amplifier of any of Examples 8-10, wherein the at least one parameter comprises a material composition of said impedance layer.

Example 12. The optical amplifier of any of Examples 8-11, wherein the at least one parameter comprises a bandgap of said impedance layer.

Example 13. The optical amplifier of any of Examples 8-12, wherein the at least one parameter comprises density of a dopant or an ion within said impedance layer.

Example 14. The optical amplifier of any of Examples 8-12, wherein the at least one parameter comprises an ion or a dopant species within said impedance layer.

Example 15. The optical amplifier of any of Examples 8-14, wherein said spatial variation comprises a gradation.

Example 16. The optical amplifier of any of Examples 8-15, wherein said parameter value increases for a portion of said impedance layer closest in said lateral direction to said centerline.

Example 17. The optical amplifier of any of Examples 8-16, wherein said parameter value increases for at least a portion of said impedance layer with increasing distance in a lateral direction from said centerline.

Example 18. The optical amplifier of any of Examples 8-17, wherein said parameter value changes for a portion of said impedance layer closest in said lateral direction to said centerline.

Example 19. The optical amplifier of any of Examples 8-18, wherein said impedance layer has a perimeter that is spaced apart from said longitudinal centerline of the active waveguide by a distance that on average increases along the longitudinal direction with increasing distance from said input port.

Example 20. The optical amplifier of any of Examples 8-19, wherein the distance increases and decrease several times along the longitudinal direction with increasing distance from said input port.

Example 21. The optical amplifier of any of Examples above, wherein said impedance layer comprises semiconductor.

Example 22. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- an impedance layer having an electrical impedance disposed between the electrode and the gain layer configured to reduce current injected into said gain layer such that said electrical impedance varies spatially along a lateral direction.

Example 23. The optical amplifier of Example 22, wherein said variation comprise a gradation.

Example 24. The optical amplifier of Examples 22 or 23, wherein said electrical impedance increases for a portion of said impedance layer closest in said lateral direction to said centerline.

Example 25. The optical amplifier of any of Examples 22-24, wherein said electrical impedance increases for at least a portion of said impedance layer with increasing distance in a lateral direction from said centerline.

Example 26. The optical amplifier of any of Examples 22-25, wherein said electrical impedance changes for a portion of said impedance layer closest in said lateral direction to said centerline.

Example 27. The optical amplifier of any of the Examples above, wherein said impedance layer comprises a contact layer.

Example 28. The optical amplifier of any of the Examples above, wherein said impedance layer comprises a buffer layer.

Example 29. The optical amplifier of any of the Examples above, wherein said impedance layer comprises a waveguide layer.

Example 30. The optical amplifier of any of the Examples above, wherein said impedance layer comprises a waveguide cladding layer.

Example 31. The optical amplifier of any of the Examples above, wherein said impedance layer comprises a waveguide core layer.

Example 32. An optical amplifier configured to receive input light via an input port to be guided therein, amplify at least a portion of said input light that is guided in the optical amplifier, and output at least a portion of said amplified light via an output port, wherein the optical amplifier comprises:
    an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
    at least one electrode disposed with respect to the active waveguide to apply an electrical voltage to said gain layer; and
    an impedance layer having electrical impedance disposed between the electrode and the gain layer configured to reduce current injected into said gain layer, said impedance layer having a boundary with a perimeter that is spaced apart from said longitudinal centerline of the active waveguide by a distance that increases and decreases multiple times with position along the longitudinal direction, said boundary separating a first region having increased electrical impedance with respect to a second region.

Example 33. The optical amplifier of Examples 32, wherein said a distance that said boundary is spaced apart from said longitudinal centerline of the active waveguide has an average the increases with longitudinal distance from said input port.

Example 34. The optical amplifier of any of the Examples above, wherein said distance said boundary is spaced apart from said longitudinal centerline of the active waveguide has an average that increases with over most of the distance in the longitudinal direction from the input port to the output port.

Example 35. The optical amplifier of any of the Examples above, wherein said distance said boundary is spaced apart from said longitudinal centerline of the active waveguide has an average the increases over at least 75% of the distance in the longitudinal direction from the input port to the output port.

Example 36. The optical amplifier of any of the Examples above, wherein said distance said boundary is spaced apart from said longitudinal centerline of the active waveguide has an average the increases over at least 90% of the distance in the longitudinal direction from the input port to the output port.

Part-6

Example 1. An optical amplifier configured to receive input light via an input port to be guided therein, amplify at least a portion of said input light that is guided in the optical amplifier, and output at least a portion of said amplified light via an output port, said input light having an input wavelength, wherein the optical amplifier comprises:
    an active waveguide extending in a longitudinal direction between the input port and the output port and having a waveguide width extending in a lateral direction between first and second lateral edges, wherein at least a portion of the active waveguide supports a plurality of lateral modes, wherein the active waveguide comprises a gain layer, and wherein the gain layer comprises an active region, said active region configured to provide optical gain to light guided in said active waveguide, said active region extending in the longitudinal direction and having a width extending in the lateral direction that that increases and decreases multiple times with position along the longitudinal direction, said active region having a first end closer to said input port than said output port and a second end closer to said output port than said input port, said first end having a smaller lateral width than said second end; and
    at least one top electrode disposed with respect to the active waveguide to apply an electrical voltage to said active waveguide.

Example 2. The optical amplifier of Example 1, wherein said active region comprises one or more quantum wells, quantum dots, quantum wires or combinations thereof.

Example 3. The optical amplifier of Example 1, wherein said at least one top electrode comprising a conductive layer extending in the longitudinal direction, said at least one top electrode having a first end closer to said input port than said output port and a second end closer to said output port than said input port, said first end having a smaller lateral width than said second end.

Example 4. The optical amplifier of Example 1, wherein the active region comprises of plurality of quantum wells.

Example 5. The optical amplifier of Example 1, wherein the active region comprises of plurality of quantum wells configured to provide optical gain to light having the input wavelength upon being pumped by an injection current.

Example 6. An optical amplifier configured to receive input light via an input port to be guided therein, amplify at least a portion of said input light that is guided in the optical amplifier, and output at least a portion of said amplified light via an output port, said input light having an input wavelength, wherein the optical amplifier comprises:
    an active waveguide extending in a longitudinal direction between the input port and the output port and having a waveguide width extending in a lateral direction between first and second lateral edges, wherein at least a portion of the active waveguide supports a plurality of lateral modes, wherein the active waveguide comprises a gain layer, and wherein the gain layer comprises an active region, said active region configured to provide optical gain to light guided in said active waveguide, said active region extending in the longitudinal direction and having a width extending in the lateral direction that that increases and decreases multiple times with position along the longitudinal direction, said active region having a first end closer to said input port than said output port and a second end closer to said output port than said input port; and
    at least one top electrode disposed with respect to the active waveguide to apply an electrical voltage to said active waveguide.

Example 7. The optical amplifier of Example 6, wherein said active region comprises one or more quantum wells, quantum dots, quantum wires or combinations thereof.

Example 8. The optical amplifier of Example 6, wherein said at least one top electrode comprising a conductive layer extending in the longitudinal direction, said at least one top electrode having a first end closer to said input port than said output port and a second end closer to said output port than said input port, said first end having a smaller lateral width than said second end.

Example 9. The optical amplifier of Example 6, wherein the active region comprises of plurality of quantum wells.

Example 10. The optical amplifier of Example 6, wherein the active region comprises of plurality of quantum wells configured to provide optical gain to light having the input wavelength upon being pumped by an injection current.

Example 11. The optical amplifier of any of the Examples above, wherein said active region is flared.

Example 12. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over multiple of said protrusions on one side of said active region.

Example 13. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 3 of said protrusions on one side of said active region.

Example 14. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 5 of said protrusions on one side of said active region.

Example 15. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 10 of said protrusions on one side of said active region.

Example 16. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 15 of said protrusions on one side of said active region.

Example 17. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 20 of said protrusions on one side of said active region.

Example 18. The optical amplifier of any of the Examples above, wherein said width of said active region extending in the lateral direction that increases and decreases multiple times with position along the longitudinal direction forms protrusions extending in the lateral direction on at least one side of said active region, said active region having an average width extending in the lateral direction that increases along a distance in said longitudinal direction extending over at least 30 of said protrusions on one side of said active region.

Example 19. The optical amplifier of any of the Examples above, wherein said active region has an average width extending in the lateral direction that increases over most the length of the active region along the longitudinal direction.

Example 20. The optical amplifier of any of the Examples above, wherein said active region has an average width extending in the lateral direction that increases over 75% of the length of the active region along the longitudinal direction.

Example 21. The optical amplifier of any of the Examples above, wherein said active region has an average width extending in the lateral direction that increases over 90% of the length of the electrode along the longitudinal direction.

Example 22. The optical amplifier of any of the Examples above, wherein said active region has an average width extending in the lateral direction that increases from said first end to said second end.

Part-7

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- a conductive layer comprising semiconductor disposed between the electrode and the gain layer configured to permit current to be injected into said gain layer, said conductive semiconductor layer having a boundary with a perimeter that is spaced apart from said longitudinal centerline of the active waveguide by a distance that increases and decreases multiple times with position along the longitudinal direction, said boundary separating a first region having higher electrical conductance that a second region.

Example 2. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
- at least one electrode disposed with respect to the active waveguide to apply an electrical voltage to said gain layer; and
- a conductive layer comprising semiconductor disposed between the electrode and the gain layer configured to provide for current injection into said gain layer, said conductive semiconductor layer having a boundary with a perimeter that is spaced apart from said longitudinal centerline of the active waveguide by a distance that increases with longitudinal distance from said input port, said boundary separating a first region having increased electrical conductance with respect to a second region.

Example 3. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
at least one electrode disposed with respect to the active waveguide to apply an electrical voltage to said gain layer; and
a conductive layer comprising semiconductor disposed between the electrode and the gain layer configured to provide for current injection into said gain layer such that an optical gain profile within said active waveguide has a spatial distribution across said lateral direction so as to suppress at least one of said lateral modes.

Example 4. The optical amplifier of Example 3, wherein said conductive semiconductor layer has top and bottom major surfaces and edges therebetween and at least one of said top and bottom major surfaces has an areal pattern shaped such that the optical gain profile within said active waveguide has a spatial distribution across said lateral direction so as to suppress at least one of said lateral modes.

Example 5. The optical amplifier of any of the Examples 3 and 4, wherein said conductive semiconductor layer has a boundary with a perimeter that is spaced apart from said longitudinal centerline of the active waveguide by a distance that increases with longitudinal distance from said input port, said boundary separating a first region having increased electrical conductance with respect a second region.

Example 6. The optical amplifier of any of the Examples 3 and 4, wherein said conductive semiconductor layer has a boundary with a perimeter that is spaced apart from said longitudinal centerline of the active waveguide by a distance that increases and decreases multiple times with position along the longitudinal direction, said boundary separating a first region having increased electrical conductance with respect a second region.

Example 7. The optical amplifier of any of the Examples above, wherein said boundary separating a first region having increased electrical conductance with respect to a second region and said second region has a first end closer to said input port than said output port and a second end closer to said output port than said input port, said first end having a smaller lateral width than said second end.

Example 8. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer,
at least one electrode disposed with respect to the active waveguide to apply an electrical voltage to said gain layer; and
a conductive layer comprising semiconductor disposed between the electrode and the gain layer configured to provide for current injection into said gain layer, wherein at least one parameter of said conductive semiconductor layer varies spatially along said lateral direction.

Example 9. The optical amplifier of any of Examples 8, wherein said at least one parameter comprises the electrical conductance of said conductive semiconductor layer.

Example 10. The optical amplifier of Example 8 or 9, wherein said at least one parameter comprises a composition of said conductive semiconductor layer.

Example 11. The optical amplifier of any of Examples 8-10, wherein said at least one parameter comprises dopant concentration of said conductive semiconductor layer.

Example 12. The optical amplifier of any of Examples 8-11, wherein said at least one parameter comprises the thickness of said conductive semiconductor layer.

Example 13. The optical amplifier of any of Examples 8-12, wherein the at least one parameter comprises the material composition of said conductive semiconductor layer.

Example 14. The optical amplifier of any of Examples 8-13, wherein the at least one parameter comprises a bandgap of said conductive semiconductor layer.

Example 15. The optical amplifier of any of Examples 8-14, wherein the at least one parameter comprises a dopant species within said conductive semiconductor layer.

Example 16. The optical amplifier of any of Examples 8-15, wherein said variation of the at least one parameter of said conductive semiconductor layer comprises a gradation.

Example 17. The optical amplifier of any of Examples 8-16, wherein said parameter value decreases for a portion of said conductive semiconductor layer farthest in said lateral direction to said centerline.

Example 18. The optical amplifier of any of Examples 8-17, wherein said parameter value decreases for at least a portion of said conductive semiconductor layer with increasing distance in a lateral direction from said centerline.

Example 19. The optical amplifier of any of Examples 8-18, wherein said parameter value changes for a portion of said conductive semiconductor layer farthest in said lateral direction to said centerline.

Example 20. The optical amplifier of any of Examples 8-19, wherein said conductive semiconductor layer has a perimeter that is spaced apart from said longitudinal centerline of the active waveguide by a distance that increases along the longitudinal direction with increasing distance from said input port.

Example 21. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, at least one electrode disposed with respect to the active waveguide to apply an electrical voltage to said gain layer; and a conductive layer comprising semiconductor disposed between the electrode and the gain layer to provide for current injection into said gain layer, said conductive layer configured such that electrical conductance thereof varies spatially along a lateral direction.

Example 22. The optical amplifier of Example 21, wherein said variation of the electric conductance of said conductive layer comprises a gradation.

Example 23. The optical amplifier of Examples 21 or 22, wherein said electrical conductance decreases for a portion of said conductive semiconductor layer farthest in said lateral direction to said centerline.

Example 24. The optical amplifier of any of Examples 21-23, wherein said electrical conductance decreases for at least a portion of said conductive semiconductor layer with increasing distance in a lateral direction from said centerline.

Example 25. The optical amplifier of any of Examples 21-24, wherein said electrical conductance changes for a portion of said conductive semiconductor layer farthest in said lateral direction to said centerline.

Example 26. The optical amplifier of any of the Examples above, wherein said conductive semiconductor layer comprises a contact layer.

Example 27. The optical amplifier of any of the Examples above, wherein said conductive semiconductor layer comprises a buffer layer.

Example 28. The optical amplifier of any of the Examples above, wherein said conductive semiconductor layer comprises a waveguide layer.

Example 29. The optical amplifier of any of the Examples above, wherein said conductive semiconductor layer comprises a waveguide cladding layer.

Example 30. The optical amplifier of any of the Examples above, wherein said conductive semiconductor layer comprises a waveguide core layer.

Example 31. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, at least one electrode disposed with respect to the active waveguide to apply an electrical voltage to said gain layer; and a conductive layer comprising semiconductor disposed between the electrode and the gain layer configured to permit current to be injected into said gain layer, said conductive semiconductor layer having a boundary with a perimeter that is spaced apart from said longitudinal centerline of the active waveguide by a distance that increases and decreases multiple times with position along the longitudinal direction, said boundary separating a first region having higher electrical conductance that a second region.

Example 32. The optical amplifier of Examples 31, wherein said a distance that said boundary is spaced apart from said longitudinal centerline of the active waveguide has an average that increases with longitudinal distance from said input port.

Example 33. The optical amplifier of any of the Examples above, wherein said distance said boundary is spaced apart from said longitudinal centerline of the active waveguide has an average that increase with over most of the distance in the longitudinal direction from the input port to the output port.

Example 34. The optical amplifier of any of the Examples above, wherein said distance said boundary is spaced apart from said longitudinal centerline of the active waveguide has an average the increases over at least 75% of the distance in the longitudinal direction from the input port to the output port.

Example 35. The optical amplifier of any of the Examples above, wherein said distance said boundary is spaced apart from said longitudinal centerline of the active waveguide has an average the increases over at least 90% of the distance in the longitudinal direction from the input port to the output port.

Part-8A

Example 1. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, and at least one electrode disposed with respect to the active waveguide to apply an electrical voltage to said gain layer, wherein said gain layer has a shape that is configured such that an optical gain profile within said active waveguide has a spatial distribution across said lateral direction so as to suppress at least one of said lateral modes.

Example 2. The optical amplifier of Example 1, wherein said gain layer comprises quantum dots, quantum wires, quantum wells, or any combination thereof.

Example 3. The optical amplifier of Example 2, wherein said gain layer comprises islands of quantum dots, quantum wires, or quantum wells.

Example 4. The optical amplifier of any of Examples 1-3, wherein said gain layer is flared.

Example 5. The optical amplifier of any of Examples 1-4, wherein said gain layer has a top and bottom major surfaces and an edges having a thickness, said both said top and bottom surfaces having an area larger than the area of one of said edges.

Example 6. The optical amplifier of Example 5, wherein at least one of said top or bottom major surfaces of said gain layer has an areal pattern shaped such that the optical gain profile within said active waveguide has a spatial distribution across said lateral direction so as to suppress at least one of said lateral modes.

Example 7. The optical amplifier of Example 5, wherein at least one of said top and bottom major surfaces of said gain layer has an areal pattern configured such that the active waveguide outputs only one lateral mode.

Example 8. The optical amplifier of Example 5, wherein at least one of said top and bottom major surfaces of said gain layer has an areal pattern configured such that the active waveguide outputs only the fundamental lateral optical mode of the active waveguide.

Example 9. The optical amplifier of any of the Examples above, wherein said gain layer has a perimeter that is spaced apart from said longitudinal centerline of the active waveguide by a distance that increases with longitudinal distance from said input port.

Example 10. The optical amplifier of any of the Examples above, wherein the gain layer includes quantum dots, wires, or portions comprising quantum wells and any combination of these and is surrounded on opposites sides in the lateral direction by regions that do not include quantum dots, wires, or portions comprising quantum wells.

Example 11. The optical amplifier of Example 10, wherein these regions on opposite sides of said gain layer comprise a compound material having an element present in said quantum dots, wires, quantum wells.

Example 12. The optical amplifier of Example 10, wherein these regions on opposite sides of said gain layer comprise a dielectric layer.

Example 13. The optical amplifier of any of the Examples above, wherein said gain layer has a shape that is configured such that said active waveguide outputs only one lateral mode.

Example 14. The optical amplifier of any of the Examples above, wherein said gain layer has a shape that is configured such that said active waveguide supports only the fundamental lateral optical mode.

Example 15. The optical amplifier of any of the Examples above, wherein said gain layer has a width in the lateral direction that is smaller than the width of said active waveguide.

Example 16. The optical amplifier of any of the Examples above, wherein said gain layer has a width in the lateral direction that is smaller than the width of at least one other layer of said active waveguide.

Example 17. An optical amplifier configured to receive input light via an input port to be guided therein, amplify at least a portion of said input light that is guided in the optical amplifier, and output at least a portion of said amplified light via an output port, wherein the optical amplifier comprises:
an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, and
at least one electrode disposed with respect to the active waveguide to apply an electrical voltage to said gain layer,
wherein said gain layer comprises first and second regions, said first region having increased gain with respect said second region, said first region having a shape that is configured such that an optical gain profile within said active waveguide has a spatial distribution across said lateral direction so as to suppress at least one of said lateral modes.

Example 18. The optical amplifier of Example 17, wherein said gain layer comprises quantum dots, quantum wires, quantum layers, or any combination thereof.

Example 19. The optical amplifier of Example 17 or 18, wherein said gain layer comprises a slab or has top and bottom major surfaces and a thickness, at least one of said top and bottom major surfaces having a rectangular or square areal shape.

Example 20. The optical amplifier of any of Examples 17-19, wherein said first region is flared.

Example 21. The optical amplifier of any of Examples 17-20, wherein said first region has top and bottom major surfaces and a thickness, said both said top and bottom surfaces having lateral and longitudinal extents larger than said thickness.

Example 22. The optical amplifier of Example 21, wherein at least one of said top and bottom major surfaces of said first region has an areal pattern shaped such that the optical gain profile within said active waveguide has a spatial distribution across said lateral direction so as to suppress at least one of said lateral modes.

Example 23. The optical amplifier of any of Examples 21 or 22, wherein at least one of said top and bottom major surfaces of said first region has an areal pattern shaped such that the active waveguide supports only one lateral mode.

Example 24. The optical amplifier of any of Examples 21-23 wherein at least one of said top and bottom major surfaces of said first region has an areal pattern shaped such that the active waveguide supports only the fundamental lateral optical mode of the active waveguide.

Example 25. The optical amplifier of any of Examples 17-24, wherein said gain layer has a boundary with a perimeter that is spaced apart from said longitudinal centerline of the active waveguide by a distance that increases with longitudinal distance from said input port, said boundary separating said first region and said second region.

Example 26. The optical amplifier of any of Examples 17-25, wherein said first region has a first end closer to said input port than said output port and a second end closer to said output port than said input port, said first end having a smaller lateral width than said second end.

Example 27. The optical amplifier of any of Examples 17-26, wherein said first region of said gain layer comprises quantum dots, quantum wires, quantum wells or any combination thereof.

Example 28. The optical amplifier of any of Examples 27, wherein said first region includes more quantum dots, wires, or quantum wells and any combination of these than said second region.

Example 29. The optical amplifier of any of Examples 27 or 28, wherein the first region includes quantum dots, quantum wires, or quantum wells and any combination thereof that are tuned to a wavelength of operation of said optical amplifier different than of the said second region.

Example 30. The optical amplifier of any of Examples 17-29, wherein the gain layer includes quantum dots, wires, or quantum wells and any combination of these and is surrounded on opposites sides in the lateral direction by regions that produce less or no gain.

Example 31. The optical amplifier of Example 30, wherein these regions on opposite sides of said gain region that produce less or no gain comprise a dielectric layer.

Example 32. The optical amplifier of Example 30, wherein these regions on opposite sides of said gain region that produce less or no gain comprise a material having an element present in said quantum dots, wires, or quantum wells.

Example 33. The optical amplifier of Example 30, wherein these regions on opposite sides of said gain region that produce less or no gain, comprise semiconductor quantum wells tuned to a wavelength different than an operating wavelength of the optical amplifier.

Example 34. The optical amplifier of Example 30, wherein these regions on opposite sides of said gain region that produce less or no gain comprise quantum dots, wires, or portions comprising quantum wells and any combination of these tuned to an wavelength different than an operating wavelength of the optical amplifier.

Example 35. The optical amplifier of Example 30, wherein these regions on opposite sides of said gain region that produce less or no gain comprise semiconductor quantum wells with a lower number of wells than said first region.

Example 36. The optical amplifier of any of Examples 17-33, wherein said first region has a shape configured such that said active waveguide supports only one lateral mode.

Example 37. The optical amplifier of any of the Examples 17-34, wherein said first region has a shape configured such that said active waveguide supports only the fundamental lateral optical mode of the active waveguide.

Example 38. The optical amplifier of any of Examples 17-35, wherein said first region extends in the longitudinal direction and has a width extending in the lateral direction, said width increasing and decreasing multiple times with position along the longitudinal direction.

Example 39. The optical amplifier of Examples 38, wherein said first region is flared along the longitudinal direction.

Example 39. The optical amplifier of Examples 38, wherein said width of said first region increases on average over most of the distance from the input port to the output port.

Example 39. The optical amplifier of Examples 38, wherein said width of said first region increases on average over 75% of the distance from the input port to the output port.

Example 39. The optical amplifier of Examples 38, wherein said width of said first region increases on average over 90% of the distance from the input port to the output port.

Part-8B

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, and
- at least one electrode disposed with respect to the active waveguide to apply an electrical voltage to said gain layer,
- wherein said gain layer has a perimeter that is spaced apart from said longitudinal centerline of the active waveguide by a distance that increases with longitudinal distance from said input port.

Example 2. The optical amplifier of Example 1, wherein said gain layer is flared.

Example 3. The optical amplifier of any of Examples 1 or 2, wherein said perimeter is flared.

Example 4. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, and
- at least one electrode disposed with respect to the active waveguide to apply an electrical voltage to said gain layer,
- wherein said gain layer comprises first and second regions, said first region having a higher gain than said second region, said first and second regions separated by a boundary with a perimeter that is spaced apart from said longitudinal centerline of the active waveguide by a distance that increases with longitudinal distance from said input port.

Example 5. The optical amplifier of Example 4, wherein said first region has a width that increases with longitudinal distance from said input port.

Example 6. The optical amplifier of Examples 4 or 5, wherein first region is flared.

Example 7. The optical amplifier of any of Examples 4-6, wherein said boundary is flared.

Part-8C

Example 1. An optical amplifier configured to receive input light via an input port to be guided therein, amplify at least a portion of said input light that is guided in the optical amplifier, and output at least a portion of said amplified light via an output port, wherein the optical amplifier comprises:
- an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer; and
- at least one electrode disposed with respect to the active waveguide to apply an electrical voltage to said gain layer,
- wherein at least one parameter of said gain layer varies spatially along said lateral direction that influences which mode or modes are output by the active waveguide more than others.

Example 2. The optical amplifier of Example 1, wherein said parameter is graded along at least a portion of said lateral direction.

Example 3. The optical amplifier of Examples 1 or 2, wherein said parameter is graded along a boundary between a first region of said gain layer and a second region of said gain layer, said first region having more optical gain than said second region.

Example 4. The optical amplifier of Example 3, wherein said boundary is flared.

Example 5. The optical amplifier of Example 3, wherein said first region is flared.

Example 6. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, and at least one electrode disposed with respect to the active waveguide to apply an electrical voltage to said gain layer, wherein at least one parameter of said gain layer is graded along a boundary between a first region of said gain layer and a second region of said gain layer, said first region having more optical gain than said second region.

Example 7. The optical amplifier of Example 6, wherein said boundary is flared.

Example 8. The optical amplifier of Example 6, wherein said first region is flared.

Part-8D

Example 1. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer; and at least one electrode disposed with respect to the active waveguide to apply an electrical voltage to said gain layer, wherein said gain layer has a perimeter that is spaced apart from said longitudinal centerline of the active waveguide by a distance that that increases and decreases multiple times with position along the longitudinal direction.

Example 2. The optical amplifier of Examples 1, wherein said a distance that said perimeter is spaced apart from said longitudinal centerline of the active waveguide has an average that increases with longitudinal distance from said input port.

Example 3. The optical amplifier of any of the Examples above, wherein said distance said perimeter is spaced apart from said longitudinal centerline of the active waveguide has an average that increase over most of the distance in the longitudinal direction from the input port to the output port.

Example 4. The optical amplifier of any of the Examples above, wherein said distance said perimeter is spaced apart from said longitudinal centerline of the active waveguide has an average the increases over at least 75% of the distance in the longitudinal direction from the input port to the output port.

Example 5. The optical amplifier of any of the Examples above, wherein said distance said perimeter is spaced apart from said longitudinal centerline of the active waveguide has an average the increases over at least 90% of the distance in the longitudinal direction from the input port to the output port.

Example 6. An optical amplifier configured to receive input light via an input port to be guided therein, amplify at least a portion of said input light that is guided in the optical amplifier, and output at least a portion of said amplified light via an output port, wherein the optical amplifier comprises:

an active waveguide extending in a longitudinal direction between the input port and the output port and having a waveguide width extending in a lateral direction between first and second lateral edges, said active waveguide having a longitudinal centerline extending along the length of the waveguide, at least a portion of the active waveguide supporting a plurality of lateral modes, said active waveguide comprising a gain layer, at least one electrode disposed with respect to the active waveguide to apply an electrical voltage to said gain layer; and wherein said gain layer comprises a first region and a second region, said first region having higher gain than said second region, said first and second regions separated by a boundary with a perimeter that is spaced apart from said longitudinal centerline of the active waveguide by a distance that increases and decreases multiple times with position along the longitudinal direction.

Example 7. The optical amplifier of Examples 6, wherein said a distance that said boundary is spaced apart from said longitudinal centerline of the active waveguide has an average that increases with longitudinal distance from said input port.

Example 8. The optical amplifier of any of the Examples above, wherein said distance said boundary is spaced apart from said longitudinal centerline of the active waveguide has an average that increase over most of the distance in the longitudinal direction from the input port to the output port.

Example 9. The optical amplifier of any of the Examples above, wherein said distance said boundary is spaced apart from said longitudinal centerline of the active waveguide has an average the increases over at least 75% of the distance in the longitudinal direction from the input port to the output port.

Example 10. The optical amplifier of any of the Examples above, wherein said distance said boundary is spaced apart from said longitudinal centerline of the active waveguide has an average the increases over at least 90% of the distance in the longitudinal direction from the input port to the output port.

Part-9

Example 1: An optical amplifier configured to receive an input optical wave via an input port, amplify a guided optical wave associated with the input optical wave propagating in the optical amplifier, and output an output optical wave associated with the guided optical wave via an output port, wherein the optical amplifier comprises:

an active waveguide extending in a longitudinal direction between the input port and the output port and having a waveguide width extending in a lateral direction, wherein at least a portion of the active waveguide supports a plurality of lateral modes, and wherein the active waveguide comprises a gain layer configured to provide optical gain to the guided optical wave propagating in the active waveguide;

a matched top electrode disposed on the active waveguide and configured to support a matched injection current profile in the gain layer, wherein the matched injection current profile generates the optical gain having a matched optical gain profile corresponding to an optical intensity distribution associated with the guided optical wave, and wherein the matched top electrode comprises a conductive layer extending in the longitudinal direction and having:
- a width extending in a lateral direction, wherein the width varies between a plurality of lower bound widths and a plurality of upper bound widths; and
- an average width associated with the lower band and upper bound widths wherein the average width increases progressively from the input port to the output port.

Example 2: The optical amplifier of example 1, wherein the upper bound widths progressively increase from the input port to the output port.

Example 3: The optical amplifier of example 2, wherein the lower bound widths progressively increase from the input port to the output port.

Example 4: The optical amplifier of example 2, wherein the lower bound widths remain constant from the input port to the output port.

Example 5: The optical amplifier of example 1, wherein the width changes linearly between the upper bound widths and the lower bound widths.

Example 6: The optical amplifier of example 1, wherein the width changes nonlinearly between the upper bound widths and the lower bound widths.

Example 7: The optical amplifier of example 1, wherein the plurality of upper bound widths are associated with an upper bound margin and the plurality of lower bound widths are associated with a lower bound margin.

Example 8: The optical amplifier of example 7, wherein the upper bound margin and lower bound margins vary linearly from the input port and the output port in the longitudinal direction.

Example 9: The optical amplifier of example 8, wherein the upper bound margin and lower band margin vary with different rates from the input port and the output port.

Example 10: The optical amplifier of example 7, wherein the lower bound margin remains constant between the input port and the output port in the longitudinal direction.

Example 11: The optical amplifier of any of examples 8-10, wherein the width varies periodically in the longitudinal direction with a width variation period.

Example 12: The optical amplifier of example 1, wherein the matched top electrode comprises a single conductive layer.

Example 13: The optical amplifier of example 1, wherein the matched top electrode comprises a plurality of electrically isolated segments.

Example 14: The optical amplifier of example 1, wherein the active waveguide supports a single mode in a vertical direction perpendicular to the longitudinal direction and the lateral direction.

Example 15: The optical amplifier of example 1, wherein the waveguide width progressively increases from the input port to the output port.

Example 16: The optical amplifier of example 1, wherein the waveguide width is constant from the input port to the output port.

Example 17: The optical amplifier of example 1, further comprising a bottom electrode disposed on a bottom surface of the active waveguide.

Example 18: The optical amplifier of example 17, wherein the bottom electrode uniformly covers at least a region of the bottom surface of the waveguide associated with an optical intensity profile of the guided optical wave.

Example 19: The optical amplifier of example 1, wherein the guided optical wave has an optical intensity profile associated with a fundamental lateral mode of the active waveguide.

Example 20: The optical amplifier of example 19, wherein the guided optical wave is a fundamental guided optical wave having an optical intensity profile associated with a fundamental thickness mode of the waveguide.

Example 21: The optical amplifier of example 1, wherein the waveguide further comprises a top layer and a bottom layer.

Example 22: The optical amplifier of example 16, wherein the top electrode is disposed on the top layer.

Example 23: The optical amplifier of example 1, wherein the bottom electrode is disposed on the bottom layer.

Example 24: The optical amplifier of example 21, wherein the top layer comprises p-type semiconductor material Example 25: The optical amplifier of example 1, wherein the optical input optical wave is a free space Gaussian optical beam.

Example 26: The optical amplifier of example 1, wherein the optical input optical wave is another guided optical wave having a fundamental lateral mode profile wherein the fundamental lateral mode profile comprises an optical intensity distribution associated with the fundamental lateral mode of the active waveguide.

Example 27: The optical amplifier of example 1, wherein the output optical wave is a diffraction limited free-space optical beam.

Example 28: The optical amplifier of example 1, wherein the output optical wave is another guided optical wave having a fundamental lateral mode profile wherein the fundamental lateral mode profile comprises an optical intensity distribution associated with the fundamental lateral mode of the active waveguide.

Example 29: The optical amplifier of any of examples 27 and 28, wherein an optical intensity distribution of output optical wave is a Gaussian distribution.

Terminology

While the foregoing detailed description discloses several embodiments of the present invention, it should be understood that this disclosure is illustrative only and is not limiting of the present invention. It should be appreciated that the specific configurations and operations disclosed can differ from those described above, and that the apparatus and methods described herein can be used in contexts. Additionally, components can be added, removed, and/or rearranged. Additionally, processing steps may be added, removed, or reordered. A wide variety of designs and approaches are possible.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An optical amplifier configured to receive input light via an input port to be guided therein, amplify at least a portion of said input light that is guided in the optical amplifier, and output at least a portion of said amplified light via an output port, wherein the optical amplifier comprises:
   an active waveguide extending in a longitudinal direction between the input port and the output port and having a waveguide width extending in a lateral direction, wherein at least a portion of the active waveguide supports a plurality of lateral modes, and wherein the active waveguide comprises a gain layer configured to provide optical gain to light guided in said active waveguide; and
   at least one electrode disposed with respect to the active waveguide to apply an electrical voltage to said active waveguide, said at least one electrode comprising a conductive layer extending in the longitudinal direction and having a width extending in the lateral direction between first and second lateral edges, said width increasing and decreasing multiple times with position along the longitudinal direction, said at least one electrode having a first end closer to said input port than said output port and a second end closer to said output port than said input port, said first end having a smaller width than said second end.

2. The optical amplifier of claim 1, wherein both said first and second lateral edges undulate in the lateral direction.

3. The optical amplifier of claim 1, wherein the width of the at least one electrode increases and decreases varying between a plurality of lower bound widths and a plurality of upper bound widths, increasing with longitudinal directions from the lower bound widths and decreasing with longitudinal directions from the upper bound widths, said variations in said width of said electrode averaged over a distance in the longitudinal direction that includes multiple lower bound widths and multiple upper bound widths producing an average width that increases with longitudinal direction from the first end to the second end of said electrode along most of the length of said electrode.

4. The optical amplifier of claim 3, wherein the lower bound widths progressively increase from the input port to the output port.

5. The optical amplifier of claim 3, wherein the upper bound widths progressively increase from the input port to the output port.

6. The optical amplifier of claim 5, wherein the lower bound widths remain constant from the input port to the output port.

7. The optical amplifier of claim 3, wherein the width changes linearly between the upper bound widths and the lower bound widths.

8. The optical amplifier of claim 1, wherein the width of the at least one electrode varies periodically in the longitudinal direction with a width variation period.

9. The optical amplifier of claim 1, wherein the at least one electrode comprises a single conductive layer.

10. The optical amplifier of claim 1, wherein the at least one electrode comprises a plurality of electrically isolated segments.

11. The optical amplifier of claim 1, wherein the waveguide width progressively increases from the input port to the output port.

12. The optical amplifier of claim 1, wherein guided light has an optical intensity profile corresponding to that of a fundamental lateral mode of the active waveguide.

13. A master oscillator power amplifier (MOPA) device configured to generate an output optical beam, wherein the MOPA device comprising the optical amplifier of claim 1.

14. A semiconductor laser configured to generate an output optical beam, the semiconductor laser comprising the optical amplifier of claim 1.

15. The optical amplifier of claim 1, wherein the at least one electrode comprises a top electrode.

16. A master oscillator power amplifier (MOPA) device configured to generate an output optical beam, the MOPA device comprising:
   a semiconductor laser section configured to generate laser light, the semiconductor laser comprising:
      a first reflector and a second optical reflector;
      a waveguide disposed between the first and the second optical reflectors, said waveguide including at least an active region configured to provide optical gain, the first optical reflector, the second optical reflector and the waveguide forming an active laser cavity;
   a semiconductor optical amplifier section disposed to receive the laser light via an input port to be guided therein, amplify at least a portion of said input light that is guided in the optical amplifier, and output at least a portion of said amplified light via an output port, the semiconductor optical amplifier comprising:
      an active waveguide extending in a longitudinal direction between the input port and the output port and having a waveguide width extending in a lateral direction between first and second lateral edges, wherein at least a portion of the active waveguide supports a plurality of lateral modes, and wherein the active waveguide comprises a gain layer configured to provide optical gain to light guided in said active waveguide;

at least one electrode disposed with respect to the active waveguide to apply a voltage to said active waveguide, said at least one electrode comprising a conductive layer extending in the longitudinal direction and having a width extending in the lateral direction that that increases and decreases multiple times with position along the longitudinal direction, said at least one electrode having a first end closer to said input port than said output port and a second end closer to said output port than said input port, said first end having a smaller width than said second end.

17. The master oscillator power amplifier (MOPA) device of claim 16 wherein said at least one electrode comprises a tailored electrode disposed on the active waveguide and configured to support a matched injection current profile in the gain layer, wherein the matched injection current profile generates a matched optical gain profile corresponding to an optical intensity distribution associated with the light guided in the active waveguide.

* * * * *